(12) United States Patent
Misawa et al.

(10) Patent No.: US 7,894,368 B2
(45) Date of Patent: Feb. 22, 2011

(54) OVPN SYSTEM, OVPN TERMINATING DEVICE, COLLECTIVE CONTROLLING DEVICE, AND OPTICAL COMMUNICATION NETWORK

(75) Inventors: Akira Misawa, Tokyo (JP); Satoru Okamoto, Yokohama (JP); Masaru Katayama, Tokyo (JP); Naoaki Yamanaka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1392 days.

(21) Appl. No.: 10/727,360

(22) Filed: Dec. 3, 2003

(65) Prior Publication Data

US 2004/0151500 A1  Aug. 5, 2004

(30) Foreign Application Priority Data

| Dec. 6, 2002 | (JP) | 2002-355379 |
| Dec. 6, 2002 | (JP) | 2002-355397 |
| Dec. 6, 2002 | (JP) | 2002-355418 |
| Dec. 6, 2002 | (JP) | 2002-355437 |
| Dec. 6, 2002 | (JP) | 2002-355453 |
| Dec. 6, 2002 | (JP) | 2002-355464 |
| Dec. 6, 2002 | (JP) | 2002-355485 |
| Dec. 6, 2002 | (JP) | 2002-355498 |

(51) Int. Cl.
*H04L 12/28* (2006.01)
*H04J 14/00* (2006.01)

(52) U.S. Cl. .................. 370/254; 370/395.5; 398/43

(58) Field of Classification Search ............... 370/466, 370/254–258, 351–430, 216–228
See application file for complete search history.

(56) References Cited

U.S. PATENT DOCUMENTS

| 5,282,207 A * | 1/1994 | Jurkevich et al. | 370/468 |
| 5,511,208 A * | 4/1996 | Boyles et al. | 709/223 |
| 6,212,568 B1 * | 4/2001 | Miller et al. | 370/498 |
| 6,392,990 B1 * | 5/2002 | Tosey et al. | 370/218 |
| 6,456,617 B1 * | 9/2002 | Oda et al. | 370/401 |

(Continued)

FOREIGN PATENT DOCUMENTS

| EP | 1229692 | 8/2002 |
| JP | 1179544 | 7/1989 |
| JP | 1293048 | 11/1989 |
| JP | 9247160 | 9/1997 |
| JP | 10173708 | 6/1998 |

(Continued)

OTHER PUBLICATIONS

Japanese Office Action issued on Japanese Patent Application No. 2002-355464 dated Jan. 20, 2006.
Japanese Office Action issued on Japanese Patent Application No. 2002-355437 dated Jan. 17, 2006.

(Continued)

*Primary Examiner*—Chirag G Shah
*Assistant Examiner*—Joshua Smith
(74) *Attorney, Agent, or Firm*—Harness, Dickey & Pierce, P.L.C.

(57) ABSTRACT

An OVPN user register an L1 signal type information which is used in the user's device in an OVPN terminating device in advance together with an IP address and a VPNID which are allocated to the user's device. Registered contents are notified to other OVPN terminating devices which control the same VPNID as that of the user's device. Otherwise, when a calling connection request arrives from the user's device, the registered contents are notified other OVPN terminating devices which control the devices which receive the notification. By doing this, it is possible to handle a request by the user for changing the setting for the signal format which is employed in the user's device quickly. Also, it is possible to realize an OVPN which can perform a process for a calling connection request from the user efficiently and improve an operability for the user.

49 Claims, 68 Drawing Sheets

U.S. PATENT DOCUMENTS

| | | | |
|---|---|---|---|
| 6,668,319 B1 * | 12/2003 | Newell et al. | 370/466 |
| 6,785,263 B1 * | 8/2004 | Morinaga et al. | 370/352 |
| 7,013,318 B2 * | 3/2006 | Rosengard et al. | 370/395.1 |
| 7,024,113 B2 * | 4/2006 | Miyabe | 370/392 |
| 2002/0067725 A1 * | 6/2002 | Oguchi et al. | 370/390 |
| 2003/0041167 A1 * | 2/2003 | French et al. | 709/238 |
| 2003/0043857 A1 * | 3/2003 | Takagi et al. | 370/503 |
| 2003/0117945 A1 * | 6/2003 | Zboril | 370/216 |

FOREIGN PATENT DOCUMENTS

| | | |
|---|---|---|
| JP | 2000-092065 | 3/2000 |
| JP | 2000-101669 | 4/2000 |
| JP | 2000-349692 | 12/2000 |
| JP | 2001144778 | 5/2001 |
| JP | 2002-198994 | 7/2002 |
| JP | 2002-261697 | 9/2002 |
| JP | 2002271417 | 9/2002 |
| WO | WO-02/15514 | 2/2002 |

OTHER PUBLICATIONS

Japanese Office Action issued on Japanese Patent Application No. 2002-355397 dated Jan. 10, 2006.

Japanese Office Action issued on Japanese Patent Application No. 2002-355485 dated Jan. 11, 2006.

Japanese Office Action issued on Japanese Patent Application No. 2002-355498 dated Jan. 13, 2006.

"Study on Optical VPN Services Architecture", Tomonori Takeda et al., B-7-90.

"Proposal of Optical VPN Services", Akira Misawa, et al.; Program of the 2002 Society Conference of IEICE; Sep. 10-13, 2002, Miyazaki University, Miyazaki, 4 pages.

Rodriguez-Moral A. et al., "Optical Data Networking: Protocols, Technologies, and Architectures for Next Generation Optical Transport Networks and Optical Internetworks", Journal of Lightwave Technology, vol. 18, No. 12, Dec. 2000.

Ould-Brahim H. et al., "BGP/GMPLS Optical/TDM VPNs, draft-ouldbrahim-bgpgmpls-ovpn-02.txt" IETF Internet draft, Nov. 2001. retrieved from the Internet: URL:http://www.watersprings.org/pub/id/draft-ouldbrahim-bgpgmpls-ovpn-02.txt.

Japanese Office Action dated Oct. 28, 2005.

"Proposal of Optical VPN Services", Akira Misawa et al., SB-6-4, 2002.

* cited by examiner

FIG.4

| VPN ID | ADDRESS FOR USER DEVICE | PORT NUMBER FOR USER DEVICE | PORT NUMBER FOR OVPN TERMINATING DEVICE | L1-IF |
|---|---|---|---|---|
| a | 129.40.3.1 | 1 | 12 | A1 |
| | 129.40.3.1 | 2 | 5 | B2 |
| | 129.40.3.1 | 3 | 7 | C2 |

FIG.23

| VPNID | ADDRESS FOR USER DEVICE | PORT NUMBER FOR USER DEVICE | PORT NUMBER FOR OVPN TERMINATING DEVICE | L1-IF |
|---|---|---|---|---|
| a | 129.40.3.1 | 1 | 12 | A1 |
| | 129.40.3.1 | 2 | 5 | B2 |
| | 129.40.3.1 | 3 | 7 | C2 |

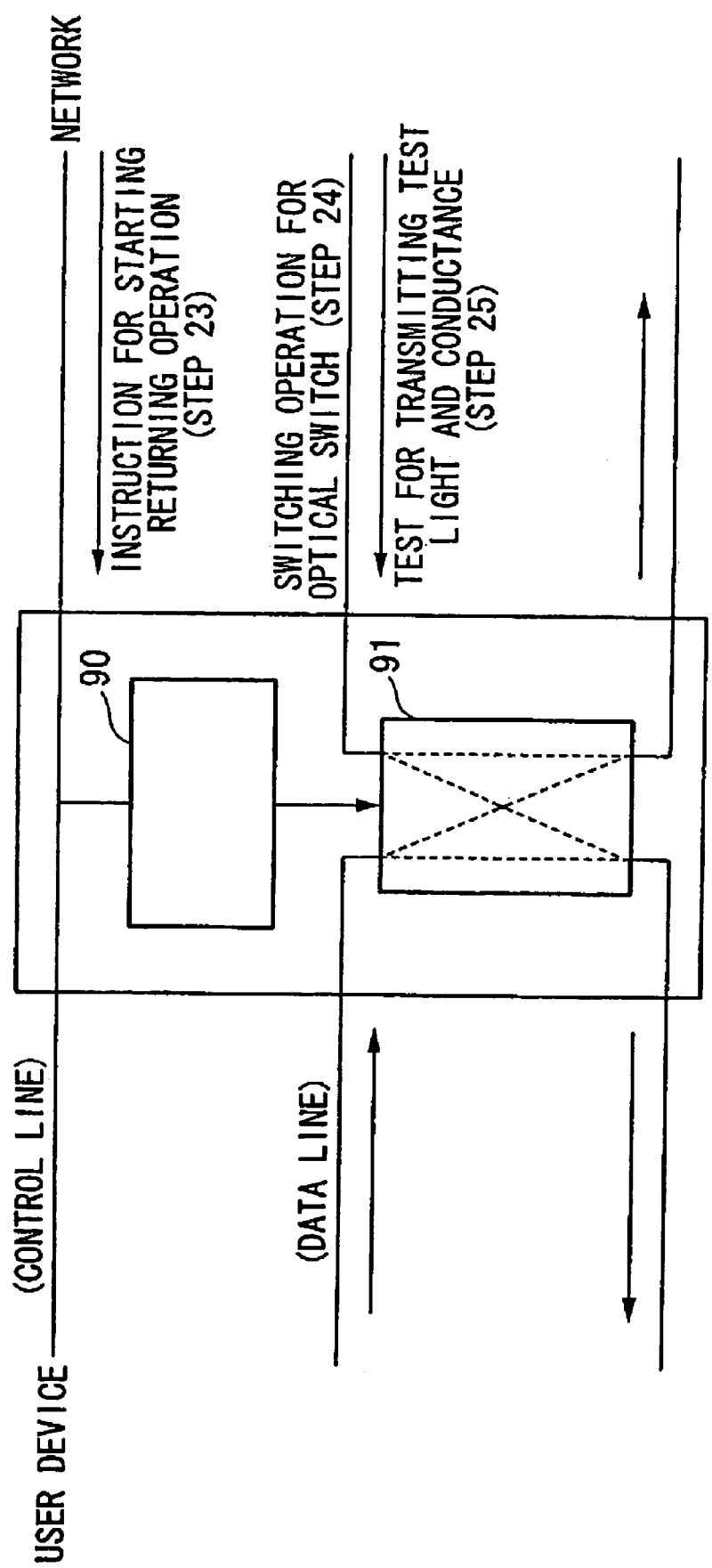

OVPN SYSTEM, OVPN TERMINATING DEVICE, COLLECTIVE CONTROLLING DEVICE, AND OPTICAL COMMUNICATION NETWORK

BACKGROUND OF THE INVENTION

1. Field of the Invention

Priority is claimed on Japanese Patent Applications No. 2002-355464, filed Dec. 6, 2002, No. 2002-355437, filed Dec. 6, 2002, No. 2002-355453, filed Dec. 6, 2002, No. 2002-355397, filed Dec. 6, 2002, No. 2002-355418, filed Dec. 6, 2002, No. 2002-355379, filed Dec. 6, 2002, No. 2002-355485, filed Dec. 6, 2002, and No. 2002-355498, filed Dec. 6, 2002, the content of which is incorporated herein by reference.

The present invention relates to a VPN (Virtual Private Network). In particular, the present invention relates to a VPN which is called a layer 1 VPN or an OVPN in which various layer signals can be contained.

2. Description of Related Art

A VPN is a service in which users may feel as if they are using a private network while during using a private network. FIG. 1 is a view of a general structure for a conventional OVPN. According to such a conventional technique, as shown in FIG. 1, the OVPN is commonly formed by connecting optical exclusive lines 123 to 125 which are leased from a network provider between base points when the user form an OVPN between the base points. In such a case, the optical exclusive lines 123 to 125 are formed by optical cross connecting devices (hereinafter called OXCs) 10 to 12. Also, the OXCs 10 to 12 are formed from OVPN controlling terminals 13 to 15 to the controlling exclusive lines 1 to 6. When OVPN controlling terminals 13 to 15 are provided to the user, the user can control a part of function in the OXC 10 to 12 which belong to the network provider.

In such OVPN, there is a technique for forming an exclusive line which has a function for transmitting a layer 1 signal transparently such as SDH/SONET, OTN (Optical Transport Network). By transmitting various layer 1 signals (such as PDH, Ethernet (trademark registered), Gigabit Ethernet, Fiberchannel, SDH/SONET, or OTN) via a signal converter which contains the various layer 1 signals in a pass pay load of the SDH/SONET at an entrance of the network or in an optical channel (0 Ch) payload of the OTN and vial a signal converter which extracts and outputs the layer 1 signals which taken fro the pay load at an exit of the network so as to realize a function for transmitting a digital signal in the layer 1 transparently. However, it is not possible to handle a plurality of layer 1 signals by a signal converter except for a case of Gigabit Ethernet or Fiberchannel.

Therefore, the user of the OVPN must notify the layer 1 signals which the user is going to use to the provider of the OVPN in advance such that the desirable signal converter should by disposed in a terminating device in the OVPN for a case in which the OVPN is formed by the above signal converter. (See Document: "Proposal of Optical VPN service", Misawa, Katayama, Okamoto, Yamanaka, The Society Conference of IEICE, SB-6-4)

Thus, it is possible to provide a function for transport the layer 1 signal transparently in a conventional OVPN. However, there is a problem in that it is difficult to exchange the signal converter and change a connection of the fibers when there is an urgent request that the OVPN user wants to change the contained layer 1 signal.

SUMMARY OF THE INVENTION

The present invention was made in consideration of the above problem. An object of the present invention is to provide an OVPN which can handle the urgent request by the user for changing the signal format which the user uses. Also, other object of the present invention is to provide an OVPN which can execute quick call connection which is requested by the user efficiency so as to improve comfort at the user.

Also, other object of the present invention is to provide an OVPN which can omit an invalid signaling process for the OVPN operation.

Also, other object of the present invention is to provide an OVPN which can improve efficiency for setting up the OVPN by the user.

Also, other object of the present invention is to provide an OVPN which can use a transmission path in the OVPN effectively.

Also, other object of the present invention is to provide an OVPN which can transport the signal in the OVPN by a multiplying operation efficiently and set length of the signal to be transported desirably by dividing a long signal.

Also, other object of the present invention is to provide an OVPN in which the transmission path can be used effectively.

Also, other object of the present invention is to provide a reliable OVPN which can handle the urgent request by the user for changing the signal format which the user uses.

In the present invention, the user of the OVPN registers an IP address which is allocated to the user's own device, a VPNID, and an L1 signal type information which is used in the user's own device in the OVPN terminating device.

Furthermore, in the present invention, when such a registration is performed, the contents of the registration is notified at least to other OVPN terminating device which controls the same VPNID as the user device. By doing this, the contents of the registration is synchronized between the OVPN terminating devices for controlling at least the same VPNID; thus, it is possible to select the L1 signal type information which can be used commonly in a transmitting user device and in a receiving user device so as to correspond to a calling connection request from the user device quickly. Also, in a case in which there is not an L1 signal type information which can be used commonly in a transmitting user device and in a receiving user device, it is possible to select a device for converting an adequate L1 signal so as to communicate between the transmitting device and the receiving device.

Otherwise, in the present invention, when a calling connection request arrives from the user's device, the contents of the registration is notified to other OVPN terminating device which controls the arriving device. In other OVPN terminating device which receives the notification, it is possible to acknowledge the L1 signal type information which can be used in the transmitting user's device by updating the contents of the user's registration by this notification. By doing this, the OVPN terminating device which receives and acknowledges the L1 signal type information which can be used by the transmitting user's device performs the communication by referring the L1 signal type information which can be used by the arriving user's device so as to notify such a refer to the transmitting user's device.

Otherwise, not only in a case in which only a communication is performed, but also in a case in which an L1 signal type information which is used in the user's device and the L1 signal type information which is used in the OVPN are different each other, it is necessary to convert the signal. Therefore, it is possible to determine the L1 signal type information which is used for the communication. By doing this, it is possible to select the L1 signal type information in which there is a vacancy for the signal converting resource both in the transmitting device and the receiving device so as to avoid a failure in the communication.

Also, vacancy in the converter depends on a current condition of the resource in the OVPN and a traffic condition. Thus, it is possible to obtain an optimum resource for the L1 signal type information by performing a negotiation between the transmitting device and the receiving device. After the L1 converting resource is obtained, the calling connection is notified; thus, the communication starts.

By doing this, it is possible to correspond to the request for changing the signal format by the user quickly. Also, it is possible to perform the processing the calling connection request efficiently; therefore, it is possible to realize an OVPN which can improve efficiency for the user.

That is, an OVPN system of the present invention has a plurality of converting sections, which are disposed so as to correspond to plural different first signal formats, for converting a first signal format and a second signal format alternately under conditions in which the first signal format which is used by a user's device which joins an OVPN (Optical Virtual Private Network) and a second signal format which is used in the OVPN are different from each other, and an OVPN terminating device for containing the user's device. In this aspect of the present invention, it is characterized in that the OVPN terminating device is provided with a registering section from the user's device for a first signal format type which is used in the user's device together with an IP address of the user's device and a VPNID, a notifying section for notifying contents of the registration to other OVPN terminating device which controls the same VPNID as the user's device, a retrieving section for the first signal format type which corresponds to the IP address and the VPNID in the user's device according to a calling connection request from the user's device by referring to the information which is registered by the registering section, and a selecting section for selecting the first signal format which is used by the user's device according to a result in the retrieving section when data is transported from the user's device.

An OVPN terminating device according to the present invention for containing a user's device which joins an OVPN has a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other.

Here, in this aspect of the present invention, it is characterized that a registering section from the user's device for a first signal format type which is used in the user's device together with an IP address of the user's device and a VPNID, a notifying section for notifying contents of the registration to other OVPN terminating device which controls the same VPNID as the user's device, a retrieving section for the first signal format type which corresponds to the IP address and the VPNID in the user's device according to a calling connection request from the user's device by referring to the information which is registered by the registering section, and a selecting section for selecting the first signal format which is used by the user's device according to a result in the retrieving section when data is transported from the user's device.

Otherwise, an OVPN system of the present invention has a plurality of converting sections, which are disposed so as to correspond to plural different first signal formats, for converting a first signal format and a second signal format alternately under conditions in which the first signal format which is used by a user's device which joins an OVPN (Optical Virtual Private Network) and a second signal format which is used in the OVPN are different from each other, an OVPN terminating device for containing the user's device, a registering section for registering a first signal format type which is sent from the user's device so as to be used in the user's device together with an IP address of the user's device and a VPNID, a notifying section for notifying the registered contents to other OVPN terminating device which controls a device which receives a calling connection request when the calling connection request arrives from the user's device, a selecting section for selecting the first signal format which is used in a device which receives the calling connection request with reference to the registered contents for a function for corresponding to the other OVPN terminating device, a receiving and selecting section which receives the first signal format type information which the device which receives the calling connection request from the other OVPN terminating device so as to respond to a notice from the notifying section and selects the first signal format type which is used in the user's device according to the format type information.

Otherwise, an OVPN terminating device of the present invention for containing a user's device which joins an OVPN has a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other, a registering section for registering a first signal format type which is sent from the user's device so as to be used in the user's device together with an IP address of the user's device and a VPNID, a notifying section for notifying the registered contents to other OVPN terminating device which controls a device which receives a calling connection request when the calling connection request arrives from the user's device, a selecting section for selecting the first signal format which is used in a device which receives the calling connection request with reference to the registered contents for a function for corresponding to the other OVPN terminating device, a receiving and selecting section which receives the first signal format type information which is used in the device which receives the calling connection request from the other OVPN terminating device so as to respond to a notice from the notifying section and selects the first signal format type which is used in the user's device according to the format type information.

Otherwise, an OVPN system of the present invention has a plurality of converting sections, which are disposed so as to correspond to plural different first signal formats, for converting a first signal format and a second signal format alternately under conditions in which the first signal format which is used by a user's device which joins an OVPN (Optical Virtual Private Network) and a second signal format which is used in the OVPN are different from each other, and an OVPN terminating device for containing the user's device. In this aspect of the present invention, it is preferable that the OVPN terminating device is provided with a registering section for registering at least a first signal format type which is sent from the user's device so as to be used in the user's device together with an IP address of the user's device and a VPNID, a notifying and selecting section for notifying the registered contents to other OVPN terminating device which controls the device which receives the calling connection request from the user's device when the calling connection request arrives from the user's device and selecting the first signal format type which can be used in the user's device handled between other OVPN terminating device an the user's own device commonly according to the registered contents, a retrieving section a vacancy of the converting section for the alternate converting operation both in the user's own device and other OVPN device when the first signal format type which is selected by the selecting section is different from a second signal format type, and a selecting section which selects at least either one of the converting section for the alternate converting operation which is not occupied for the user's own device and other OVPN device according to the retrieving result by the retrieving section.

Otherwise, an OVPN terminating device of the present invention for containing the user's device has a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other, a registering section for registering at least a first signal format type which is sent from the user's device so as to be used in the user's device together with an IP address of the user's device and a VPNID, a notifying and selecting section for notifying the registered contents to other OVPN terminating device which controls the device which receives the calling connection request from the user's device when the calling connection request arrives from the user's device and selecting the first signal format type which can be used in the user's device handled between other OVPN terminating device an the user's own device commonly according to the registered contents, a retrieving section a vacancy of the converting section for the alternate converting operation both in the user's own device and other OVPN device when the first signal format type which is selected by the selecting section is different from a second signal format type, and a selecting section which selects at least either one of the converting section for the alternate converting operation which is not occupied for the user's own device and other OVPN device according to the retrieving result by the retrieving section.

Also, it is acceptable if the registering section is provided with a section for registering a port identifier for the user's own device which corresponds to at least a first signal format which is used in the user's device or an interface identifier together with the IP address of the user's device and the VPNID. Also, it is preferable that an OVPN terminating device contains the converting section for the alternate converting operation in the user's own device.

A collective converting device of the present invention has a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other, and a section for performing the alternate converting operation which is disposed in the OVPN terminating device commonly.

An optical communication network of the present invention is provided with an OVPN system, an OVPN terminating device, and a collective converting device.

In the present invention, regarding a request concerning which layer 1 signal should be connected to the OVPN, the user of the OVPN determines whether or not it is possible to realize such a request after the OVPN terminating device or the OVPN system acknowledge such a request. Once after it is determined that it is possible to realize such a request, the IP address and the VPNID are added to the user's device. Furthermore, it is characterized that the IP address, the VPNID, and the signal format type information which is used in the user's device are registered.

By doing this, for example, if the layer 1 signal which the user wants to connect to the OVPN cannot be used in the OVPN, it is possible to avoid generating and registering the invalid IP address and the VPNID; thus, it is possible to omit an invalid signaling process for the OVPN operation.

Here, if it is said stated in the present specification that "the layer 1 signal which the user wants to connect to the OVPN cannot be used", it indicates two ways of condition. Under one condition, it is a case in which the OVPN is not provided with a converting function initially. Under another condition, it is a case in which the OVPN is provided with a converting function in which other OVPN is occupied. In the former case, it can be understood immediately that it is not possible to use. However, in the latter case, it is possible to await until the resource may be released once after registering that the OVPN as usable.

Also, it may be acceptable if the user may notify the OVPN terminating device or the OVPN system of a request regarding which layer 1 signal should be connected to the OVPN. It is possible to improve operability for the user by determining the layer 1 signal which is used in the user's device which is prepared by the user automatically and notifying the OVPN terminating device or the OVPN system of the determined result automatically. In the present invention, it is possible to determine the layer 1 signal type automatically which is used in the user's device by disposing a base point device between the OVPN terminating device in the user's device and the OVPN system.

That is, an OVPN system of the present invention has a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other, a retrieving section for detecting whether or not there is a section for performing the alternate converting operation so as to correspond to the signal format type under condition the first signal format is different from the second signal format when the first signal format type information which is used in the user's device is received, a generating section for generating an IP address and a VPNID to the user's device when there is a section for performing the alternate converting operation as a result of the retrieving operation by the retrieving section, and a registering section for registering the IP address, the VPNID generated by the generating section, and the first signal format type information which is used by the user's device to which the IP address and the VPNID are added.

Otherwise, an OVPN system of the present invention which is disposed in an OVPN to which a plurality of sub-OVPNs are connected mutually has a plurality of converting sections, which are disposed so as to correspond to plural different first signal formats, for converting a first signal format and a second signal format alternately under conditions in which the first signal format which is used by a neighboring sub-OVPN and a second signal format which is used by the user's own sub-OVPN are different from each other.

By doing this, in an OVPN structure in which a plurality of sub-OVPNs are connected to form an OVPN, it is possible to compensate a difference in the signal format among the sub-OVPNs so as to correspond to various signal format which is used by the user who is connected to each of the sub-OVPN.

An OVPN terminating device of the present invention for containing a user's device which joins an OVPN is provided with a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other.

Here, in this aspect of the present invention, it is characterized in that an OVPN terminating device is further provided with a retrieving section for detecting whether or not there is a section for performing the alternate converting operation so as to correspond to the signal format type under condition the first signal format is different from the second signal format when the first signal format type information which is used in the user's device is received, a generating section for generating an IP address and a VPNID to the user's device when there is a section for performing the alternate converting operation as a result of the retrieving operation by the retrieving section, and a registering section for registering the IP address, the VPNID generated by the generating section, and the first signal format type information which is used by the user's device to which the IP address and the VPNID are added.

Furthermore, it is preferable that an OVPN terminating device should comprise a selecting section for selecting a signal format which is used by the user who receives the calling connection request according to the first signal format type information which is used by the user's device having the IP address, included in the calling connection request, from which the calling connection request is transmitted when the calling connection request is received form the user's device, and a transmitting section for transmitting the format type information which is selected by the selecting section to the user who receives the calling connection request together with the calling connection request.

By doing this, it is possible to designate a signal format which is used in a communication thereafter for the user who receives the format type information. When the user who receives the signal format information uses a signal format except a predetermined signal format and the user who receives the signal format information can select a plurality of signal formats, it is possible to change the signal format according to the notified signal format together with a calling connection request.

Furthermore, in the present invention, it is preferable that an OVPN terminating device further has a notifying section which receives a response to the calling connection request so as to determine whether or not the signal format which is used by the user's device and the signal format which is employed by the user who receives the calling connection request coincides and notify that the signal formats do not coincide each other for setting up a circuit to the user's device.

That is, in the user's device and the user who receives the signal format information, if the signal format does not coincide, such an information is returned as a response to the calling connection request. In such a case, the user's device does not have a function for receiving the signal format which is used by the user who receives the signal format information. Therefore, it is not possible for the user to acknowledge why it is not possible to set up a network. Thus, the user's device can acknowledge that a failure of setting up a network is caused because the signal format does not coincide by disposing an OVPN terminating device which can correspond to a plurality of signal formats for performing an arbitrating role.

It is preferable that an OVPN terminating device should be provided with a notifying section for notifying a first signal format type information which corresponds to a vacant converting section for performing the alternate converting operation to the user's device when the retrieving result in the retrieving section indicates that there is not a section for performing the alternate converting operation.

By doing this, it is possible to shorten a time for the user to stand-by who wants to communicate by using the vacant network resource effectively.

Otherwise, it may be acceptable if an OVPN terminating device may has an inquiring section for inquiring whether or not it is possible to change the vacant converting section for performing the alternate converting operation to other user's device which is under operation when the retrieving result by the retrieving section indicates that that there is not a section for performing the alternate converting operation, and a requesting and generating section for requesting for changing the converting section for performing the alternate converting operation to other user device when the retrieving result by the retrieving section indicates that there is a section for performing the alternate converting operation and generating the IP address and the VPNID for the user's device.

By doing this, it is possible to shorten a time for the user to stand-by who wants to communicate by using the vacant network resource effectively and more positively.

A base point device which is disposed between the OVPN system and the user's device which is contained in the OVPN system or in a OVPN terminating device or between the OVPN system and the OVPN terminating device has a determining section for determining a first signal format type which is used in the user's device, a transmitting section for transmitting the format type information which is determined by the determining section to the OVPN terminating device, and a maintaining section for maintaining the generated IP address and the VPNID.

By doing this, it is possible to realize the present invention with less function in the user's device. Thus, the user does not need to bear extra cost for realizing a special device for the user. Therefore, OVPN provides can promote subscriptions for a new user while improving a service quality and operability.

An OVPN system has a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other, a retrieving section for detecting whether or not there is a section for performing the alternate converting operation so as to correspond to a plurality of the signal format types under condition the first signal format is different from the second signal format when the first signal format type information which is used in the user's device is received, a generating section for generating a plurality of IP addresses which correspond to a plurality of format types and a VPNID to the user's device when there is a section for performing the alternate converting operation as a result of the retrieving operation by the retrieving section, and a registering section for registering the VPNID which is added by the generating section, a plurality of IP addresses, and a plurality of the first signal format type information which are used by the user's device to which the VPNID and a plurality of the IP addresses are added, and a section for employing the converting section for performing the alternate converting operation of the first signal format and the second signal format which correspond to the IP address which is contained in the calling connection request which is transmitted for a communication flowing the calling connection request by referring to the registering section when the calling connection request arrives from the user's device.

By doing this, a plurality of IP addresses are added to a user's device such that a signal format type is determined so as to correspond to the IP addresses. Therefore, the user does not have to notify the OVPN of the signal format type which the user uses. Thus, the user can change the signal format simply by changing the IP address. By doing this, it is possible to simplify processes for changing the signal format type frequently.

An OVPN terminating device for containing a user's device which joins an OVPN has a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other.

Here, in this aspect of the present invention, it is preferable that an OVPN terminating device should further comprise a retrieving section for detecting whether or not there is a section for performing the alternate converting operation so as to correspond to a plurality of the signal format types under condition the first signal format is different from the second signal format when the first signal format type information which is used in the user's device is received, a generating section for generating a plurality of IP addresses which correspond to a plurality of format types and a VPNID to the user's device when there is a section for performing the alternate converting operation as a result of the retrieving operation by the retrieving section, and a registering section for registering the VPNID which is added by the generating section, a plurality of IP addresses, and a plurality of the first signal format type information which are used by the user's device to which the VPNID and a plurality of the IP addresses are added, and a section for employing the converting section for performing the alternate converting operation of the first signal format and the second signal format which correspond to the IP address which is contained in the calling connection request which is transmitted for a communication flowing the calling connection request by referring to the registering section when the calling connection request arrives from the user's device.

A base point device which is disposed between the OVPN system and the user's device which is contained in the OVPN system or in a OVPN terminating device or between the OVPN terminating device and the user's device which is contained in the OVPN system or in a OVPN terminating device has a determining section for determining a first signal format type which is used in the user's device, a transmitting section for transmitting the format type information which is determined by the determining section to the OVPN terminating device, and a maintaining section for maintaining the a plurality of generated IP address, the VPNID, and a plurality of the first signal format type information.

By doing this, it is possible to realize the present invention with less function in the user's device. Thus, the user does not need to bear extra cost for realizing a special device for the user. Therefore, OVPN provides can promote subscriptions for a new user while improving a service quality and operability.

Also, it is acceptable if an OVPN terminating device should be provided with the converting section for performing the alternate converting operations in the user's own device.

Also, it is acceptable if a base point device is provided with a separating section for separating the user's device and the OVPN, and a returning section for returning a test beam which is transmitted from the OVPN back to the OVPN.

By doing this, OVPN service providers can performs a test when a failure occurs by separating the user's device and the OVPN.

Also, it is acceptable if a collective converting device has a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other, and a section for performing the alternate converting operation which is disposed in the OVPN terminating device commonly.

By doing this, it is not necessary to dispose a converting section for performing the alternate converting operation in the OVPN terminating device; thus, it is possible to simplify a structure in the OVPN terminating device with a reduced cost.

An optical communication network is provided with an OVPN system, an OVPN terminating device, a base point device, and a collective converting device.

The present invention is characterized in transmitting plural various layer 1 signal transparently according to a request by the user. In particular, the present invention is characterized in setting up the network by using an IP address thereafter by generating the IP address by the OVPN terminating device when it is detected that the user's device is connected to the OVPN terminating device.

After the network is set up, regarding a request for which layer 1 signal should be connected to the OVPN, the user of the OVPN determines whether or not it is possible to realize a request after the OVPN terminating device acknowledges such a request. After it is determined that it is possible to realize such a request, the IP address, the VPNID, and the signal format type information which is used by the user's device are registered.

Also, regarding a request for which layer 1 signal should be connected to the OVPN, the layer 1 signal which is used by the user's device is determined automatically; thus, the determining result is notified to the OVPN terminating device automatically. Thus, it is possible to improve operability for the user.

That is, an OVPN system has a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other, a detecting section for detecting whether or not the user's device is connected, a generating section for adding the IP address and the VPNID to the user's device according to a control channel when the retrieving result in the detecting section indicates that the user's device is connected, a receiving and determining section for receiving at least a test signal which is transmitted via a data channel by using the IP address from the user's device and determining at least the first signal format type which belongs to the user's device, a retrieving section for retrieving whether or not there is a converting section for performing the alternate converting operation so as to correspond to the format type according to the determining result by the determining section when the first signal format type which is used by the user's device is different from the second signal format type, and a registering section for registering the IP address which is added by the generating section, the VPNID, and the first signal format type information which is determined by the determining section which is used by the user's device to which the VPNID and the IP address are added when the retrieving result by the retrieving section indicates that there is a converting section for performing the alternate converting operation.

An OVPN terminating device for containing a user's device which joins an OVPN has a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other.

Here, in the present aspect of the present invention, it is preferable that an OVPN terminating device should further comprise a detecting section for detecting whether or not the user's device is connected, a generating section for adding the IP address and the VPNID to the user's device according to a control channel when the retrieving result in the detecting section indicates that the user's device is connected, a receiving and determining section for receiving at least a test signal which is transmitted via a data channel by using the IP address from the user's device and determining at least the first signal format type which belongs to the user's device, a retrieving section for retrieving whether or not there is a converting section for performing the alternate converting operation so as to correspond to the format type according to the determining result by the determining section when the first signal format type which is used by the user's device is different from the second signal format type, and a registering section for registering the IP address which is added by the generating section, the VPNID, and the first signal format type information which is determined by the determining section which is used by the user's device to which the VPNID and the IP address are added when the retrieving result by the retrieving section indicates that there is a converting section for performing the alternate converting operation.

It is preferable that the registering section is provided with a registering section for registering a port identifier or an interface identifier for the user's own device which corresponds to at least a first signal format which is used in the user's device commonly. Also, it is preferable that an OVPN terminating device should be provided with a converting section for performing the alternate converting operation in the user's own device.

A base point device of the present invention which is disposed between the OVPN terminating device and the user's device which is contained in the OVPN terminating device has a detecting section for detecting whether or not the user's device is connected to the base point device, a receiving and maintaining section for receiving the IP address and the VPNID which are added to the base point device via the control channel from the OVPN terminating device, and a transmitting section for transmitting the test signal for at least the first signal format which is used by the user's device to the OVPN terminating device via the data channel after the IP address and the VPNID are added to the base point device.

Furthermore, it is preferable that a base point device of the present invention should be provided with a separating section for separating the user's device and the OVPN, and a returning section for returning a test beam which is transmitted from the OVPN back to the OVPN.

By doing this, OVPN service providers can performs a test when a failure occurs by separating the user's device and the OVPN.

A collective converting device of the present invention has a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other, and a section for performing the alternate converting operation which is disposed in the OVPN terminating device commonly.

By doing this, it is not necessary to dispose a converting section for performing the alternate converting operation in the OVPN terminating device; thus, it is possible to simplify a structure in the OVPN terminating device with a reduced cost.

An optical communication network of the present invention is provided with an OVPN system, or an OVPN terminating device, or a base point device, or a collective converting device.

Regarding a request concerning which layer 1 signal should be connected to the OVPN, the present invention is primarily characterized in that a control line is used for notifying the OVPN terminating device or the OVPN system of the request of the user of the OVPN. By providing the control line for the OVPN user, it is possible for the user to control the OVPN.

Also, the present invention is secondarily characterized in that a data line from the user is connected to plural various signal converters via optical switches. By disposing the optical switches therebetween, it is possible to contain various layer 1 signals in the OVPN.

Furthermore, the present invention is thirdly characterized in that a control device for controlling the optical switches according to information which is inputted from the control line from the user. By doing this, it is possible to respond to a layer 1 signal type which is changed voluntarily by the user immediately under an end-to-end condition of the OVPN.

Particularly, if the first signal format which is used in the user's device and the second signal format which is used in the OVPN are different from each other, it should be understood that the present invention should be realized under conditions in which a signal which is based on the first signal format is encapsulated by a signal which is based on the second signal format so as to be transmitted in the OVPN.

In such a case, it is characterized in that a signal which is directed to a common destination in the OVPN is multiplied so as to be transmitted. Alternatively, when a signal which is based on the first signal format which is used in the user's device is encapsulated by a signal which is based on the second signal format which is used in the OVPN, if the signal which is based on the first signal format cannot be contained in the signal which is based on the second signal format, it is characterized in that the signal which is based on the first signal format is divided into a plurality of signals so as to be encapsulated by the signal which is based on the second signal format.

By doing this, it is possible to respond to the signal format which is requested to be changed by the user immediately. Also, it is possible to realize an OVPN in which it is possible to use a transmitting path in the OVPN effectively.

An OVPN system of the present invention has a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other. In this aspect of the present invention, it is preferable that the converting section for performing the alternate converting operation is provided with a transmitting section the first signal format which is transmitted from the user's device to the OVPN by encapsulating the first signal format by the second signal format, and a transmitting section the encapsulated signal which is encapsulated by the second signal format which is transmitted from the OVPN to the user's device by de-encapsulating to the first signal format, and the transmitting section to the OVPN is provided with a multiplying section for multiplying a plurality of signals by the second signal format which are directed to a common destination, and the transmitting section to the user's device is provided with a separating section for the multiplied signal by the multiplying section into a plurality of signals.

By doing this, the base point which forms the OVPN can form the OVPN flexibly with regardless to the signal format which is employed. Furthermore, a plurality of signals which are directed to a common destination are united; therefore, it is possible to use the network resource effectively.

An OVPN terminating device of the present invention for containing a user's device which joins an OVPN has a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other.

Here, in the present aspect of the present invention, it is preferable that an OVPN terminating device should further comprise the converting section for performing the alternate converting operation in the OVPN terminating device. Also, it is preferable that the converting section for performing the alternate converting operation is provided with a transmitting section for transmitting the first signal format which is transmitted from the user's device to the OVPN by encapsulating the first signal format by the second signal format, and a transmitting section for transmitting the encapsulated signal which is encapsulated by the second signal format which is transmitted from the OVPN to the user's device by de-encapsulating to the first signal format, and the transmitting section to the OVPN is provided with a multiplying section for multiplying a plurality of signals by the second signal format which are directed to a common destination, and the transmitting section to the user's device is provided with a separating section for the multiplied signal by the multiplying section into a plurality of signals.

An OVPN system of the present invention has a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other. In this aspect of the present invention, it is preferable that the converting section for performing the alternate converting operation is provided with a transmitting section for transmitting the first signal format which is transmitted from the user's device to the OVPN by encapsulating the first signal format by the second signal format, and a transmitting section for transmitting the encapsulated signal which is encapsulated by the second signal format which is transmitted from the OVPN to the user's device by de-encapsulating according to the first signal format, and the transmitting section to the OVPN is provided with a dividing and encapsulating section for dividing and encapsulating a series of signals according to the first signal format into a plurality of signals according to the second signal format, and the transmitting section to the user's device is provided with a restoring section for restoring a plurality of signals which are divided by the dividing and encapsulating section into a series of signals.

By doing this, it is possible to encapsulate the signal which is based on the first signal format which is used by the user's device by the signal which is based on the second signal format in the OVPN with regardless to the amount of the data. Therefore, the user can transmit any desirable amount of data which is supposed to be transmitted.

An OVPN terminating device of the present invention for containing a user's device which joins an OVPN has a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other.

In this aspect of the present invention, it is preferable that the converting section for performing the alternate converting operation is provided with a transmitting section for transmitting the first signal format which is transmitted from the user's device to the OVPN by encapsulating the first signal format by the second signal format, and a transmitting section for transmitting the encapsulated signal which is encapsulated by the second signal format which is transmitted from the OVPN to the user's device by de-encapsulating to the first signal format, and the transmitting section to the OVPN is provided with a dividing and encapsulating section for dividing and encapsulating a series of signals according to the first signal format into a plurality of signals according to the second signal format, and the transmitting section to the user's device is provided with a restoring section for restoring a plurality of signals which are divided by the dividing and encapsulating section into a series of signals.

A collective converting device of the present invention has a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other, and a section for performing the alternate converting operation which is disposed in the OVPN terminating device commonly.

By doing this, it is not necessary to dispose a converting section for performing the alternate converting operation in the OVPN terminating device; thus, it is possible to simplify a structure in the OVPN terminating device with a reduced cost.

An optical communication network of the present invention is provided with an OVPN system, or an OVPN terminating device, or a collective converting device.

Here, a multi-layer network which is used in the present invention is briefly explained with reference to FIGS. 13 and 14. FIG. 13 shows a topology for the layer 1 network. FIG. 14 shows a relationship of topologies in a layer 3 network and the layer 1 network. For example, the layer 3 network is an IP network. A layer 3 frame is an IP packet. Also, the layer 1 frame is an Ethernet frame. A layer 2 network is, for example, an SDH. Here, detailed explanation is omitted so as to simplify the explanation. In the topology in the layer 1 network shown in FIG. 13, only a topology which is formed by a node for processing in the layer 1 frame can be observed. Also, it is ostensibly observed that, in the layer 1 network, the data is transmitted entirely by the layer 1 frame.

However, in the multi-layer network which is employed in the present invention, a layer 3 network exists for a back born network for the layer 1 network as shown in FIG. 14. In the layer 3 network, the data is transmitted by the IP packet in the layer 3 frame.

That is, a signal which reaches from the user's device in a transmitting section to a node in a transmitting section in the layer 1 frame is encapsulated by a signal in the layer 3 frame once in a node in the transmitting section. After that, the encapsulated signal is transmitted in the layer 3 network until reaching at a router in a receiving section.

By doing this, the signal is encapsulated by the layer 3 frames instead of the layer 1 frame intermittently. Such a encapsulating operation is not acknowledged from a layer 1 network point of view. Ostensibly, as shown in FIG. 13; it is observed as if the signal is transmitted from a transmitting user's device throughout the receiving user's device entirely by the layer 1 frame.

In the present invention, it is characterized in that the signal format in the layer 1 which is used in the user's device is encapsulated and de-encapsulated by a signal format in an upper layer than the layer 1 which is employed in the OVPN. Originally, OVPN is a service in which an L1 transparent exclusive network is virtually produced; therefore, it is actually acceptable to produce a layer 2 or a layer 3 network as long as it looks an L1 transparent exclusive network to a user. For example, a layer 3 is an IP network. In such a case, it is possible to transmit a plurality of IP packets from a transmitting router under a multiplied condition so as to allocate destinations according to IP header which is observed by a receiving router as long as it is performed in the IP network. By doing this, it is possible to enhance a transmission efficiency in the OVPN. Also, it is possible to transmit a series of signals by a plurality of frames by dividing the series of signals in a case if the series of signals it too long to be contained in a frame.

By doing this, it is possible to handle the urgent request by the user for changing the signal format which the user uses. Also, it is possible to multiply the signal which is transmitted in the OVPN efficiently. Thus, it is possible to realize in which it is possible to set the length of the signal by transmitting long signals under a divided condition.

That is, an OVPN system of the present invention has a plurality of converting sections, which are disposed so as to correspond to plural different first signal formats, for converting a first signal format in a layer 1 which is employed in a user's device which joins an OVPN and a second signal format which is prior to the layer 1 which is employed in the OVPN alternately. In this aspect of the present invention, it is preferable that the converting section for performing the alternate converting operation is provided with a transmitting section for transmitting the first signal format which is transmitted from the user's device to the OVPN by encapsulating the first signal format by the second signal format, and a transmitting section for transmitting the encapsulated signal which is encapsulated by the second signal format which is transmitted from the OVPN to the user's device by de-encapsulating according to the first signal format.

In the OVPN system of the present invention, it is preferable that the transmitting section to the OVPN is provided with a multiplying section for multiplying a plurality of signals according to the second signal format. Alternatively, in an OVPN system of the present invention, it is preferable that the transmitting section to the OVPN is provided with a dividing and encapsulating section for dividing and encapsulating a series of signals according to the first signal format into a plurality of signals according to the second signal format.

By doing this, the base point which forms the OVPN can form the OVPN flexibly with regardless to the signal format which is employed. Furthermore, in the present invention, the signals are multiplied or divided; it is possible to transmit the signals efficiently.

An OVPN terminating device of the present invention for containing a user's device which joins an OVPN has a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other.

In this aspect of the present invention, it is preferable that an OVPN terminating device further has the converting section for performing the alternate converting operation in the OVPN terminating device. Also, it is preferable that the converting section for performing the alternate converting operation is provided with a transmitting section for transmitting the first signal format which is transmitted from the user's device to the OVPN by encapsulating the first signal format by the second signal format, and a transmitting section for transmitting the encapsulated signal which is encapsulated by the second signal format which is transmitted from the OVPN to the user's device by de-encapsulating to the first signal format.

It is preferable that, in the OVPN terminating device, the transmitting section to the OVPN is provided with a multiplying section for multiplying a plurality of signals according to the second signal format. Also, it is preferable that the transmitting section to the OVPN is provided with a dividing and encapsulating section for dividing and encapsulating a series of signals according to the first signal format into a plurality of signals according to the second signal format.

A collective converting device of the present invention has a plurality of converting sections, which are disposed so as to correspond to plural different first signal formats, for converting a first signal format in a layer 1 which is employed in a user's device which joins an OVPN and a second signal format which is prior to the layer 1 which is employed in the OVPN alternately, and the converting section for performing the alternate converting operation for the OVPN terminating device commonly.

By doing this, it is not necessary to dispose a converting section for performing the alternate converting operation in the OVPN terminating device; it is possible to simplify the structure in the OVPN terminating device and reduce a product cost for the OVPN terminating device.

An optical communication network is provided with an OVPN system, or an OVPN terminating device, or a collective converting device.

The present invention is characterized in transmit plural various layer 1 signals transparently according to a request by the user. In particular, the base point device is disposed between the user's device and the OVPN terminating device such that the IP address is generated by the OVPN terminating device for the base point device when the base point device is connected to the user's device. By doing this, it is characterized in that the base point device performs the setting up operation thereafter automatically by using the IP address.

In the OVPN, a control line and a data line are necessary respectively. The control line and the data line must be connected and disconnected when the user's device and the OVPN terminating device are connected and released. In the present invention, the base point device and the OVPN terminating device are connected by the control line and the data line in advance such that the base point device and the OVPN terminating device are connected and released by connecting and releasing the control line and the data line in advance. Thus, it is possible to simplify the setting in the user's device. For example, regarding connecting the user's device and the base point device, the user can connect the user's device and the base point device by a cable by multiplying the control channel and the data channel.

Once after the setting up operation was completed and the OVPN terminating device acknowledged a request regarding which layer 1 signal to be connected to the OVPN, it is determined whether or not it is possible to realize such a request. If it is determined that it is possible, the IP address, the VPNID, and the signal format type information which is employed in the user's device are registered.

Also, it may be acceptable if the user notify the OVPN terminating device of the request regarding which layer 1 signal to be connected to the OVPN. Therefore, it is possible to improve operability for the user by determining the layer 1 signal which is employed in the user's device automatically and notifying the OVPN of the determining result automatically.

By doing this, it is possible to handle the urgent request by the user for changing the signal format which the user-uses. Also, it is possible to perform a connection process for the user's device to the OVPN efficiently; thus, it is possible to improve operability for the user.

An OVPN system of the present invention has a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other, and a receiving and transmitting section for receiving a notice that the user's device is connected to the base point device via the control channel from the base point device which is disposed between the user's device and the OVPN and transmitting the IP address and the VPNID which are allocated to the user's device according to the base point device.

An OVPN terminating device of the present invention for containing a user's device which joins an OVPN has a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other.

In this aspect of the present invention, it is preferable that the OVPN terminating device further has a receiving and transmitting section for receiving a notice that the user's device is connected to the base point device via the control channel from the base point device which is disposed between the user's device and the OVPN and transmitting the IP address and the VPNID which are allocated to the user's device according to the base point device.

An OVPN terminating device of the present invention has a receiving section for receiving a receipt confirmation which is transmitted from a transmitting section for the IP address and the VPNID for the IP address and the VPNID, and a transmitting section for transmitting a final connection confirmation for notifying the receipt of the receipt confirmation by the receiving section to the base point device.

That is, it is not limited to a case in which only one OVPN terminating device receives the notice. There is a case in which a plurality of the OVPN terminating devices receive the notice. Accordingly, there is a case in which a plurality of IP addresses and a plurality of VPNIDs are transmitted to the base point device. The base point device selects either one of a plurality of IP addresses and a plurality of VPNIDs and transmits a receipt confirmation back to the address from which the IP address and the VPNID are transmitted. The OVPN which receives the receipt confirmation starts preparing for setting up the network by transmitting a final connection confirmation to the base point device. For example, an OVPN terminating device which is the closest to the base point device is selected. More specifically, an OVPN terminating device is selected at which the IP address and the VPNID arrives the soonest.

An OVPN terminating device of the present invention has a receiving and retrieving section for receiving the first signal format type information which is employed by the user's device according to the control channel after the final connection confirmation is transmitted so as to retrieving whether or not there is a converting section for performing the alternate converting operation so as to correspond to the format type, and a registering section for registering the IP address and the VPNID which are allocated to the user's device, and the first signal format type information which is employed by the user's device when the retrieving result in the receiving and registering section indicates that there is a converting section for performing the alternate converting operation. Also, an OVPN terminating device is provided with the converting section for performing the alternate converting operation in the OVPN terminating device.

A base point device of the present invention which is disposed between the OVPN terminating device and a user's device which is contained in the OVPN terminating device has a detecting section for detecting whether or not the user's device is connected to the base point device, a notifying section for notifying at least one of the OVPN terminating device via the control channel that it is detected that the user's device is connected to the base point device, a receiving section for receiving the IP address and the VPNID which are allocated to the user's device from the OVPN terminating device via the control channel, a transmitting section for transmitting a receipt confirmation that the receiving section received the IP address and the VPNID to the OVPN terminating device, and a transmitting section the first signal format type information which is used by the user's device, the IP address, and the VPNID to the OVPN terminating device which received the final connection receipt for the receipt confirmation via the control channel.

Also, a base point device of the present invention has a determining section for determining the first signal format type information which is employed in the user's device, and a transmitting device for transmitting the format type information which is determined by the determining section to the OVPN terminating device.

Furthermore, a base point device of the present invention has a separating section for separating the user's device and the OVPN, and a returning section for returning a test beam which is emitted from the OVPN back to the OVPN.

By doing this, OVPN service providers can perform a test when a failure occurs by separating the user's device and the OVPN.

A collective converting device of the present invention has a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other, and a converting section for the alternate converting operation for the OVPN terminating device commonly.

By doing this, it is not necessary to dispose a converting section for performing the alternate converting operation in the OVPN terminating device; thus, it is possible to simplify a structure in the OVPN terminating device with a reduced cost.

An optical communication network of the present invention is provided with an OVPN system, or an OVPN terminating device, or a base point device, or a collective converting device.

In the present invention, an OVPN system uses an OVPN terminating device which can convert plural various signals so as to correspond to a plurality of L1 signal types which are used by the user of the OVPN. In such an OVPN system, it is characterized that a multiplied wavelength method is used for transmitting a signal to the user and the OVPN so as to use a transmission path efficiently. Furthermore, it is characterized in that information for the wavelength for each user's device and information that these wavelengths are multiplied are notified to the OVPN. By doing this, it is characterized in that the notified information is utilized; thus, it is possible to separate the wavelength efficiently in the OVPN.

A base point device of the present invention which is disposed between an OVPN and a user's device has a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other.

In this aspect of the present invention, it is preferable that the base point device further has a multiplying and transmitting section for multiplying and transmitting a plurality of optical wavelength signals which are used in the user's device to the OVPN, a separating and transmitting section for separating and transmitting the multiplied optical wavelength signals which arrive from the OVPN, and a notifying section for notifying the OVPN of information for the wavelength which are transmitted under a multiplied condition so as to be used in a plurality of the user's devices.

An OVPN terminating device of the present invention for containing the user's device via the base point device has a multiplying and transmitting section for multiplying and transmitting a plurality of optical wavelength signals which are used in the user's device to the OVPN, and a separating and transmitting section for separating and transmitting the multiplied optical wavelength signals which arrive from the base point device so as to transmit to a predetermined course according to information which is notified from the notifying section.

Also, the present invention is characterized in that a series of serial signals are converted into a plurality of parallel signals and transmitted; thus, it is possible to compensate a difference of transmitting speed of the signal between the user and the OVPN. In such a case, information that the serial signals are converted into the parallel signals, and information of topology for the parallel signals are notified to the OVPN. By doing this, a plurality of parallel signals which were originally a series of serial signals can be transmitted as a group. When, for example, a plurality of parallel signals are transmitted parallel by using a plurality of transmitting paths having different transmitting distances, there occurs a time difference at which the signals arrive at the destinations. In such a case, it is possible to reduce such a time difference at which the signals arrive at the destinations by transmitting the signals by using a plurality of transmitting paths of which transmitting distances are similar.

A base point device of the present invention has which is disposed between an OVPN and a user's device has a converting and transmitting section for converting a serial signal which is transmitted from the user's device into a plurality of parallel signals so as to transmit to the OVPN, a converting and transmitting section for converting a plurality of the parallel signals which arrive from the OVPN into a serial signal so as to transmit to the user's device, and a notifying section for notifying the OVPN of information for the topology of the parallel signals and information that the serial signals are converted to the parallel signals.

An OVPN terminating device of the present invention for containing the user's device via the base point device has an inputting section for inputting the parallel signals which are divided from a series of serial signals in to a plurality of the converting section for performing the alternate converting operation so as to correspond to the first signal format type information according to the information which is notified from the notifying section in the base point device.

Also, in the present invention, it is possible to perform a wavelength-multiplying operation to the parallel signals so as to transmit. By doing this, it is possible to use the transmitting paths more efficiently.

Alternately, a base point device of the present invention has a multiplying and transmitting section for multiplying the parallel signal which is converted from the serial signal which is transmitted from the user's device so as to transmit to the OVPN, a separating and transmitting section for separating the multiplied wavelength signals which arrive from the OVPN into the parallel signals and converting the parallel signals into the serial signals so as to transmit to the user's device, and a notifying section for notifying the OVPN of the information that the serial signals are converted to the parallel signals, the information for a topology of the parallel signals, and the information that the parallel signals are transmitted under wavelength-multiplied condition.

Alternately, an OVPN terminating device of the present invention for containing the user's device via the base point device has a multiplying and transmitting section for multiplying the parallel signals which arrive from the OVPN as to transmit to the base point device, a separating and transmitting section for separating the multiplied optical wavelength signals which arrive from the base point device so as to transmit to the OVPN as the parallel signals, and an inputting section for inputting the parallel signals which are divided from a the multiplied wavelength signals into a plurality of the converting section for performing the alternate converting operation so as to correspond to the first signal format type information according to the information which is notified from the notifying section in the base point device.

Also, an OVPN system of the present invention has a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other. In this aspect of the present invention, it is preferable that at least a part of the converting sections for performing the alternate converting operation are provided with converting sections for converting a series of serial signals according to the first signal format which are transmitted from the user's device into a plurality of parallel signals in the OVPN according to the second signal format and converting a plurality of the parallel signals according to the second signal format directed to the user's device from the OVPN into a series of serial signals according to the first signal format alternately.

An OVPN terminating device of the present invention for containing the user's device which joins the OVPN has a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other, a converting section for performing the alternate converting operation in the OVPN terminating device. In this aspect of the present invention, it is preferable that at least a part of the converting sections for performing the alternate converting operation include converting sections for converting a series of serial signals according to the first signal format which are directed to the OVPN from the user's device into a plurality of parallel signals in the OVPN according to the second signal format and converting a plurality of the parallel signals according to the second signal format directed to the user's device from the OVPN into a series of serial signals according to the first signal format alternately.

By doing this, it is possible to adjust the transmitting speed for the signals in a case in which the transmitting speed in the OVPN is slower than the transmitting speed outside the OVPN.

An OVPN terminating device of the present invention is provided with the converting section for performing the alternate converting operation in the OVPN terminating device. Also, a base point device of the present invention is provided with a separating section for separating the user's device and the OVPN, and a returning section for returning a test beam which is transmitted from the OVPN back to the OVPN.

By doing this, OVPN service providers can performs a test when a failure occurs by separating the user's device and the OVPN.

A collective converting device of the present invention has a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other, and a section for performing the alternate converting operation which is disposed in the OVPN terminating device commonly.

By doing this, it is not necessary to dispose a converting section for performing the alternate converting operation in the OVPN terminating device; thus, it is possible to simplify a structure in the OVPN terminating device with a reduced cost.

An optical communication network of the present invention is provided with a base point device, or an OVPN terminating device, or a collective converting device.

In the present invention, an OVPN system uses an OVPN terminating device which can convert plural various signals so as to correspond to a plurality of L1 signal types which are used by the user of the OVPN. In such an OVPN system, it is characterized that a base point device is disposed at the user so as to contain the user's device such that the base point device relays the control channel and the data channel between the user's device and the OVPN terminating device. Also, as a first feature, the base point device monitors a failure in the control channel and the data channel so as to maintain the communication by using a control channel and a data channel in which a failure does not occur by a cooperative reaction with other base point devices when a failure occurs. By doing this, it is possible to handle a failure in the control channel and the data channel which is caused due to the base point device.

Also, as a second feature, the base point device maintains the communication by using a control channel and a data channel in which a failure does not occur by a cooperative reaction with other base point devices when a failure occurs due to the OVPN terminating device.

A base point device of the present invention which is disposed between an OVPN system and a user's device has a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other.

Here, in this aspect of the present invention, it is preferable that the base point device further has a recording section for recording a group for the base point device which relates to a common VPNID, a detecting section for detecting an occurrence of a failure in a control channel and a data channel, a requesting section for requesting that other base point device in a same group should perform processes which is supposed to be performed by the detecting section which has a failure with reference to the recording section.

Furthermore, a base point device of the present invention has a recording section for recording a group for the OVPN terminating device which relates to a common VPNID, a detecting section for detecting an occurrence of a failure in a control channel and a data channel, a requesting section for requesting that other OVPN terminating device in a same group should perform processes which is supposed to be performed by the OVPN terminating device which has a failure in the control channel with reference to the recording section when the detecting section detects the occurrence of the failure.

Furthermore, a base point device of the present invention is provided with a separating section for separating the user's device and the OVPN, and a returning section for returning a test beam which is transmitted from the OVPN back to the OVPN.

An OVPN terminating device of the present invention for containing a user's device which joins an OVPN has a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other.

Here, In this aspect of the present invention, it is preferable that the OVPN terminating device further has a recording section for recording a group for the OVPN terminating device which relates to a common VPNID, a detecting section for detecting an occurrence of a failure in a control channel and a data channel, a requesting section for requesting that other OVPN terminating device in a same group should perform processes which is supposed to be performed by the OVPN terminating device which has a failure in the control channel with reference to the recording section when the detecting section detects the occurrence of the failure.

An optical communication network of the present invention is provided with a base point device, or the OVPN terminating device.

BRIEF DESCRIPTION OF THE DRAWINGS

FIG. 4 is a view for explaining contents which is registered in a database in the first embodiment.

FIG. 23 is a database registering pattern according to the thirteenth embodiment.

FIG. 70 is a view for explaining a separating testing method in the base point device according to a thirty-fourth embodiment.

DETAILED DESCRIPTION OF THE INVENTION

First Embodiment

Figure 1:
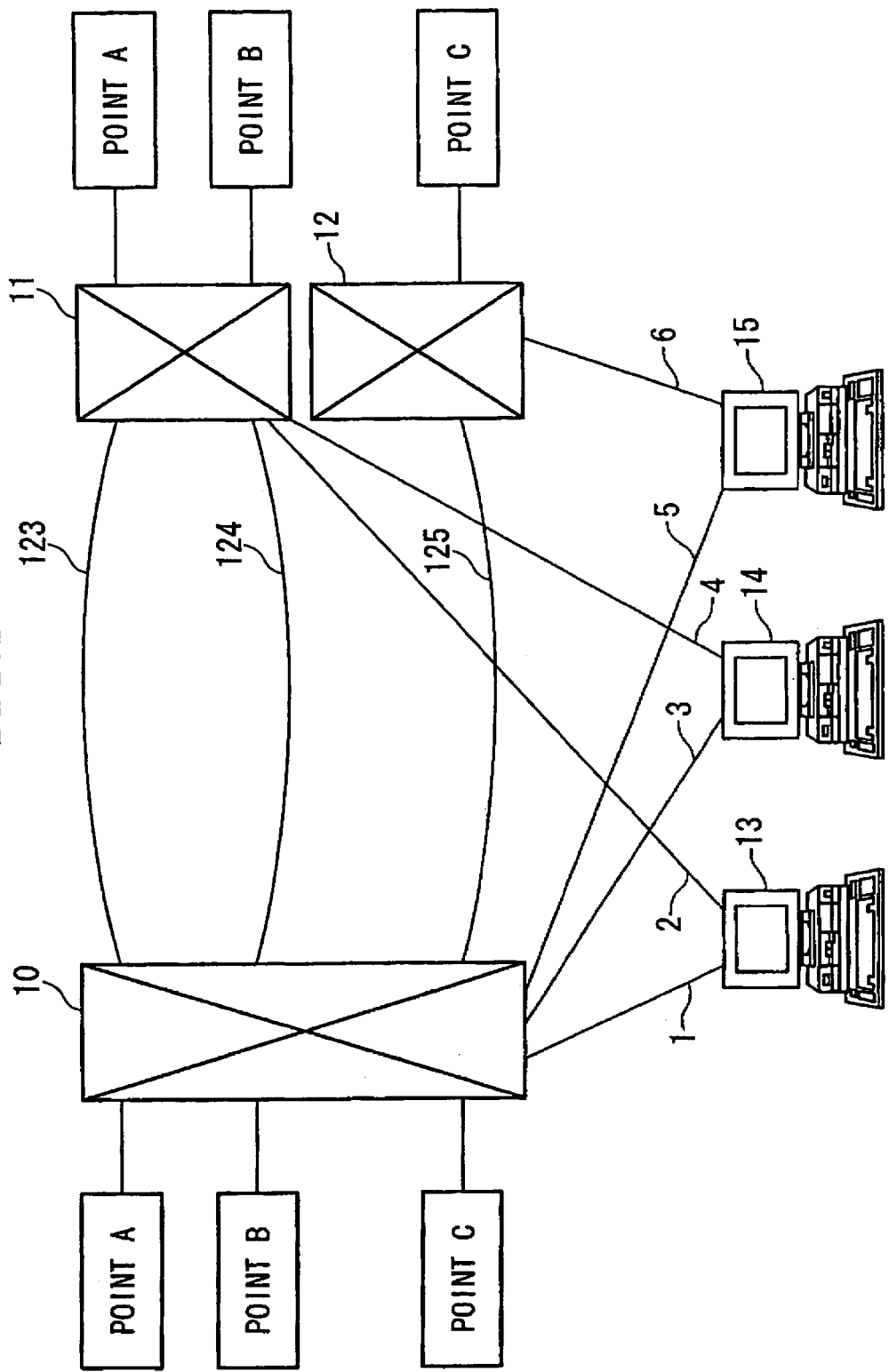
FIG. 1 shows a structure for a conventional OVPN.
Figure 2:
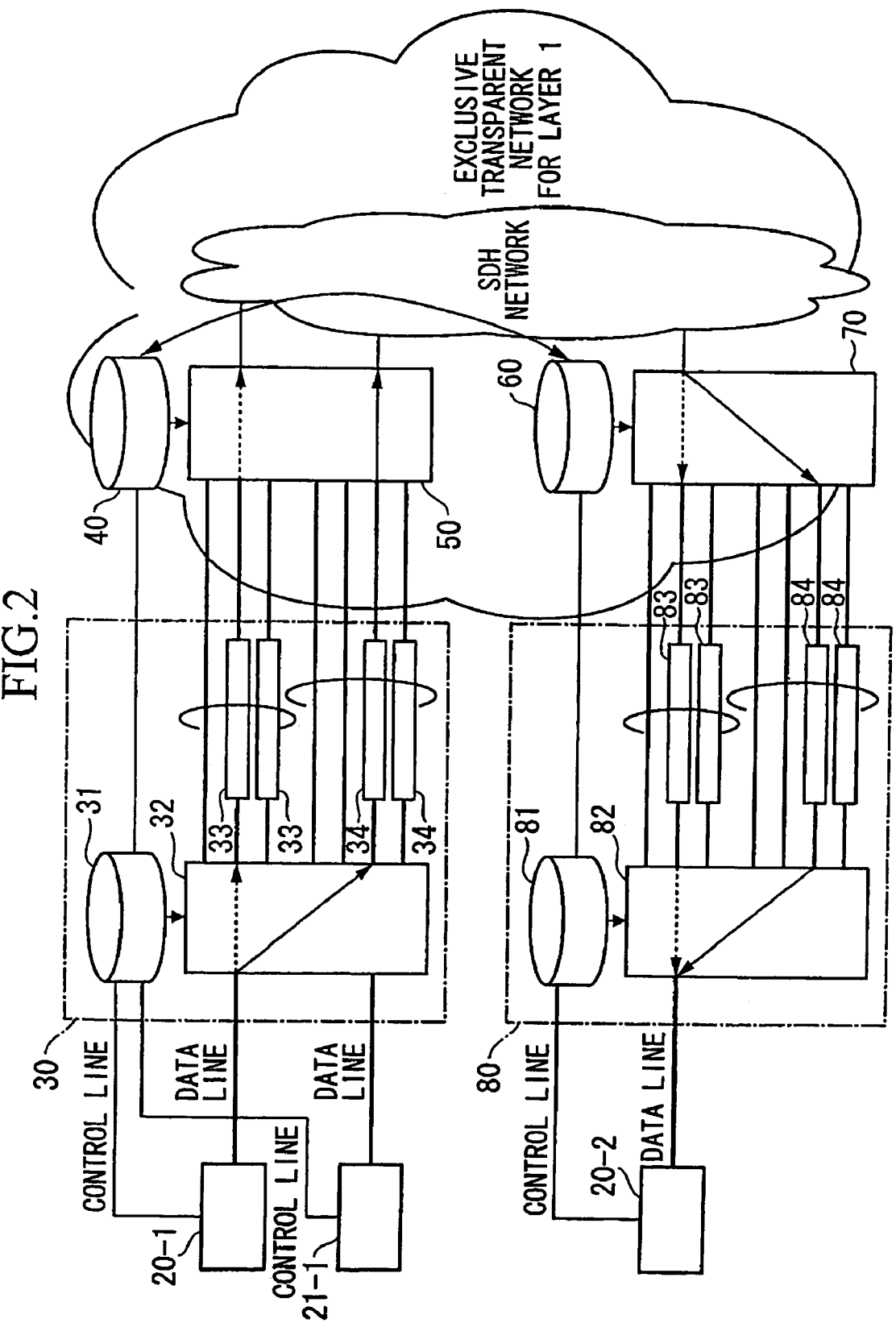
FIG. 2 shows an OVPN for a 6th embodiment and a 13th embodiment of the present invention.
Figure 3:
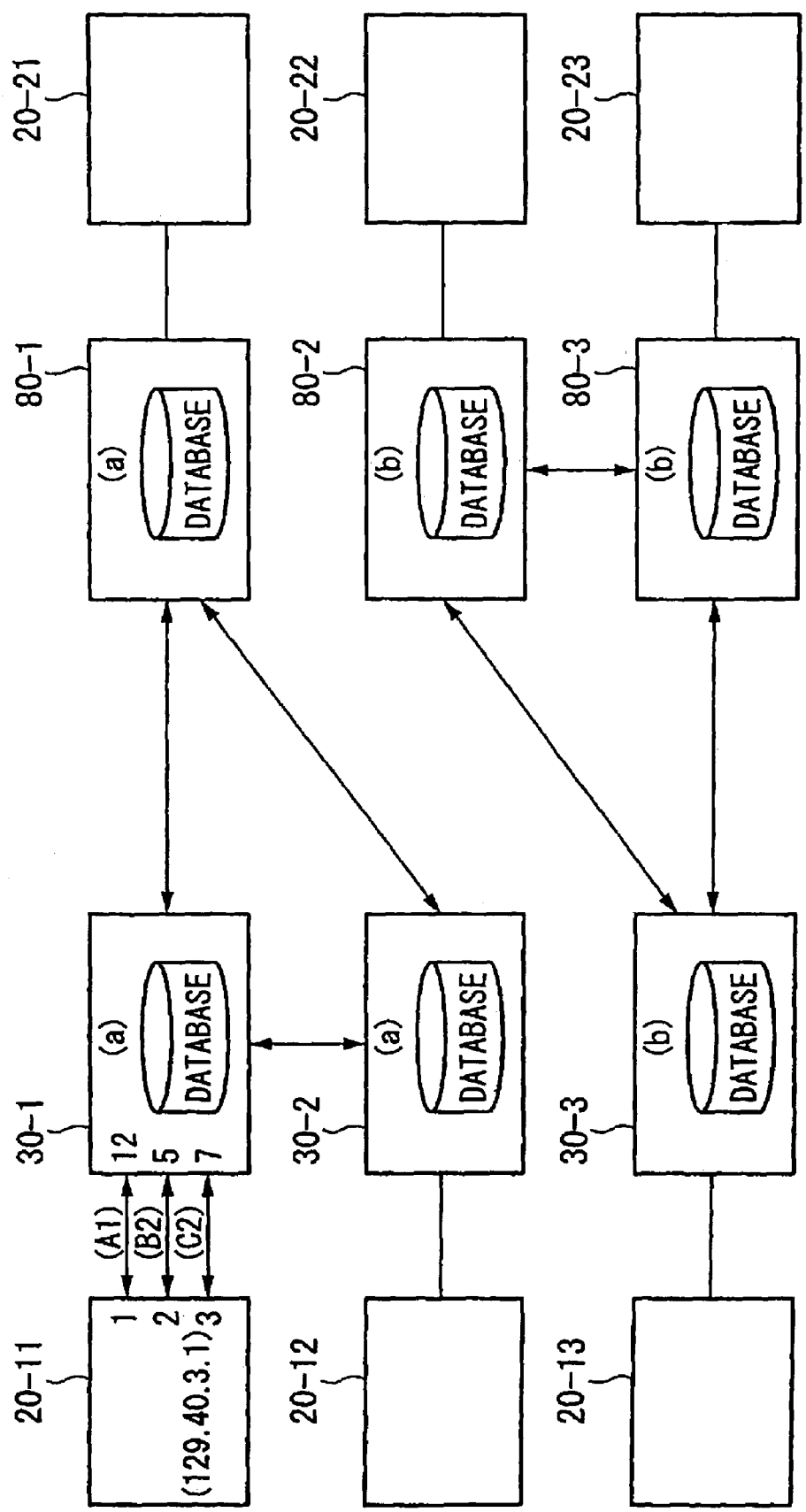
FIG. 3 shows a concept for operations in the OVPN in a first embodiment of the present invention.
Figure 5:
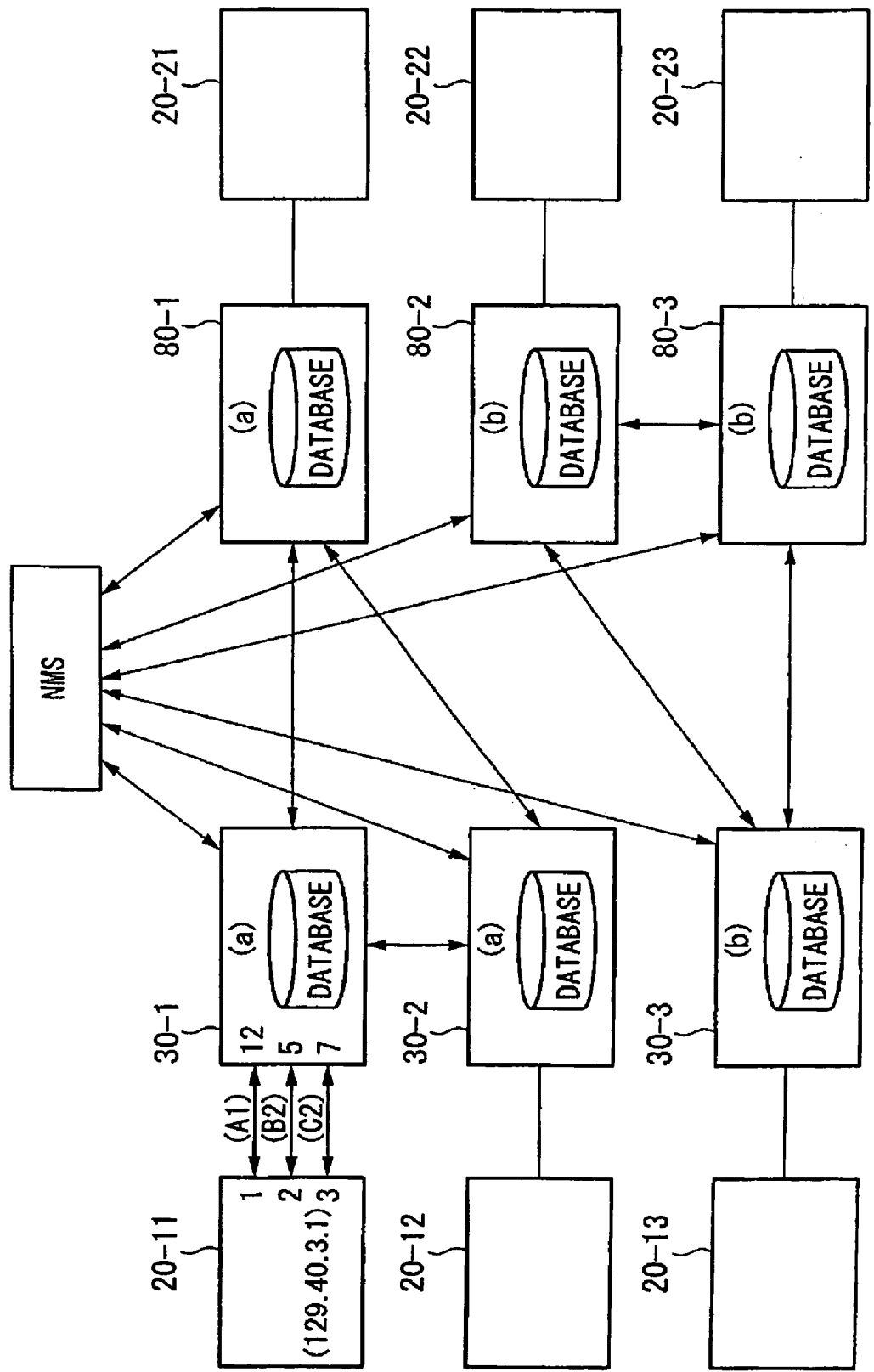
FIG. 5 shows a concept for operations in the OVPN in the first embodiment of the present invention.

A first embodiment is explained with reference to FIGS. 2 to 5. FIG. 2 is a view for showing a structure for an OVPN which has a basic structure for the present embodiment. FIG. 3 is a view for showing a concept for operations in the first embodiment. FIG. 4 is a view for explaining contents in a database according to the first embodiment. FIG. 5 is a view for showing a concept of operations according to the first embodiment. In order to simplify the explanation, in FIG. 1, a case is shown in which a signal is transmitted from user's devices 20-1, 21-1 which are located in an upper-left part in the drawing to user's device 20-2 which is located in a lower-left part in the drawing. In an ordinary communication, a signal is transmitted in a reverse direction simultaneously. Also, OVPN terminating devices 30 and 80 are the same devices as each other shown in FIG. 2. Also, network controlling devices 40 and 60 are the same devices as each other. Optical cross connecting devices 50 and 70 are the same devices as each other. Hereinafter, in order to simplify the explanation, explanations are made mainly for the OVPN terminating device 30, the network controlling device 40, and the optical cross connecting device 50. Thus, explanations for the OVPN terminating device 80, the network controlling device 60, and the optical cross connecting device 50 are omitted. Here, in the present embodiment, explanations are made for an SDH. More importantly, such explanations for the SDH can be applied to a case for a SONET.

A direction for the optical cross connecting device 50 is set by the network controlling device 40; thus, an OVPN is formed such that an SDH network is disposed among the base points.

In the first embodiment, the OVPN terminating device 30 is provided with converters 33 and 34 for converting a Gibabit Ethernet or an ATM as a first signal format which is employed in the user's devices 20-1, 20-2, and 21-1 and an SDH as a second signal format which is different from the first signal format which is employed in the OVPN mutually. A plurality of converters 33 and 34 are disposed so as to correspond to a plurality of different first signal formats. The optical switch 32 is controlled so as to determine which converters 33 or 34 to be used.

Here, if a signal format in the user's device and a signal format in the OVPN are the same as each other, it is not necessary to convert the signals; thus, it is possible to perform a communication without transmitting via the converters 33 and 34. Such a case is not explained in the present invention because it is not necessary to explain a technical feature of the present invention.

Also, even if a signal format in the user's device 20-1 and a signal format in the user's device 20-2 are different from each other, it is possible to use the OVPN if the signals can be converted. Here, in order to simplify the explanation, a case is explained in which the signal format is the same as each other.

That is, the OVPN terminating device 30 in the first embodiment is characterized to be provided with an optical switch controlling device 31 which contains a user's device 20-1 so as to register the first signal format type from the user's device which is used in the user's device 20-1 together with the IP address and the VPNID of the user's device and notify the contents of the registration to other OVPN terminating device 80 which manages the VPNID which is at least the same as that in the user's device 20-1. Also, the optical switch controlling device 31 retrieves the first signal format type which corresponds to the IP address and the VPNID of the user's device according to a call connecting request from the user's device 20-1 with reference to the registered information so as to select the first signal format which is used in the user's device 20-1 according to the retrieved result when data is transmitted from the user's device 20-1.

Next, operations in the present embodiment is explained with reference to FIGS. 3 to 5. Here, a database which is shown in FIGS. 3 to 5 is provided in the optical switch controlling devices 31 and 81 shown in FIG. 2.

According to a concept view shown in FIG. 3, VPNID is indicated by an "a" and "b". Also, the OVPN terminating devices 30-1, 30-2, 80-1, and 30-3 are provided in different groups in different VPNIDs.

In the first embodiment, when the user's device 20-11 registers a L1 signal type information which is used by the user's device 20-11 together with the IP address and the VPNID of the user's device 20-11 in the OVPN terminating device 30-1, the OVPN terminating device 30-1 notifies the registered contents to the other OVPN terminating devices 30-1 and 80-1 which belong to the same VPNID.

By doing this, the contents in the database in the OVPN terminating devices 30-1, 30-2, and 80-1 which have the same VPNID are synchronized. Also, a port identifier of the device which corresponds to at least a first signal format which is used in the user's device or an interface identifier is registered together with the IP address and the VPNID of the user's device in the database as shown in FIG. 3.

By doing this, when the OVPN terminating device receives a calling connection request from the user's device, the OVPN terminating device retrieves in the database such that the usable L1 signal type can be selected quickly. Also, the port identifier and the interface identifier are registered together with the IP address and the VPNID of the user's device; thus, it is possible to switch a direction in the optical switch 32.

Also, as shown in FIG. 5, if the OVPN terminating device 30-1 notifies an NMS (Network Management System) which is provided in the OVPN terminating device 30-1 of the contents in the database, the NMS can notify to the other OVPN terminating devices 80-1 and 30-2 which have the same VPNID.

Figure 6:
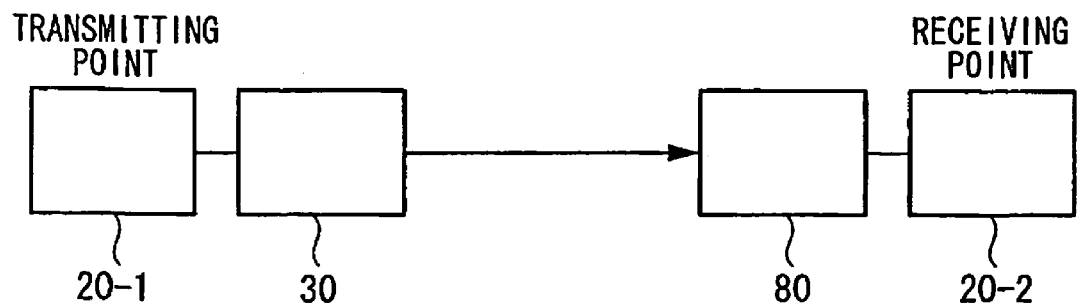
FIG. 6 shows a concept for operations in the OVPN in a second embodiment of the present invention.
Figure 7:
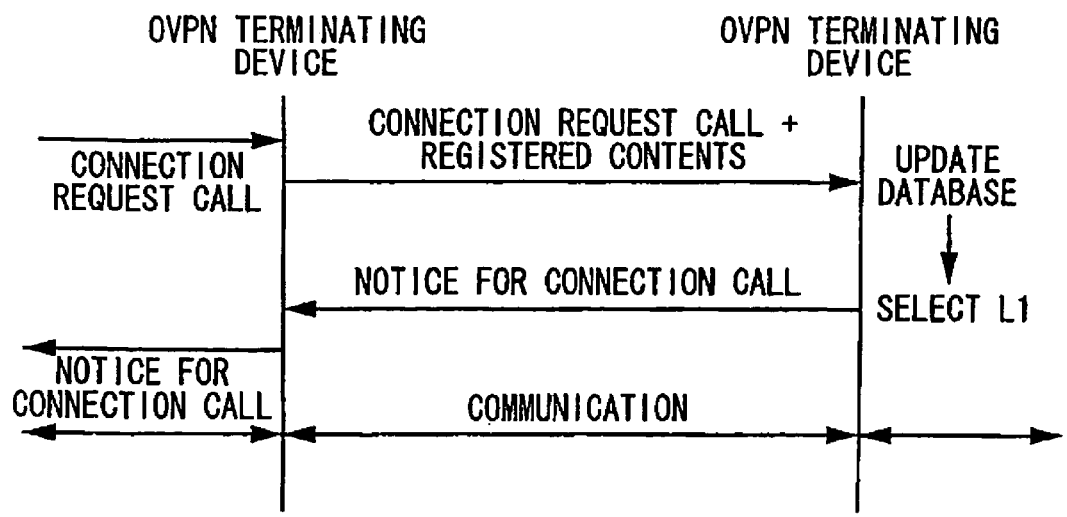
FIG. 7 shows a sequence diagram for operations in the OVPN in the second embodiment of the present invention.

A second embodiment is explained with reference to FIGS. 6 and 7. FIG. 6 is a general view for explaining operations in the second embodiment. FIG. 7 is a sequence diagram for operations in the second embodiment.

In the second embodiment, as shown in FIG. 6, the OVPN terminating device 30 notifies the other OVPN terminating device 80 which controls devices to which a calling connection is sent of the registered contents when the calling connection request arrives from the user's device 20-1. Also, the OVPN terminating device 30 has a function for selecting the first signal format which is used by the device which receives the calling connection request with reference to the registered contents which corresponds to the OVPN terminating device 80.

By doing this, the OVPN terminating device 30 receives the first signal form a type information which is used in the device which receives the calling connection request from the other OVPN terminating device 80 so as to respond to the notification and selects the first signal format type which is used by the user's device 20-1 based on the signal type information.

Figure 8:
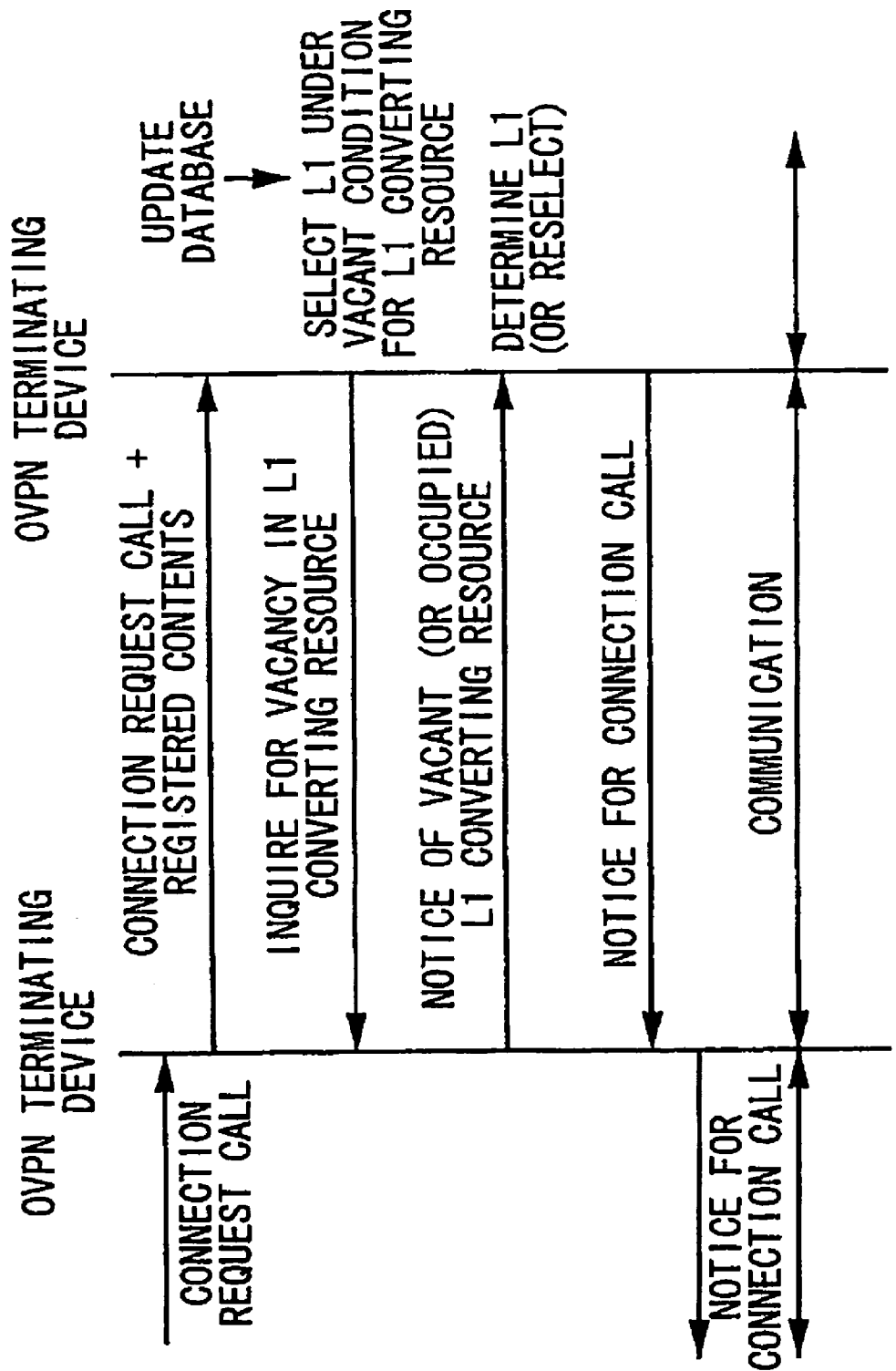
FIG. 8 shows a sequence diagram for operations in the OVPN in a third embodiment of the present invention.

That is, as shown in FIG. 7, when a calling connection request arrives at the OVPN terminating device 30 from the user's device 20-1, the OVPN terminating device 30 transmits the registered contents pertaining to the user's device 20-1 to the other OVPN terminating device 80 which receives the calling connection request. The OVPN terminating device 80 updates the database therein according to the transmitted registered contents. The OVPN terminating device 80 selects the L1 signal type which is used for a communication with the user's device 20-1 which transmits the calling connection request with reference to the updated database. A notification of the calling connection based on the selected L1 signal type is transmitted to the OVPN terminating device 30 which transmits the calling connection request. When the OVPN terminating device 30 which transmits the calling connection request receives the notification of the calling connection request, the OVPN terminating device 30 transfers the notification of the calling connection to the user's device 20-1 which transmits the calling connection request. By doing this, a communication network is set up between the user's device 20-1 which transmits the calling connection request and the device 20-1 which receives the calling connection request Third Embodiment A third embodiment is explained with reference to FIG. 8. FIG. 8 is a sequence diagram for operations in the third embodiment. The OVPN terminating device of the third embodiment notifies the registered contents to the other OVPN terminating device which manages the device which receives the calling connection request of the user's device when the calling connection requests arrives from the user's device. The OVPN terminating device selects the first signal format type which can be used the user's device which can correspond commonly between the other OVPN terminating device and the OVPN terminating device which notifies the registered contents. When the selected first signal format type is different from the second signal format type, these OVPN terminating devices retrieve the vacancy of the converter. The OVPN terminating devices select at least either one of converter which is not vacant commonly according to the retrieved result.

By doing this, the condition of the vacancy in the converter depends on the current usage condition of the resource in the OVPN or the current traffic condition. In such a case, both the device which transmits the calling connection request and the device which receives the calling connection request negotiate each other, thus, it is possible to realize an optimum L1 converting resource. After the optimum L1 converting resource is realized, the calling connection request is transmitted so as to start the communication.

Figure 9:
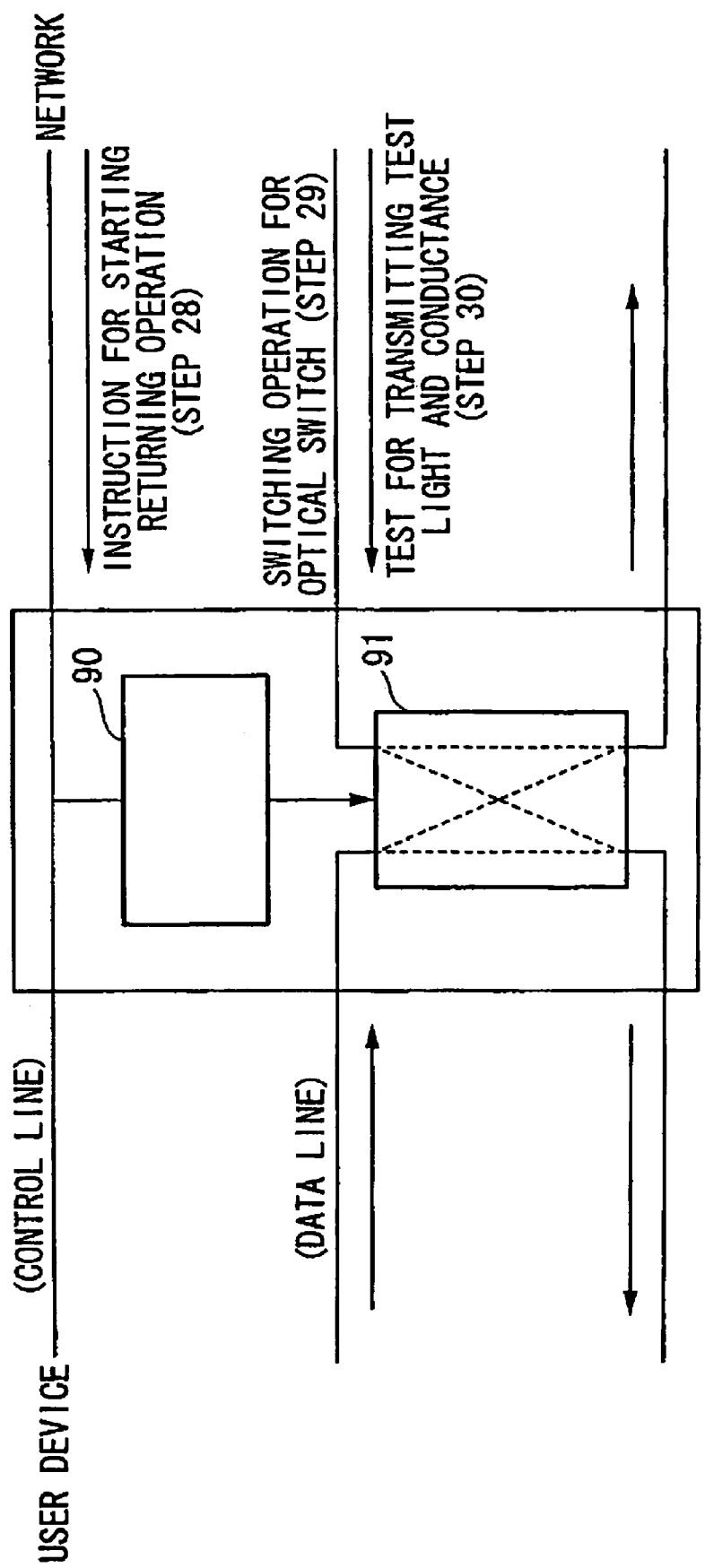
FIG. 9 is a view for explaining a separating test performed in a fourth embodiment.

A fourth embodiment is explained with reference to FIG. 9. FIG. 9 is a general view for a testing device in a base point device according to the fourth embodiment. The testing device shown in FIG. 9 is disposed in the base point device. The testing device shown in FIG. 9 is provided with a return controlling device 90 for separating the user's device 20-1 and the OVPN and returning a test beam which is transmitted from the OVPN and an optical switch 91.

Fifth Embodiment

Figure 10:
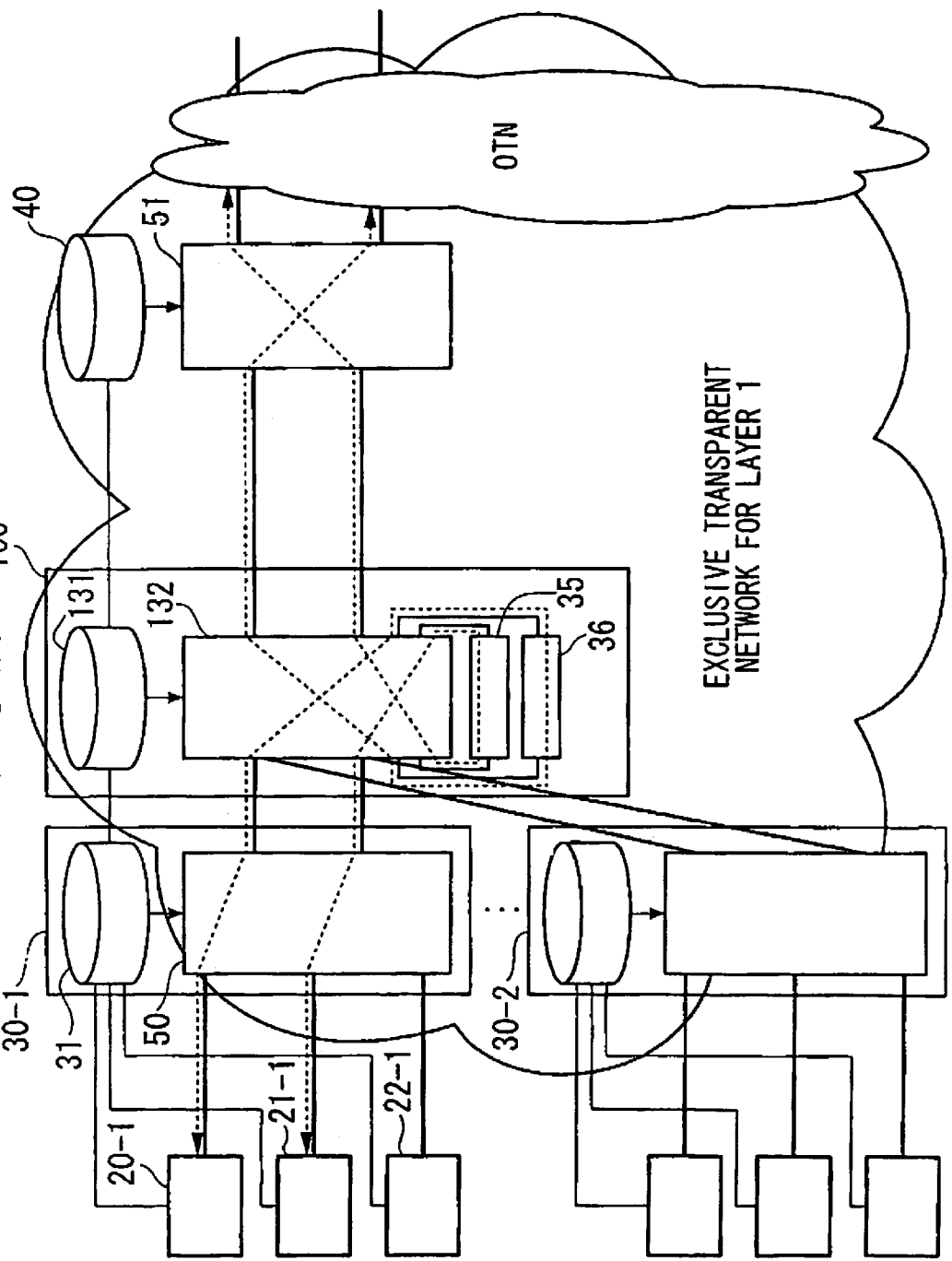
FIG. 10 is a view for an example for a structure of a collective converting device according to a fifth embodiment.

A fifth embodiment is explained with reference to FIG. 10. FIG. 10 is a view for explaining a structure for an OVPN according to the fifth embodiment. In the OVPN shown in FIG. 10, converters 34 and 35 are not provided in the OVPN terminating devices 30-1 and 30-2. Instead, a collective converting device 100 is provided in the OVPN. Also, an optical switch controlling device 131, an optical switch 132, and converters 34 and 35 are provided in the collective converting device 100 such that a plurality of OVPN terminating devices 30-1 and 30-2 can use the converters 34 and 35 commonly.

Figure 11:
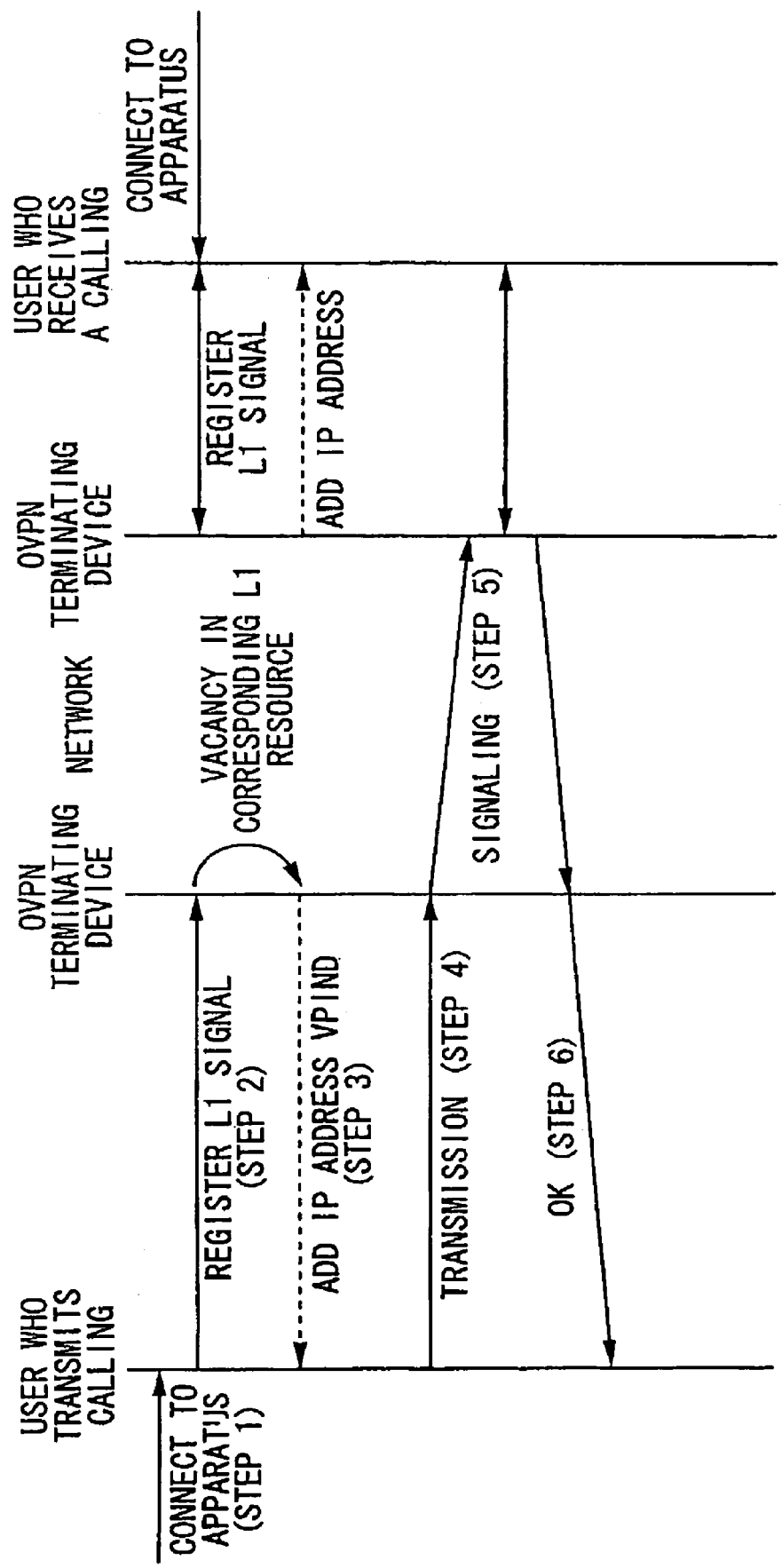
FIG. 11 is a sequence diagram for setting up a network according to a sixth embodiment.
Figure 12:
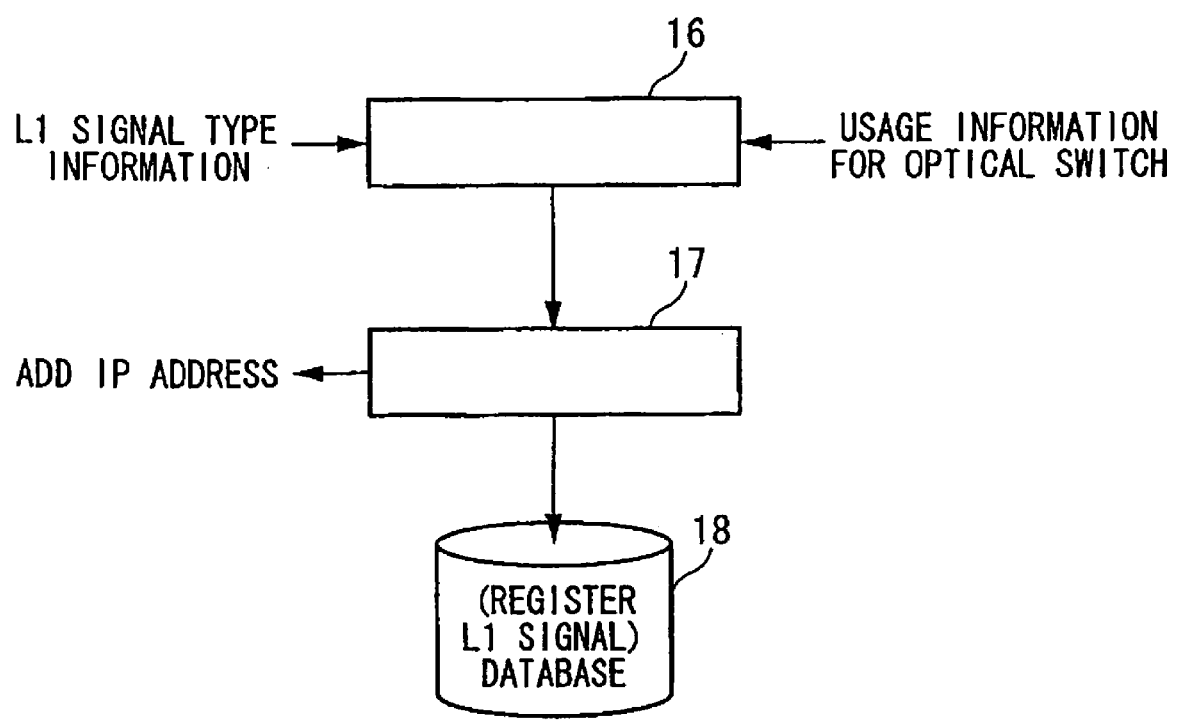
FIG. 12 is a block diagram for an optical switch controlling device according to sixth embodiment.
Figure 13:
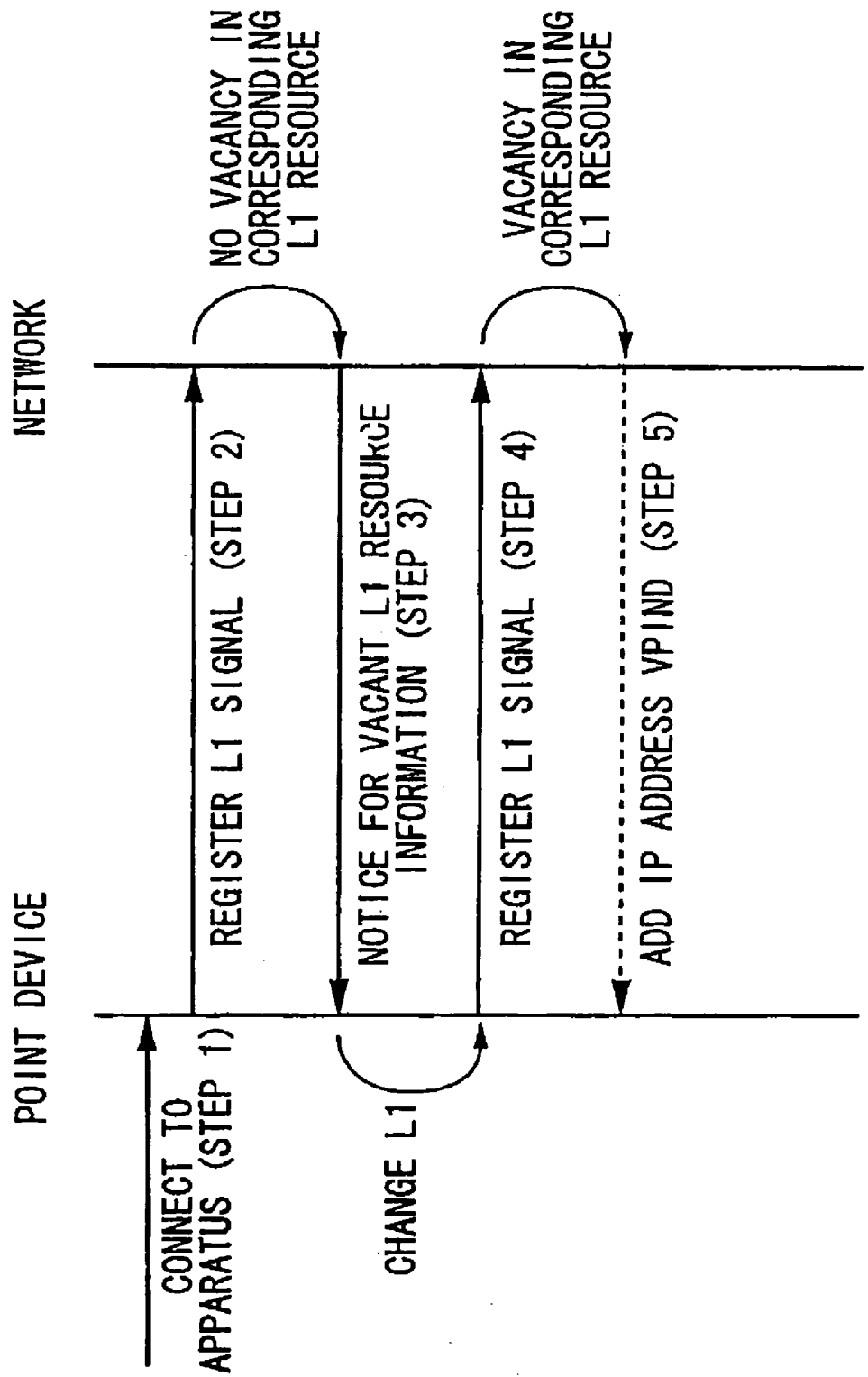
FIG. 13 is a sequence diagram for setting up a network according to a sixth embodiment.

Here, in such a case in which a plurality of collective converting devices are provided, a collective converting device which is disposed nearest to the OVPN terminating device is selected. In such a case, if the collective converting device which is disposed nearest to the OVPN terminating device is occupied, a collective converting device which is selected among the rest of the devices which are disposed to the OVPN terminating device Sixth Embodiment A sixth embodiment is explained with reference to FIGS. 2, and 11 to 13. FIG. 2 is a view for explaining a structure for the OVPN according to the first embodiment. FIGS. 11 and 13 are sequence diagrams for setting up a network according to the sixth embodiment. FIG. 12 is a block diagram for an optical switch controlling device according to the sixth embodiment.

Next, operations in the sixth embodiment is explained with reference to FIGS. 11 and 12. Here, explanation is made for a case in which a user's device 20-1 is connected to the OVPN terminating device 30. When the user's device 20-1 is connected (step 1) to a network connecting terminal which is disposed in the OVPN terminating device 30 which is disposed near the user who transmits the calling connection request, the user's device 20-1 registers the L1 signal which is used in the user's device 20-1 for the optical switch controlling device 31 (step 2). The user's device 20-1 notifies the L1 signal type information which is used in the user's device 20-1 to a signal conversion determining section 16 in the optical switch controlling device 31 via a control line. The L1 signal type information which can be converted by the converters 33 and 34 and a usage condition information for an optical switch 32 are inputted in the signal conversion determining section 16. Thus, the signal conversion determining section 16 acknowledges the vacancy condition in the converters 33 and 34. The signal conversion determining section 16 determines whether or not the L1 signal type which is desired by the user's device 20-1 can be available presently with reference to the L1 signal type information which is notified from the user's device 20-1 and the usage condition information which is inputted from the optical switch 32

Here, two cases can be indicated for determining "whether or not L1 signal type which is desired by the user's device 20-1 can be available presently". One is a case in which the OVPN is not provided with a converting function initially. Another is a case in which the OVPN is provided with a converting function but the converting function is performed in the other OVPN. In the former case, it is acceptable to determine that the L1 signal type cannot be used. However, in the latter case, it is acceptable to tentatively determine that the L1 signal type can be used so as to await the resource to be usable. In the latter case, a determining standard for whether determining that the L1 signal type cannot be used or tentatively determining that the L1 signal type can be used depends on the usage condition of the OVPN. That is, if the usage condition is that the user starts immediately after the registration is completed, it is determined that the L1 signal type cannot be used even in a case in which the converting resource is provided by occupied. Also, under a usage condition in which actual communication starts after a certain period of time after the registration is completed by the user it is determined that the L1 signal type can be used if the converting resource is provided notwithstanding that it is occupied.

If it is usable (there is a corresponding L1 resource), an IP address and a VPNID which do not overlap other user's device are generated by an address generating section 17. The generated IP address and the VPNID are notified to the user's device 20-1. Furthermore, the generated IP address, VPNID, the corresponding IP address, and the L1 signal type which is used in the user's device 20-1 of the VPNID are recorded in the database 18 (step 3).

By doing this, the user's device 20-1 transmits to the network (step 4) by the L1 signal type which the user's device 20-1 desires. In such a case, the IP address and the VPNID are generated in the user who receives the calling connection request in a similar manner. The user's device 20-1 transmits the calling connection request by designating the IP address to which the calling connection request should be arrived. By doing this, a signaling operation is performed to the user who receives the calling connection request (step 5); thus, a setting-up operation for the network is completed (step 6).

In this case, when the OVPN terminating device 30 receives the calling connection request from the user's device 20-1, the OVPN terminating device 30 selects the signal format which is used by the user who receives the calling connection request based on the first signal format type information which is registered which is applied to the user's device 20-1 for the IP address from which the calling connection request is transmitted from which is contained in the calling connection request. The selected signal format information is transmitted to the user who receives the calling connection request together with the calling connection request.

Here, it is acceptable if a encapsulating section is provided in place of the converters 33 and 34 such that the first signal format #1 which is transmitted from the user's devices 20-1 and 21-1 should be encapsulated by the second signal format #2 so as to be transmitted to the SDH network, and a signal which is encapsulated by the second signal format #2 which is transmitted from the SDH network is de-encapsulated by the first signal format #1 so as to be transmitted to the user's device 20-2.

As shown in FIG. 13, if there is not a vacant L1 resource for registering the L1 signal from the user's device (step 2), information for the L1 resource which indicates that other resource is vacant is notified to the user's device (step 3). If it is possible to change the L1, the user's device changes the L1 and registers the changed L1 signal (step 4). If there is a vacant L1 resource for the changed L1 signal, as explained above, the IP address and the VPNID are generated. Here, if it is not possible to change the L1 for the user's device, the user's device registers the L1 after a certain period of time. Alternatively, the user's device changes the L1 so as to register again.

Seventh Embodiment

Figure 14:
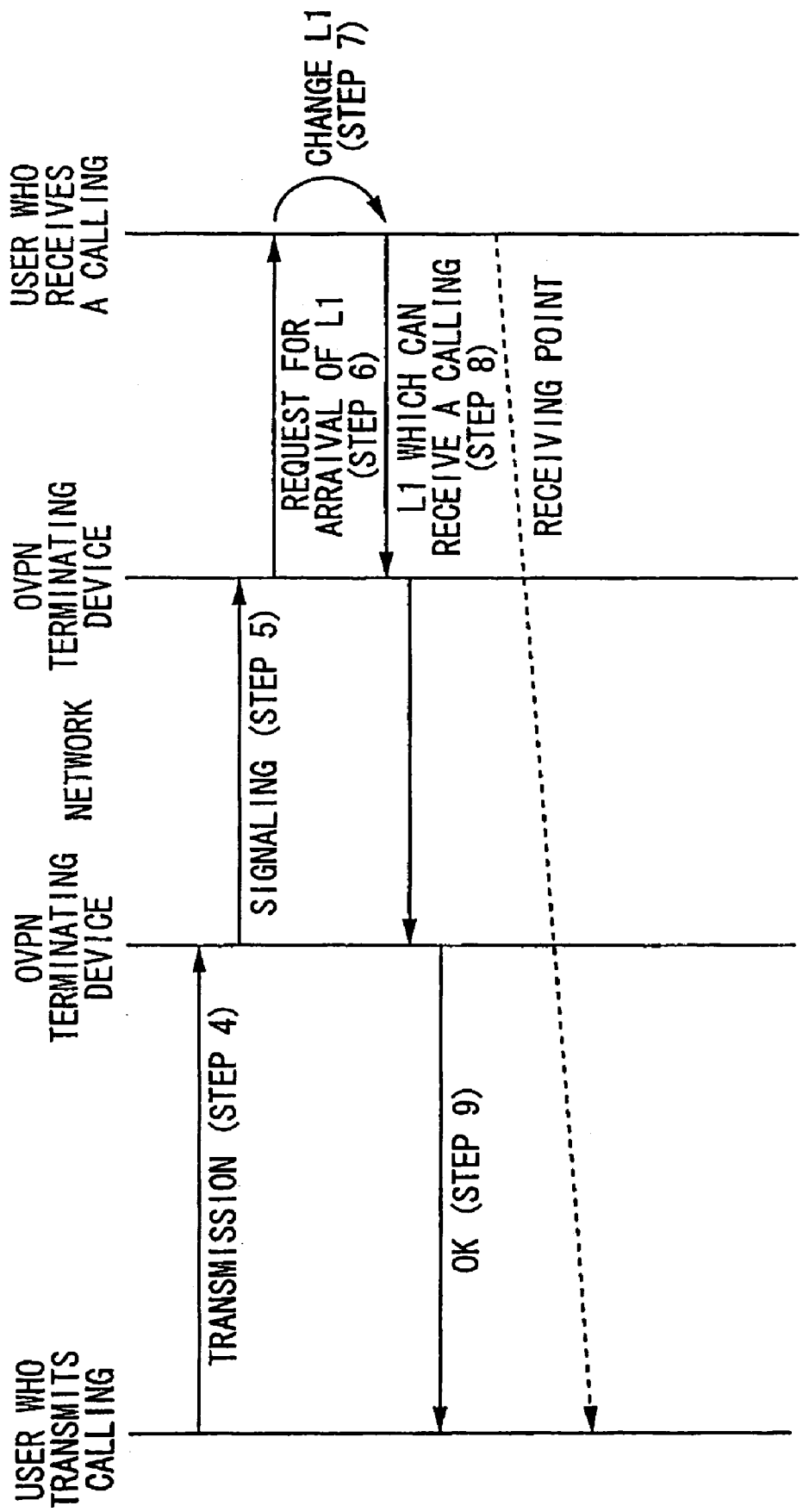
FIG. 14 is a sequence diagram for setting up a network according to a seventh embodiment.

A seventh embodiment is explained with reference to FIG. 14. FIG. 14 is a sequence diagram for explaining a setting-up steps for a network according to the seventh embodiment. Here, explanations are made for focusing the user's device 20-1. The steps from the step 1 to the step 3 are the same as those in the sixth embodiment; explanations and drawings are omitted so as to avoid duplicated explanation. When the OVPN terminating device 30 receives the calling connection request (transmission) from the user's device 20-1 (step 4), the calling connection request to the user who receives the calling connection request at the IP address to which the calling connection request is transmitted which is contained in the calling connection request is transmitted (step 5) together with the first signal format type information which is registered and applied to the user's device 20-1. The user who receives the calling connection request determines whether or not the received calling connection request is the same as the signal format which can be received by the user with reference to the format type information. If it is determined that it is possible to receive, a communication starts as explained in the first embodiment. If it is determined that it is not possible to receive the calling connection request, the user who receives the calling connection request changes the signal format in a receivable form (step 7) so as to notify that it is possible to receive the calling connection request to the user who transmits the calling connection request (steps 8 and 9). Thus, the user who receives the calling connection request can receive the signal from the user's device 20-1 by the L1 which is receivable for the user who receives the calling connection request.

If there is not a signal format which is receivable by the user who receives the calling connection request, information for indicating that there is not a signal format which is receivable by the user who receives the calling connection request is transmitted to the user's device 20-1 as a response to the calling connection request as indicated by a broken line. In such a case, the user's device 20-1 does not have function for receiving the signal format which is returned as a response from the user who receives the calling connection request; thus, the OVPN terminating device 30 receives the response so as to notify that the network is not set up successfully due to that the signal format do not coincide each other to the user's device 20-1.

Figure 15:
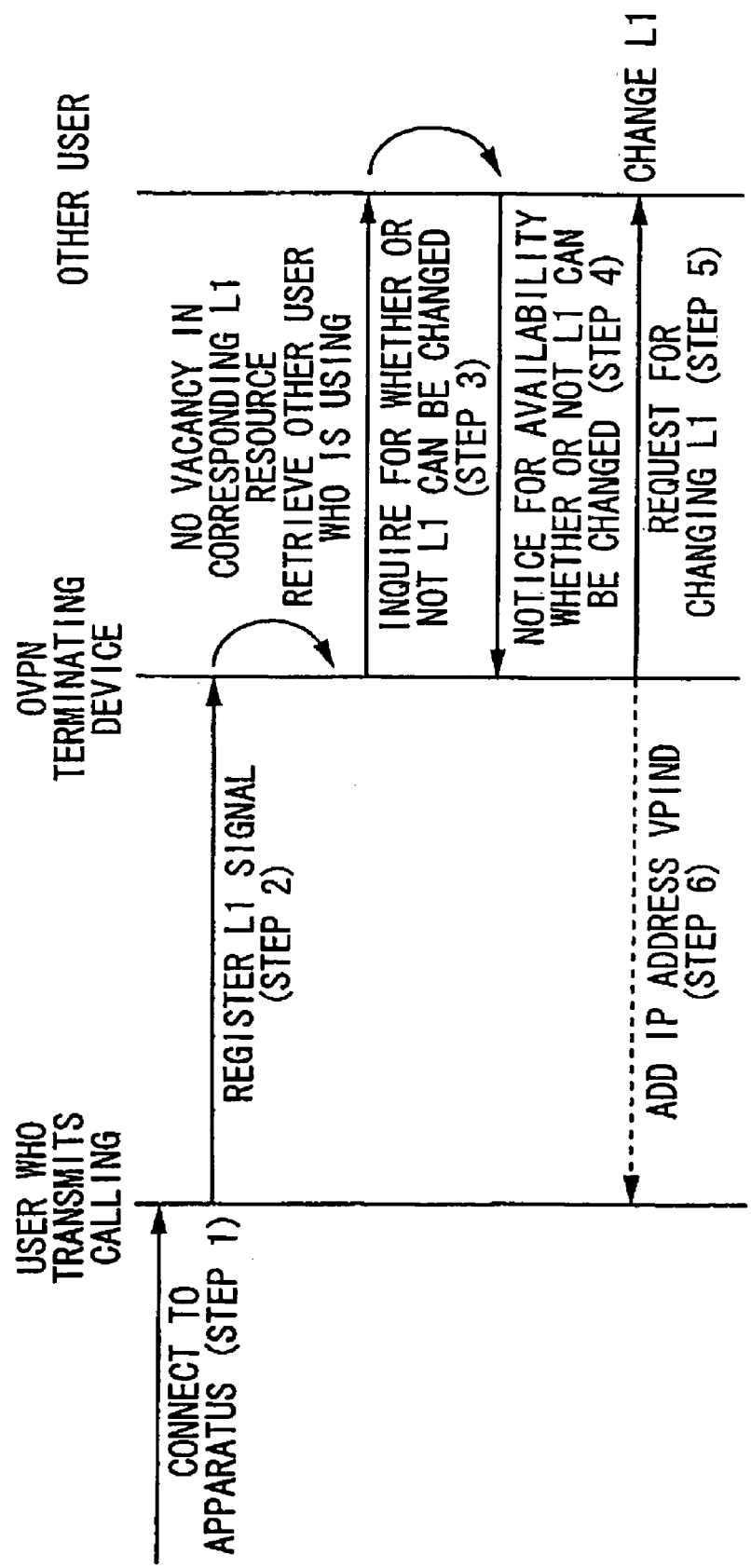
FIG. 15 is a sequence diagram for setting up a network according to an eighth embodiment.

An eighth embodiment is explained with reference to FIG. 15. FIG. 15 is a sequence diagram for explaining a setting-up steps for a network according to the eighth embodiment. In the eighth embodiment, when the L1 signal of the user's device 20-1 is registered (step 2) and a retrieved result indicates that "there is not a desired L1 resource" according to the current usage condition for the optical switch, the OVPN terminating device 30 retrieves other user's device which is using the L1 resource and inquires whether or not it is possible to change to other vacant L1 resource to the other user's device (step 3). If such an inquiry result indicates that it is possible to change to other vacant L1 resource (step 4), the OVPN terminating device 30 requests to the other user's device to change the L1 resource and generates the IP address and the VPNID for the user's device 20-1 (steps 5 and 6).

Figure 16:
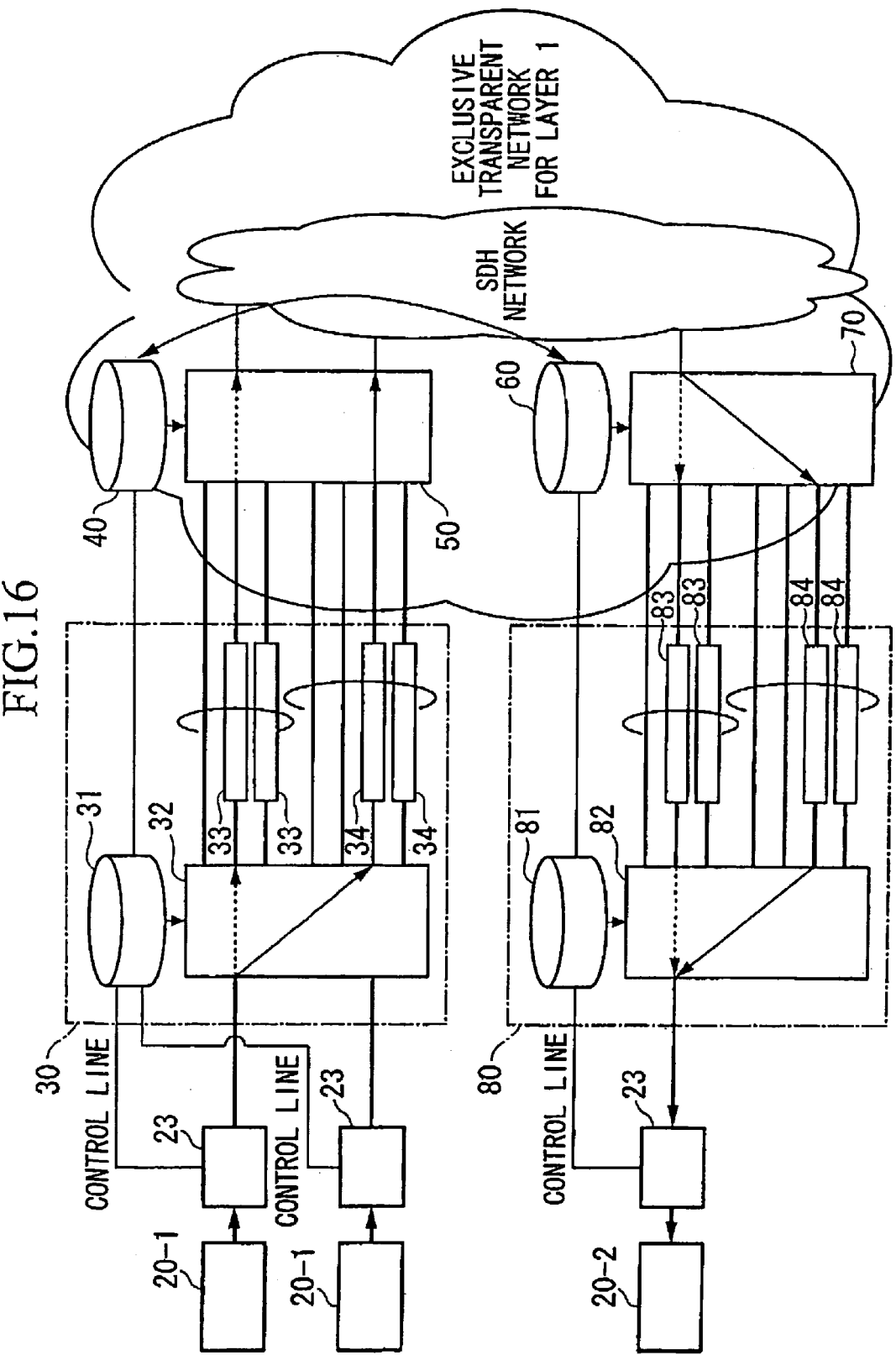
FIG. 16 is a view for explaining a structure in an OVPN according to a ninth embodiment.
Figure 17:
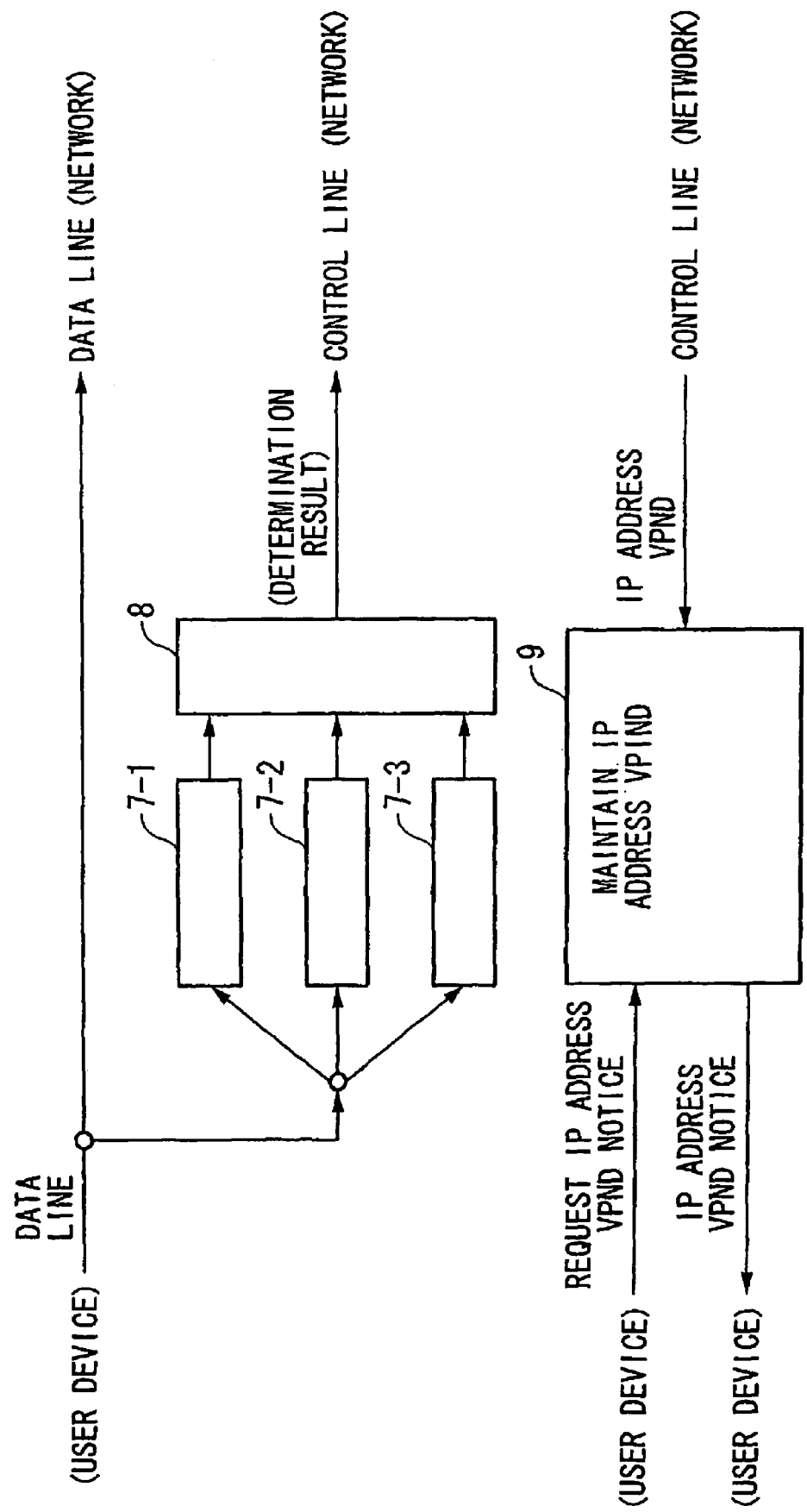
FIG. 17 is a view for explaining a base point device according to the ninth embodiment.

A ninth embodiment is explained with reference to FIGS. 16 and 17. FIG. 16 is a view for a structure of an OVPN according to the ninth embodiment. FIG. 17 is a block diagram for a base point device according to the fourth embodiment. According to the ninth embodiment, the OVPN terminating device 30 is provided with a base point device 23 which identifies the first signal format type which is transmitted from the users devices 20-1 and 21-1. An optical switch controlling device 31 determines whether or not it is possible to convert the signal as explained in the first embodiment based on the identified result conducted by the base point device 23 and generates the IP address and the VPNID, and performs the registration therefor.

FIG. 17 shows a structure of the base point device 23. The base point device 23 is provided with a plurality of error detecting sections 7-1 to 7-3, and a signal determining section 8. The error detecting sections 7-1 to 7-3 are disposed so as to perform a simulation for calculation for a particular signal format. In such a simulation for calculation, a signal format which is except a particular kind of signal format causes error. The signal determining section 8 monitors a result in the simulation for calculation which is performed by the error detecting sections 7-1 to 7-3. By detecting any error detecting sections 7-1 to 7-3 in which error does not occur, an inputted signal format type is specified. Such a determined result is notified to the optical switch controlling device 31. The steps thereafter are the same as those explained in the sixth embodiment.

An address maintaining section 9 is provided so as to maintain the IP address and the VPNID which are generated for the users device 20-1; thus, the IP address and the VPNID are notified according to an inquiry from the users device 20-1.

Here, for other method for determining the signal format type, there is a following method. In this method, inputted signals are inputted into the converters 33 and 34 by the optical switch 32 so as to monitor an occurrence of error. If any converter 33 or 34 in which an error does not occur is found, it is possible to determine that the signal format which is handled in such a converter is the signal format of the inputted signal.

Tenth Embodiment

Figure 18:
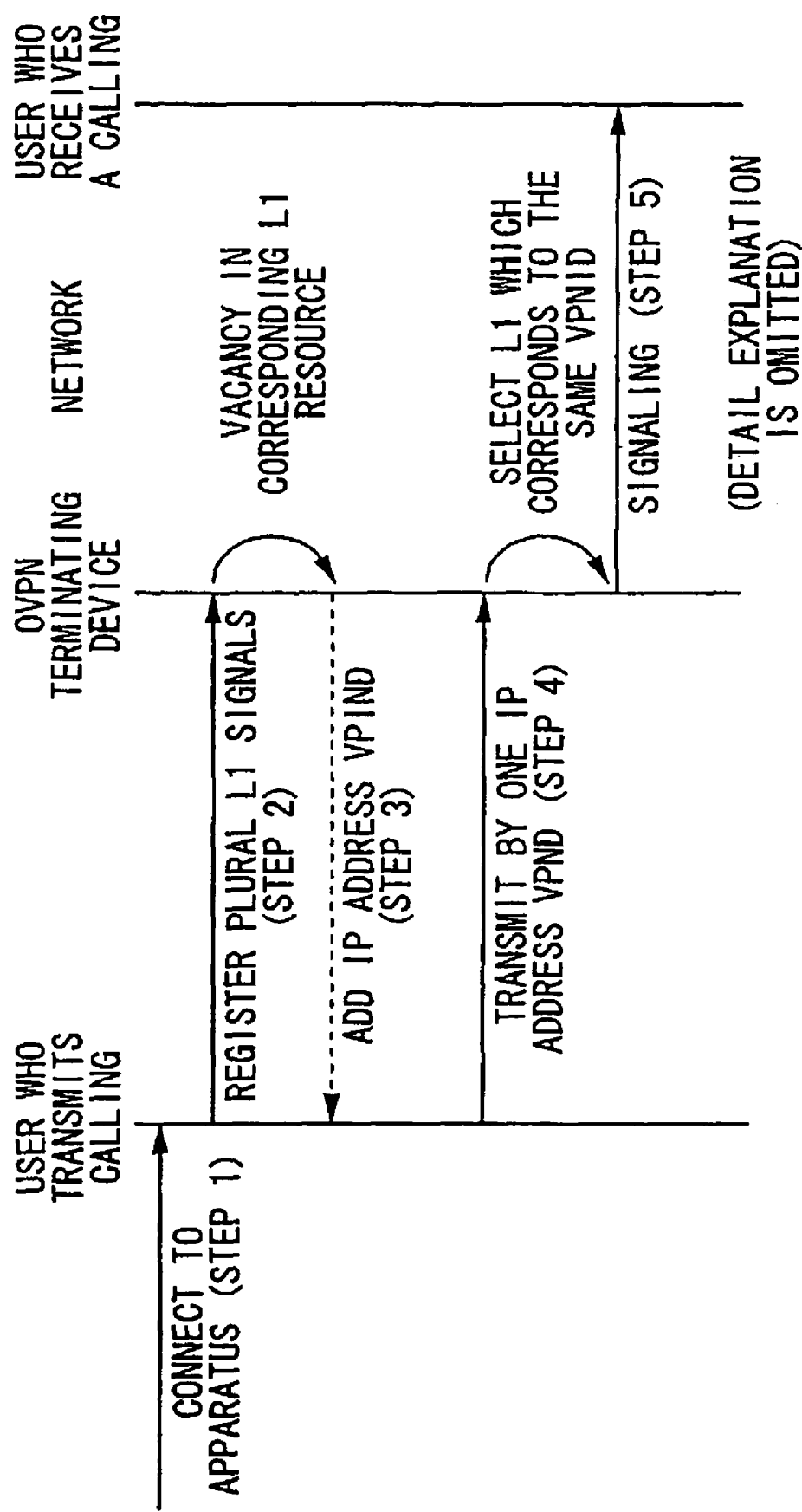
FIG. 18 is a sequence diagram for setting up a network according to a tenth embodiment.

A tenth embodiment is explained with reference to FIG. 18. FIG. 18 is a sequence diagram for setting up a network according to the tenth embodiment. In the tenth embodiment, the user's device 20-1 can register a plurality of L1 signals which can be applied in the user's device 20-1. When the user's device 20-1 registers a plurality of L1 signals (step 2), the signal conversion determining section 16 acknowledges vacancy in the L1 resource with reference to the current condition information for the usage of the optical switch. If it is indicated as "vacant" for the L1 signal, a corresponding IP address and a VPNID are generated (step 3). That is, an IP address is generated to an L1 signal type.

The user's device 20-1 transmits the calling connection request by using the IP address which corresponds to the L1 signal so as to perform communication by selecting an L1 signal among a plurality of L1 signals which are usable for the user's device 20-1. The OVPN terminating device 30 acknowledges the L1 signal which corresponds to the IP address and changes a direction of the optical switch 32 to a predetermined direction.

Also, the address maintaining section 9 which is explained as a base point device shown in FIG. 8 maintains the VPNID and a plurality of IP addresses together with a plurality of L1 signal format information which correspond to the IP addresses.

Eleventh Embodiment

Figure 19:
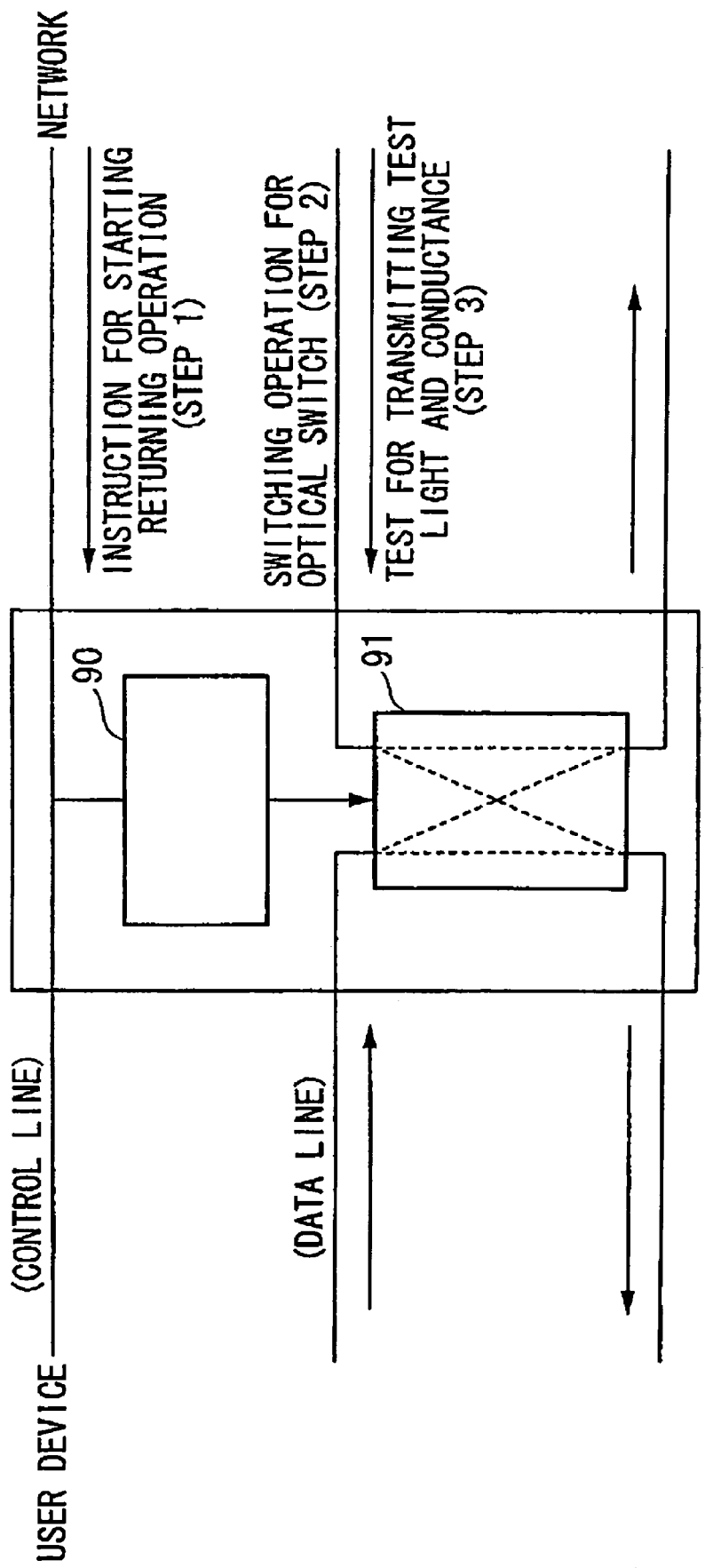
FIG. 19 is a view for explaining a base point device according to an eleventh embodiment.

An eleventh embodiment is explained with reference to FIG. 19. FIG. 19 is a view for a structure of a testing device in a base point device according to the eleventh embodiment. The testing device shown in FIG. 19 is disposed in the base point device so as to separate the user's device 20-1 and the OVPN. The testing device is also provided with a returning controlling device 90 for returning a test beam which is transmitted from the OVPN back to the OVPN and an optical switch 91.

Twelfth Embodiment

Figure 20:
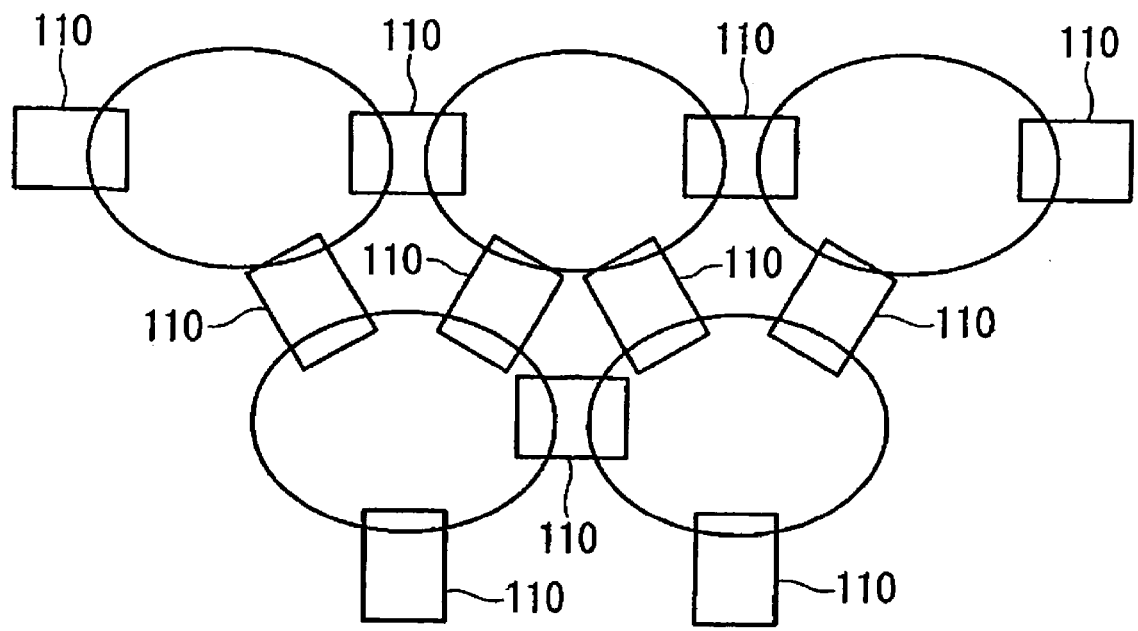
FIG. 20 is a view for explaining a structure in an OVPN according to a twelfth embodiment.

A twelfth embodiment is explained with reference to FIG. 20. FIG. 20 is a view for explaining a structure for the OVPN according to the twelfth embodiment. A plurality of sub-OVPNs are connected each other in the OVPN shown in FIG. 20. L1 signal converting devices 110 are disposed among all of the sub OVPNs; thus, it is possible to handle a plurality of L1 signal type while converting the L1 signal. The L1 signal converting device 110 is the same as the optical switch controlling device 31, an optical switch 32, a converters 35 and 36 in the OVPN terminating device.

Thirteenth Embodiment

Figure 21:
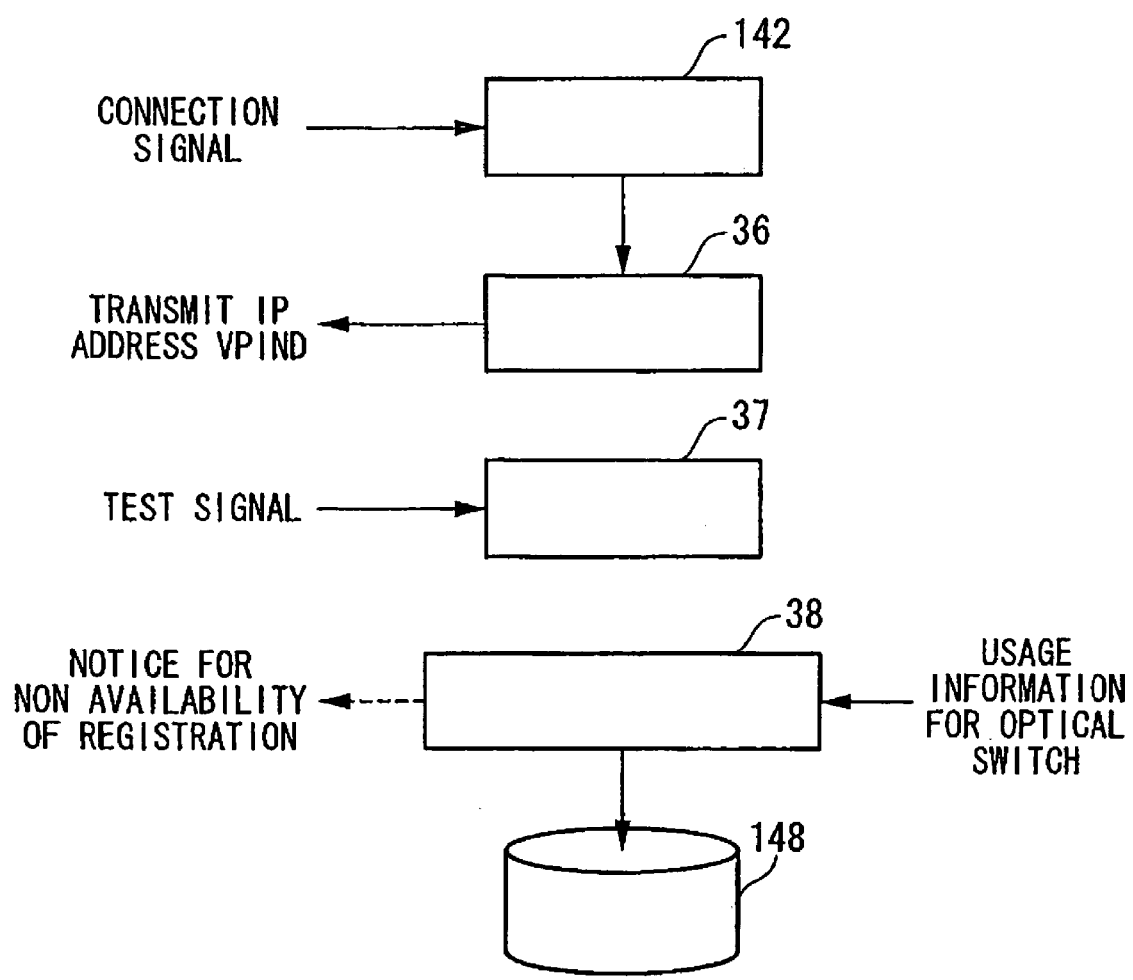
FIG. 21 is a block diagram for an optical switch controlling device according to a thirteenth embodiment.
Figure 22:
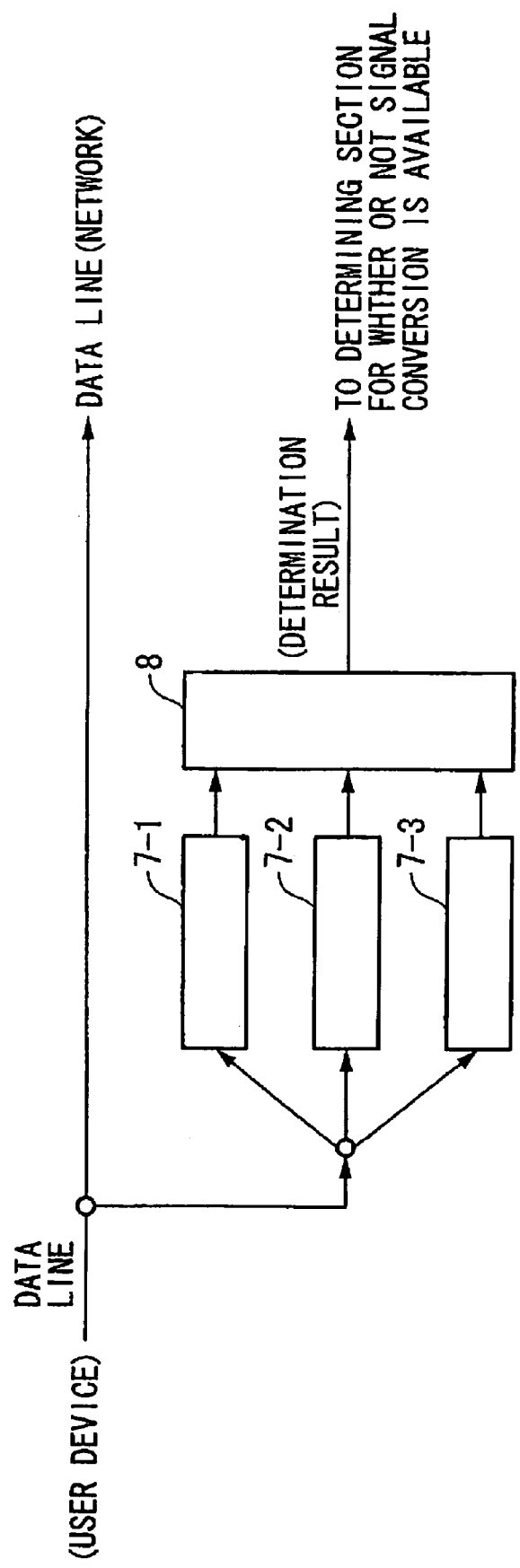
FIG. 22 is a block diagram for a signal determining section according to the thirteenth embodiment.
Figure 24:
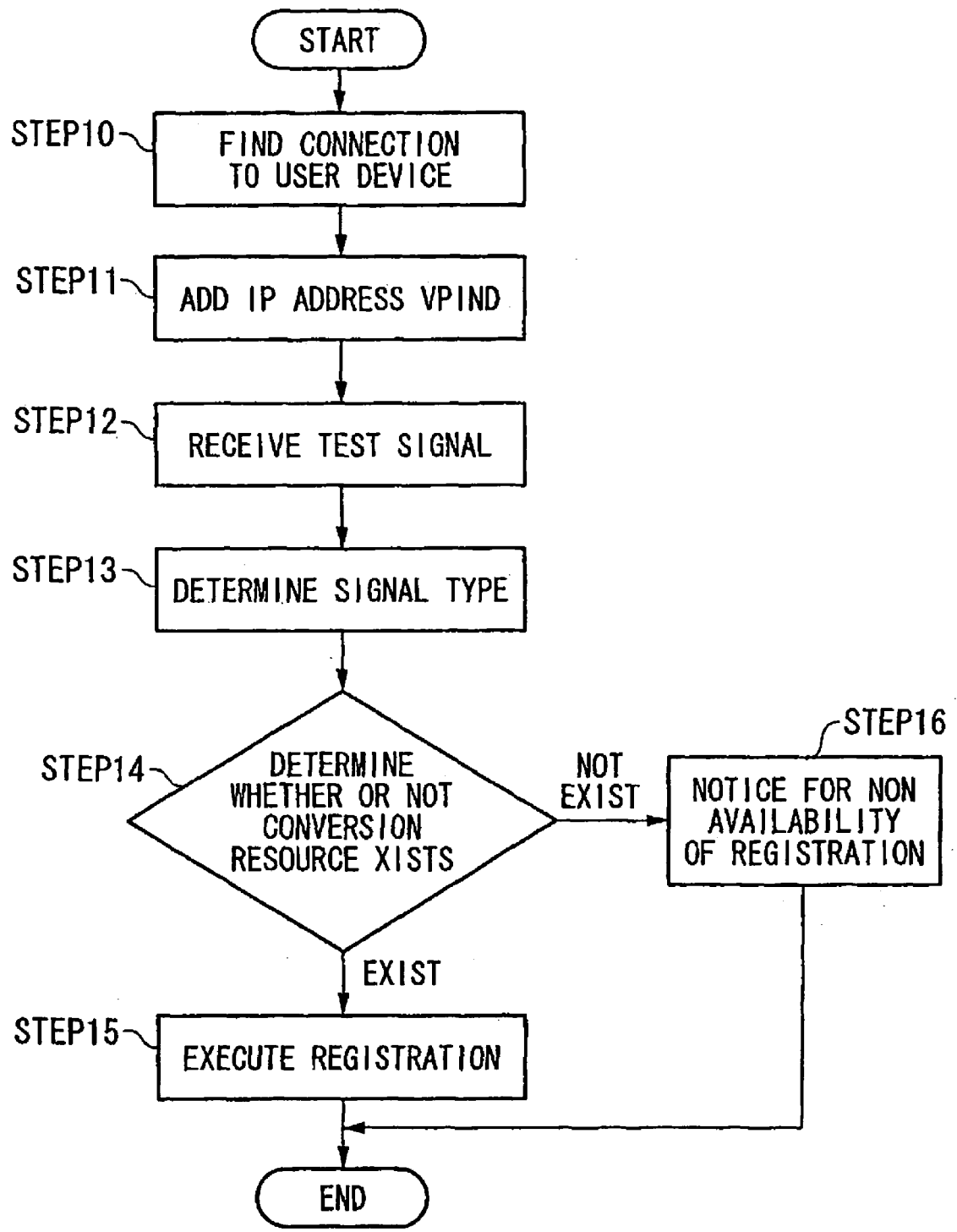
FIG. 24 is a flow chart for showing operations in an OVPN terminating device according to the thirteenth embodiment.

A thirteen embodiment is explained with reference to FIGS. 2, and 21 to 24. FIG. 2 is a view for a structure of the OVPN according to the thirteenth embodiment. FIG. 21 is a block diagram for an optical switch controlling device according to the thirteen embodiment. FIG. 22 is a block diagram for a signal determining section according to the thirteenth embodiment. FIG. 23 is a view for showing a registering pattern for database according to the thirteenth embodiment. FIG. 24 is a flow chart for showing operations in the thirteenth embodiment.

That is, the OVPN terminating device 30 according to the present embodiment is provided with converters 33 and 34 for converting the first signal format and the second signal format alternately when the first signal format which is used in the user's device 20-1 which belongs to an OVPN subscriber and the second signal format which is used in the OVPN are different from each other. The converters 33 and 34 are provided with a plurality of connection detecting sections 142 which contains the user's device 20-1 of the OVPN subscriber so as to correspond to a plurality of different first signal format and detect whether or not the user's device 20-1 is connected thereto as shown in FIG. 2, an address generating section 154 for generating the IP address and the VPNID to the user's device 20-1 by the control channel when the detected result indicates that the user's device 20-1 is connected thereto, a signal determining section 37 for receiving at least a test signal which is transmitted via the data channel from the user's device 20-1 by using the IP address so as to determine at least a first signal format type which belongs to the user's device 20-1, and a signal conversion determining section 38 for retrieving whether or not there are converters 33 and 34 which correspond to the format type information according to the determined result by the signal determining section 37 when the first signal format type which is used in the user's device 20-1 is different from the second signal format type. The signal conversion determining section 38 is characterized in registering the IP address and the VPNID which are generated by the address generating section 154 and the first signal format type information which is determined by the signal determining section 37 which is applied to the user's device 20-1 for which the IP address and the VPNID are generated in to a database 148 when the retrieved result indicates that the user's device 20-1 is connected thereto.

FIG. 22 shows a structure for the signal determining section 37. The signal determining section 37 is provided with error detecting sections 7-1 to 7-3 and a signal determining device 8. The error detecting sections 7-1 to 7-3 are disposed so as to perform a simulation for calculation for a particular signal format. In such a calculation simulation process, a signal format which is except a particular kind of signal format causes error. The signal determining section 8 monitors a result in the calculation simulation process which is performed by the error detecting sections 7-1 to 7-3. By detecting any error detecting sections 7-1 to 7-3 in which error does not occur, an inputted signal format type is specified. Such a determined result is notified to the signal conversion determining section 38.

An address maintaining section, 9 is provided so as to maintain the IP address and the VPNID which are generated for the users device 20-1; thus, the IP address and the VPNID are notified according to an inquiry from the users device 20-1.

Figure 29:
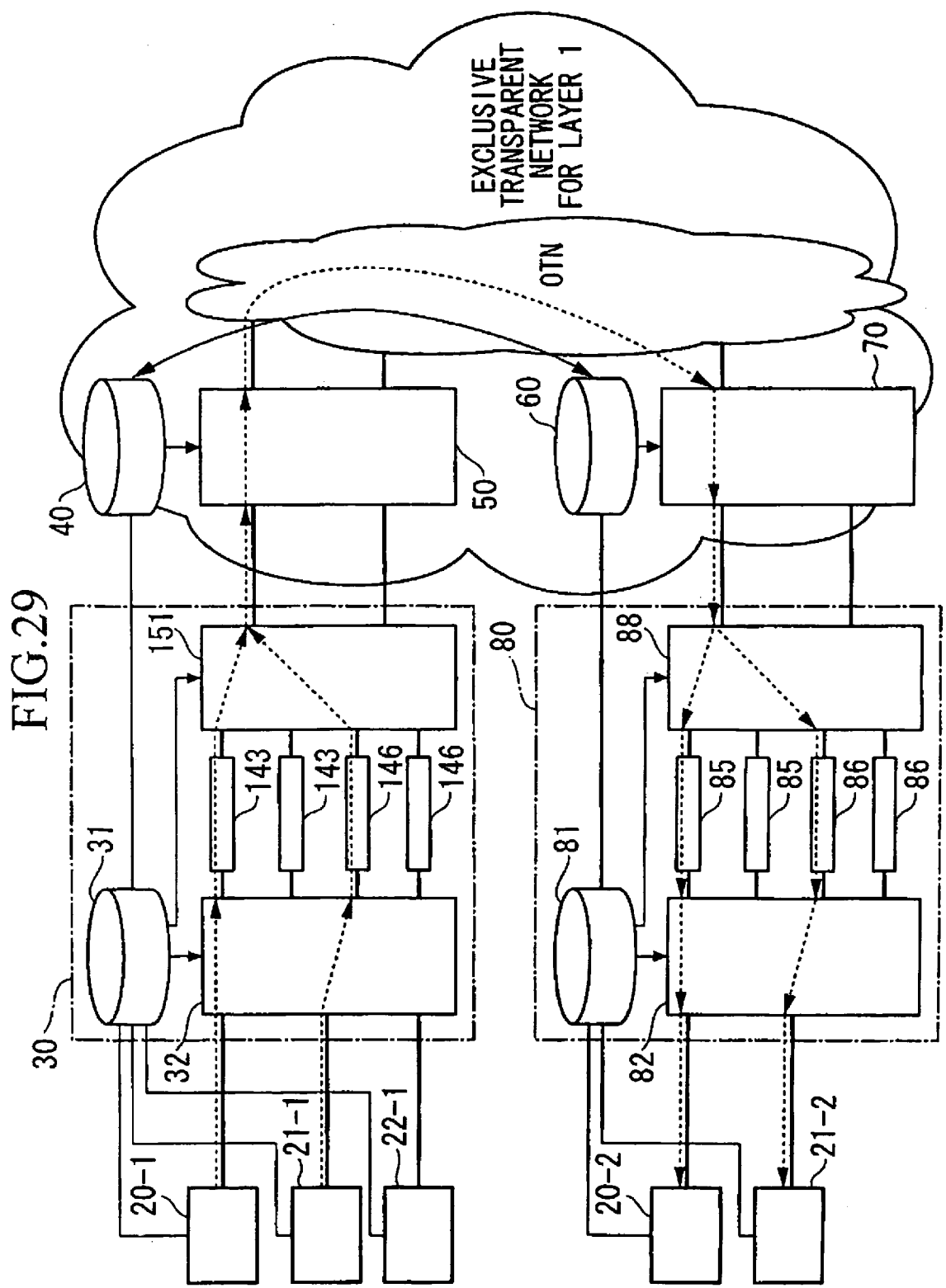
FIG. 29 is a view for explaining a structure of an OVPN according to a seventeenth embodiment and a twenty-third embodiment.

In such a case, as shown in FIG. 29, the signal conversion determining section 38 registers a port identifier for the signal conversion determining section 38 which corresponds to at least the first signal format which is used in the user's device 20-1 and an interface identifier into a database 148. By doing this, it is possible to set a direction of the optical switch 32 by the port identifier and the interface identifier.

Here, for other method for determining the signal format type, there is a following method. In this method, inputted signals are inputted into the converters 33 and 34 by the optical switch 32 so as to monitor an occurrence of error. If any converter 33 or 34 in which an error does not occur is found, it is possible to determine that the signal format which is handled in such a converter is the signal format of the inputted signal.

Next, operations in the thirteenth embodiment is explained with reference to FIG. 23. When a connection detecting section 142 shown in FIG. 21 detects that the user's device 20-1 is connected (step 10), the address generating section 154 generates the IP address and the VPNID so as to transmit to the user's device 20-1 (step 11). When the user's device 20-1 receives the IP address and the VPNID, the user's device 20-1 transmits a test signal to a data line by using the IP address. The signal determining section 37 receives the test signal (step 12) so as to determine the signal type (step 13). After the signal type is determined in such a manner, the determined result is notified to the signal conversion determining section 38; thus, it is determined whether of not there is a converting resource (step 14). If it is determined that there is a converting resource (step 14), a registering operation is performed to the database 148. If it is determined that there is not a converting resource (step 14), it is notified to the user's device 20-1 that it is not possible to perform a registering operation (step 16).

Here, there are two cases in which it is determined that there is not a converting resource by the signal conversion determining section 38. One is a case in which the OVPN is not provided with a converting resource initially. Another is a case in which the OVPN is provided with a converting resource but the converting resource is occupied in the other OVPN. In the former case, it is acceptable to determine that there is not a converting resource. However, in the latter case, it is acceptable to tentatively determine that there is a converting resource and await until the resource is vacant. In the latter case, a determining standard for whether instantly determining that there is not a converting resource or tentatively determining that there is a converting resource so as to await depends on the usage condition of the OVPN. That is, if the usage condition is that the user starts immediately after the registration is completed, it is determined that the L1 signal type cannot be used even in a case in which the converting resource is provided by occupied. Also, under a usage condition in which actual communication starts after a certain period of time after the registration is completed by the user it is determined that the L1 signal type can be used if the converting resource is provided notwithstanding that it is occupied.

Fourteenth Embodiment

Figure 25:
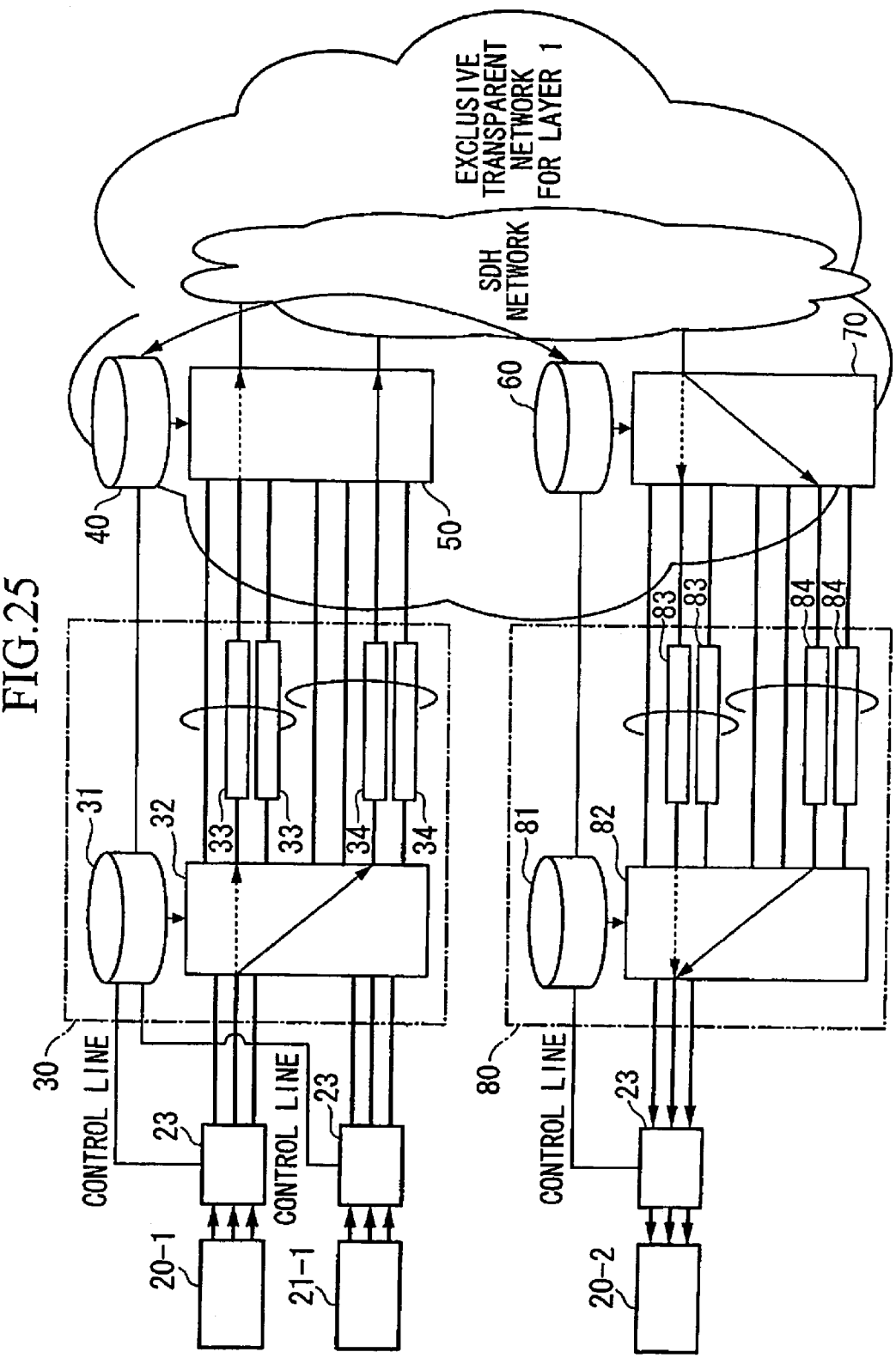
FIG. 25 shows the OVPN for a fourteenth embodiment.
Figure 26:
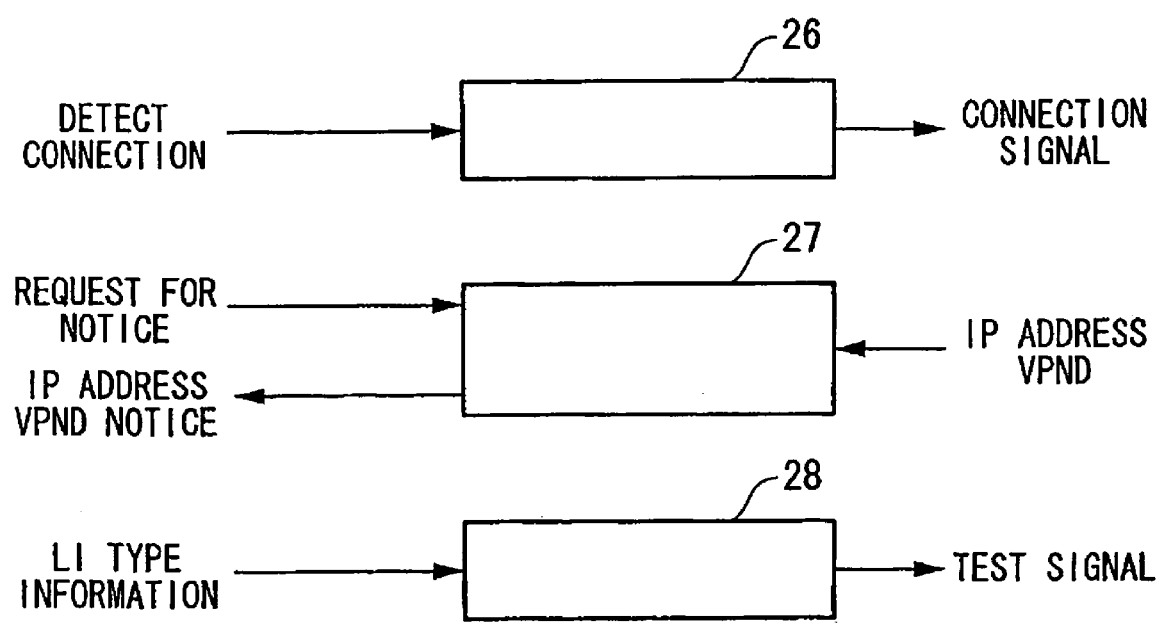
FIG. 26 is a block diagram for a base point device according to the fourteenth embodiment.
Figure 27:
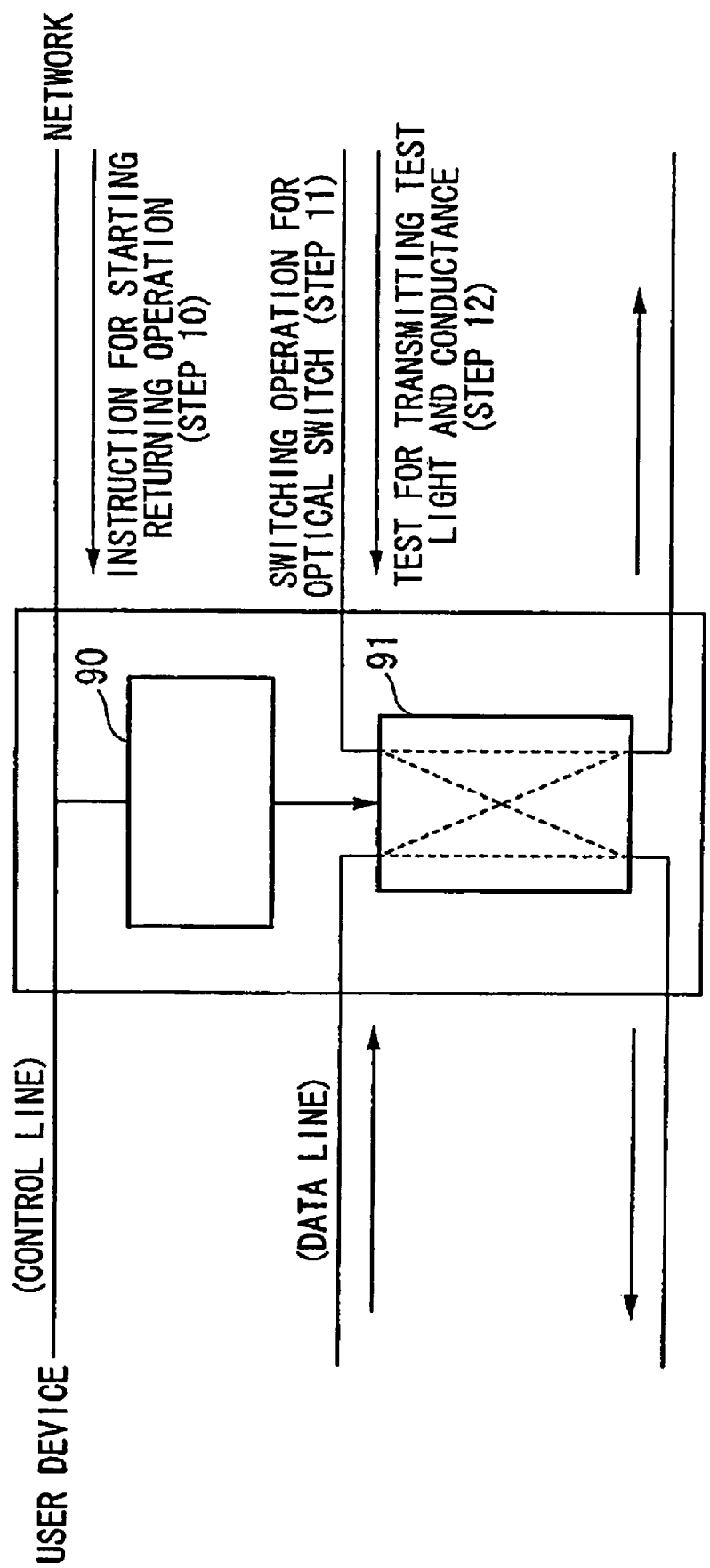
FIG. 27 is a view for explaining a testing procedure according to a fifteenth embodiment.

A fourteen embodiment is explained with reference to FIGS. 25 to 27. FIG. 25 shows a structure for an OVPN according to the fourteenth embodiment. FIG. 26 is a block diagram for a base point device according to the fourteenth embodiment.

The base point device 23 in the fourteenth embodiment is characterized that the base point device 23 is provided with a connection detecting section 26 which is disposed between the OVPN terminating device 30 and the user's device 20-1 which is contained in the OVPN terminating device 30 so as to be connected to the user's device 20-1, an address maintaining section 27 which receives and maintains the IP address and the VPNID which are generated for the address maintaining section 27 via the control channel from the OVPN terminating device 30, and a test signal transmitting section 28 which transmits at least the test signal based on the first signal format which is used in the user's device 20-1 to the user's device 20-1 via the data channel after the IP address and the VPNID are generated to the OVPN terminating device 30.

The base point device 23 is connected to the OVPN terminating device 30, the control line, and the data line in advance. It is possible to employ any desirable method for connecting the user's device 20-1 and the base point device 23; thus, it is possible to realize a useful connecting condition for the user. For example, it is useful if a cable is used for the connecting operation.

Also, the base point device 23 is disposed for the user by a network provider; thus, it is understood that the base point device 23 is a reliable device from a provider's point of view. Therefore, it is possible to avoid that the IP address and the VPNID may be used mischievously by transmitting the IP address and the VPNID of the user's device 20-1 to the base point device 23 in contrast to a case in which the IP address and the VPNID are transmitted to the user's device of which reliability is not sufficiently realized. Also, it is possible to use a pattern which is set up by the network provider for the test signal pattern for determining the L1 type; thus, it is possible to obtain an optimum test signal.

Fifteenth Embodiment

A fifteenth embodiment is explained with reference to FIG. 27. FIG. 27 is a view for showing a testing device in the base point device in the fifteenth embodiment. The testing device shown in FIG. 27 disposed in the base point device is provided with a returning controlling device 90 for separating the user's device 20-1 and the OVPN and returning the test beam which is transmitted from the OVPN back to the OVPN and an optical switch 91.

Sixteenth Embodiment

Figure 28:
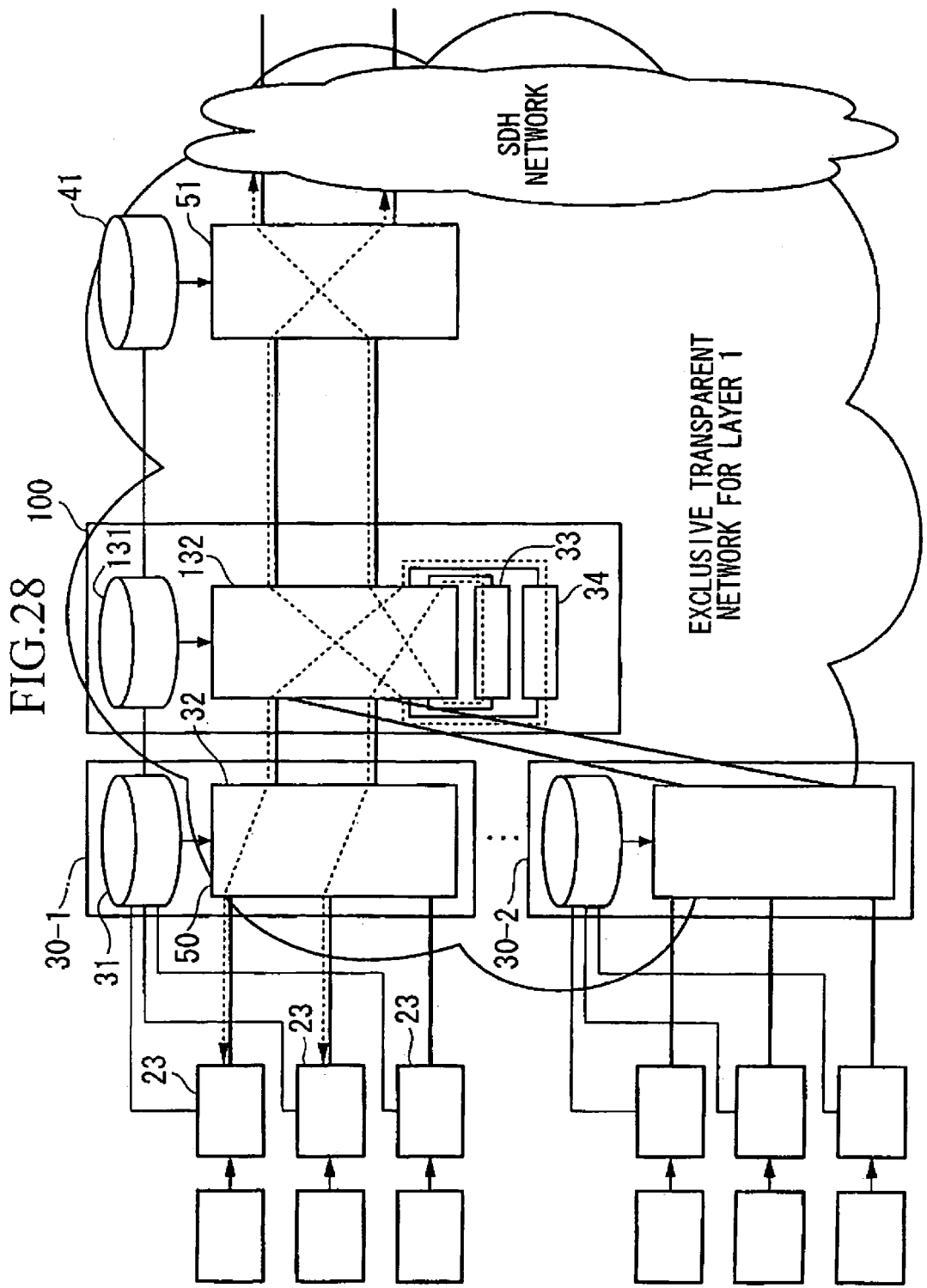
FIG. 28 is a view for explaining a collective converting device according to a sixteenth embodiment.

A sixteenth embodiment is explained with reference to FIG. 28. FIG. 28 is a view for explaining a structure of the OVPN according to the sixteenth embodiment. In the OVPN shown in FIG. 28, the converters 33 and 34 are not provided in the OVPN terminating device 30-1 and 30-2. Instead, a collective converting device 100 is disposed in the OVPN. Also, an optical switch controlling device 131, an optical switch 132, and the converters 33 and 34 are disposed in the collective converting device 100. By doing this, it is possible for a plurality of OVPN terminating devices 30-1, 30-2 to use the converters 33 and 34 commonly.

Here, if a plurality of collective converting devices are provided, a collective converting device which is disposed in a shortest path to the OVPN terminating device is selected. In such a case, if the collective converting device which is disposed in the shortest path to the OVPN terminating device is occupied, the next shortest collective converting device is selected.

Seventeenth Embodiment

Figure 30:
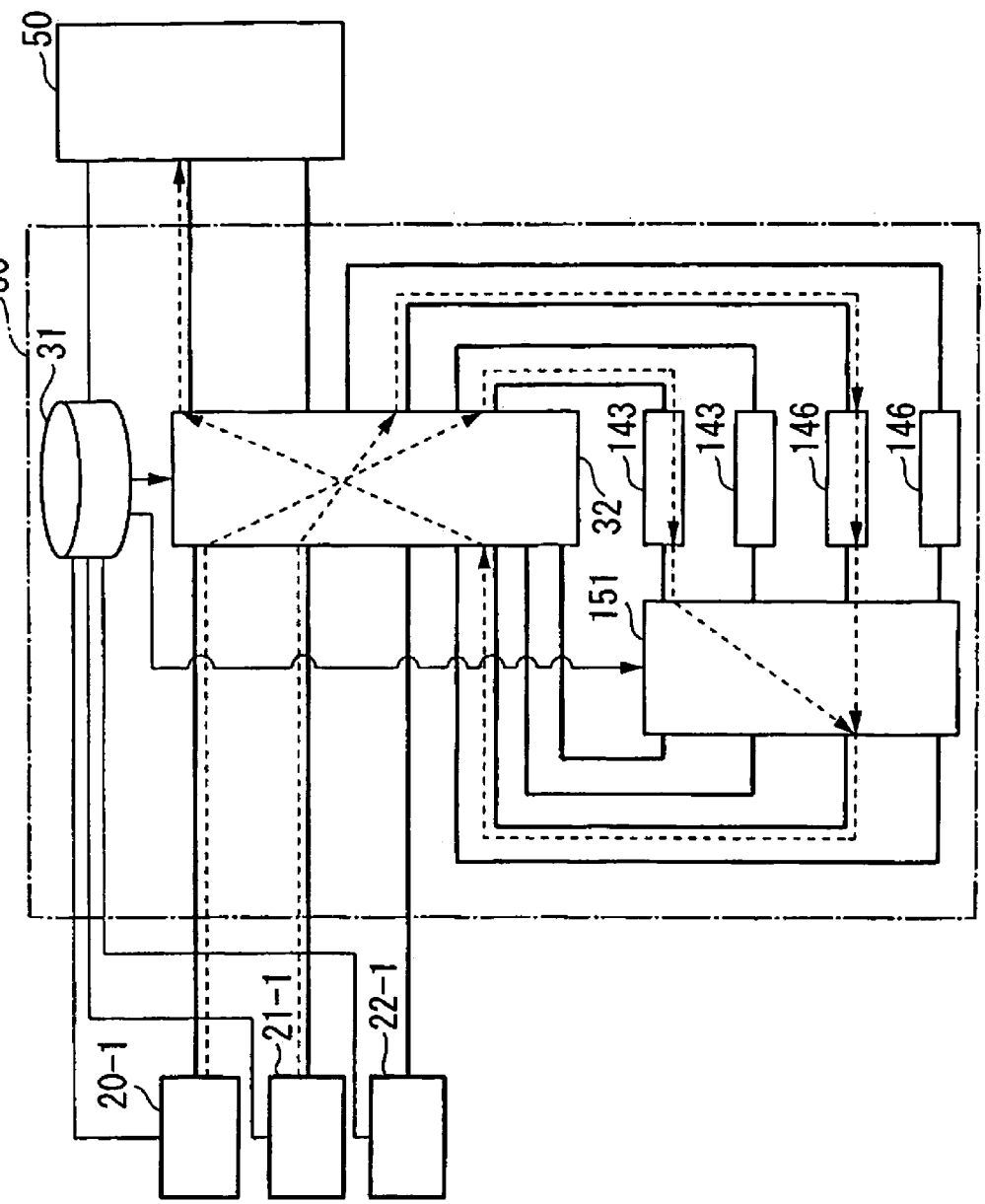
FIG. 30 is a view for explaining an OVPN terminating device according to the seventeenth embodiment.
Figure 31:
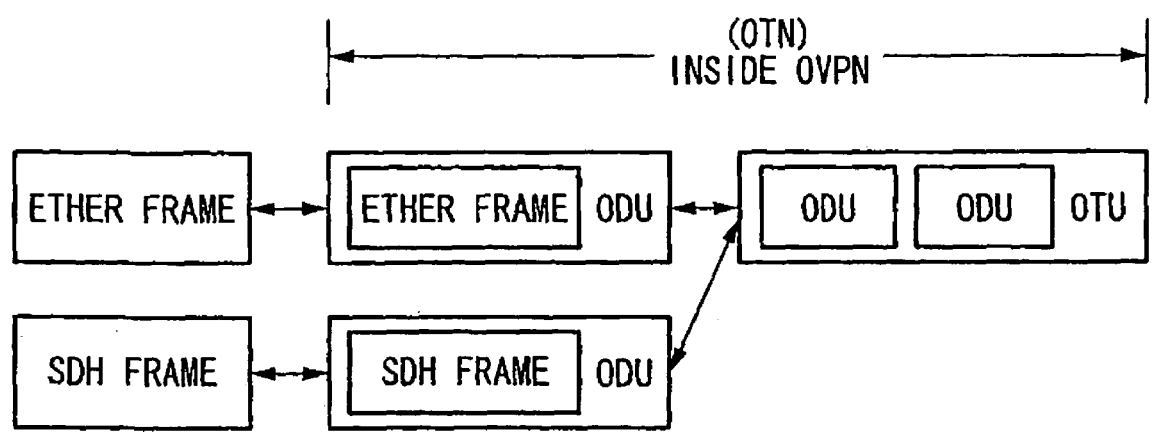
FIG. 31 is a view for explaining a encapsulating condition and a de-encapsulating condition according to the seventeenth embodiment.

A seventeenth embodiment is explained with reference to FIGS. 29 to 31. FIG. 29 is a view for explaining a structure of the OVPN in the seventeenth embodiment. FIG. 30 is a view for explaining an OVPN terminating device (No. 2) according to the first embodiment. FIG. 31 is a view for explaining a de-encapsulating condition and a de-encapsulating condition according to the seventeenth embodiment.

As shown in FIG. 29, the OVPN terminating device 30 is provided with encapsulating sections 143 and 145 which encapsulate the first signal format which is transmitted from the user's devices 20-1 and 21-1 by the second signal format so as to transmit to the OTN and de-encapsulate the signal which is encapsulated according to the second signal format #2 which is transmitted into the first signal format so as to transmit to the user's devices 20-1 and 21-2.

Here, if the same signal format is used in the user's device and the OVPN commonly, it is not necessary to perform a encapsulating operation at all. Thus, it is possible to perform a communication without via the encapsulating sections 143, 146, 85, and 86. Such a case is not necessary for explaining technical features of the present invention; thus, such explanations are omitted. Therefore, transmitting paths are disposed in which the encapsulating sections 143, 146, 35, 36, 85, and 86 are not actually inserted. However, such transmission paths are omitted in the drawings.

That is, as shown in FIG. 29, the OVPN is provided with optical switches 32 to one of which end the user's devices 20-1, 21-1, and 22-1 are contained. Also, a cross connecting device 50 is connected to the other end of the optical switch 32. The encapsulating sections 143 and 146 are disposed at the port which faces the user's devices 20-1, 21-1, and 22-1 in the optical switch 32. By doing this, it is possible to select either one of desirable encapsulating sections 143 or 146 by switching a direction of the optical switches 32

Alternatively, as shown in FIG. 30, the OVPN is provided with optical switches 32 to one of which end the user's devices 20-1, 21-1, and 22-1 are contained. Also, a cross connecting device 50 is connected to the other end of the optical switches 32. The encapsulating sections 143 and 146 are disposed at the port which faces the user's devices 20-1, 21-1, and 22-1 in the optical switch 32. Its conversion output returns to the port which contains the user's devices 20-1, 21-1, and 22-1 in the optical switch 32.

According to a disposition of the optical switch shown in FIG. 29, there is a case in which it is necessary to set up the optical cross connecting device 50 again according to the disposition of the encapsulating sections when the encapsulating section 143 or 146 are switched by the optical switch 32. However, as shown in FIG. 29, by connecting the encapsulating sections 143 and 146 to the optical switch 32, it is not necessary to set up the optical cross connecting device 50 again.

Arrows in broken lines indicates a connecting condition of the optical switch 32. The user's device 20-1 selects the encapsulating section 143. The user's device 21-1 selects the encapsulating section 146. A connecting condition of the optical switch 82 in the OVPN terminating device 80 is set accordingly. There are several methods for setting up the connecting conditions for the optical switches 32 and 80. In a method, a switching request which is sent to the optical switch controlling device 31 via a control line near a transmitting device is transmitted to the optical switch controlling device 81 near a receiving device. Alternatively, there is a method in which the switching request is also transmitted from the user's device which receives the switching request. The embodiments of the present invention are not affected by any one of such methods. The layer 1 transparent exclusive line is changed according to the switching request from the user.

The encapsulating sections 143 and 146 are disposed so as to correspond to the encapsulating operation and the de-encapsulating operation for different signal formats respectively. The encapsulating sections 143 and 146 which correspond to the desired signal format are selected by switching the optical switch 32.

Next, operations for a tunneling transmission for a data which is performed by the encapsulating operation and the de-encapsulating operation are explained. In FIG. 31, the encapsulating devices 35 and 36 are OTN multiplying devices which are defined by ITU-TG 709. An Etherframe or an SDH frame is used for the layer 1 frame.

A mapping operation for the layer 1 frame which is transmitted from the user's device 20-1 or 21-1 to the OVPN terminating device 30 is performed onto an ODU (Optical Data Unit) by the encapsulating sections 143 and 146. Furthermore, the encapsulating sections 143 and 146 generate an OTU (Optical Channel Transport Unit) from the OTU so as to handle based on a common format in the OTN. In such a case, the ODUs which are directed to a common destination are multiplied into an OTU by a multiplying device 149.

Also, the ODU of the OTU which is transmitted from the OVPN to the OVPN terminating device 80 is extracted by the multiplying device 88. Furthermore, the layer 1 frame is extracted from the ODU in the encapsulating sections 85 and 86 so as to be transmitted to the user's device 20-2 or 21-2.

Eighteenth Embodiment

Figure 32:
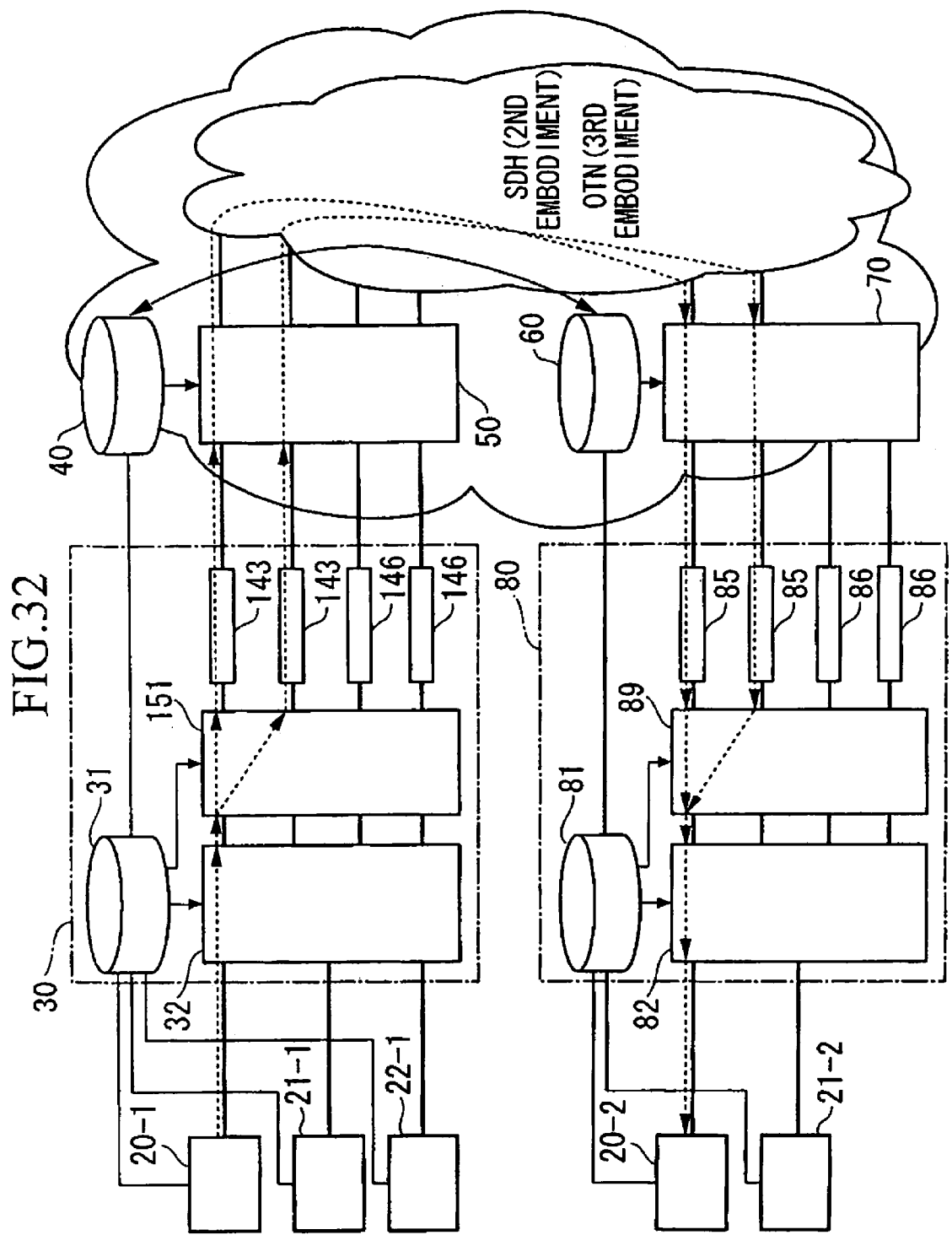
FIG. 32 is a view for explaining a structure for an OVPN according to an eighteenth embodiment and a nineteenth embodiment.
Figure 33:
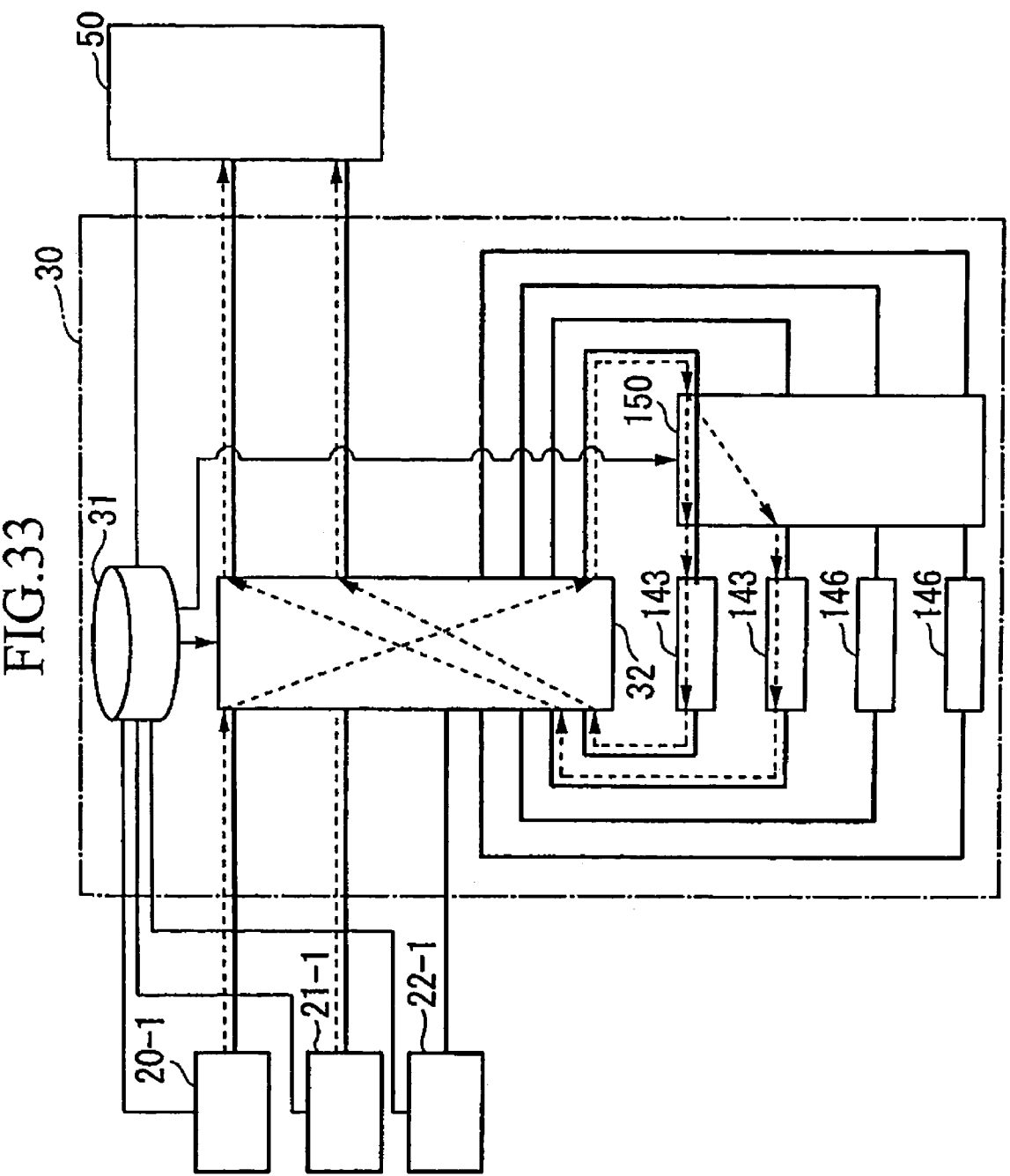
FIG. 33 is a view for explaining an OVPN terminating device according to the eighteenth embodiment and the nineteenth embodiment.
Figure 34:
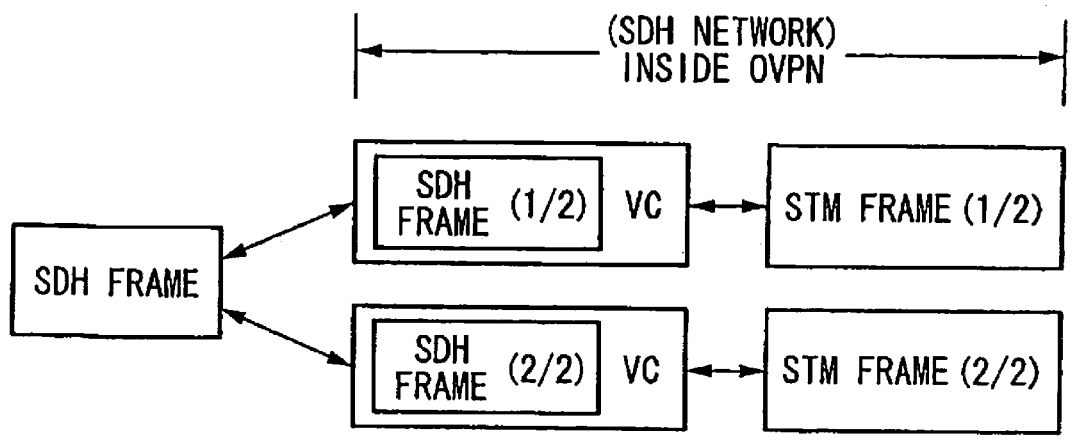
FIG. 34 is a view for explaining a encapsulating condition and a de-encapsulating condition according to the eighteenth embodiment.

An eighteenth embodiment is explained with reference to FIGS. 32 to 34. FIG. 32 is a view for explaining a structure of the OVPN in the eighteenth embodiment. FIG. 33 is a view for explaining the OVPN terminating device (No. 2) in the eighteenth embodiment. FIG. 34 is a view for explaining a encapsulating condition and a de-encapsulating condition in the eighteenth embodiment. Here, explanation can be made with reference to a case of SDH. However, explanation can be made even if the SDH is replaced by a SONET. In the eighteenth embodiment, as shown in FIG. 32, a direction of an optical cross connecting device 50 is set by a network controlling device 40. Thus, an OVPN is disposed in which an SDH network is disposed between the base points as a layer 1 transparent frame. Here, the network controlling device 40 can be controlled by the user's devices 20-1, 21-1, and 22-1 in each base point.

In an example shown in FIG. 34, the encapsulating sections 143 and 146 shown in FIGS. 32 and 33 are SDH multiplying devices which are defined by ITU-TG, 707. An SDH frame is used for a layer 1 frame.

As shown in FIG. 34, a mapping operation for the layer 1 frame which is transmitted from the user's device 20-1 to the OVPN terminating device 30 is performed onto a VC (Virtual Container) in the encapsulating section 143. Furthermore, the encapsulating section 143 generates an STM (Synchronous Transfer Mode) frame so as to be handled under a common format in the SDH network. In such a case, if the SDH cannot be contained in a VC, the SDH frame is divided into a plurality of frames by the multiplying device 150 so as to perform a mapping operation onto a plurality of VCS by a plurality of encapsulating sections 143. Thus, a plurality of STM frames are generated from a plurality of VCs.

Also, the VC of the STM frame which is transmitted from the OVPN to the OVPN terminating device 80 is extracted at the encapsulating section 85. Furthermore, the layer 1 frames are extracted from a plurality of VCs by the multiplying device 89; thus, the SDH frames are restored so as to be transmitted to the user's device 20-2.

Also, it is possible to dispose the optical switches as shown in FIG. 33 for the eighteenth embodiment.

Nineteenth Embodiment

Figure 35:
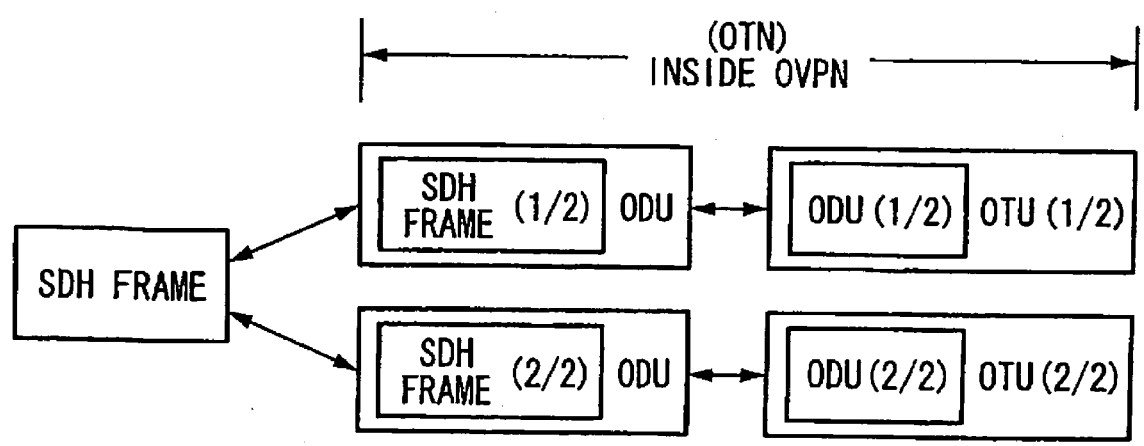
FIG. 35 is a view for explaining a encapsulating condition and a de-encapsulating condition according to the nineteenth embodiment.

A nineteenth embodiment is explained with reference to FIGS. 32, 33 and 35. FIG. 32 is a view for explaining a structure of the OVPN in the eighteenth embodiment. FIG. 33 is a view for explaining the OVPN terminating device (No. 2) in the eighteenth embodiment. FIG. 35 is a view for explaining a encapsulating condition and a de-encapsulating condition in the nineteenth embodiment. Here, explanation can be made with reference to a case of SDH. However, explanation can be made even if the SDH is replaced by a SONET. In the nineteenth embodiment, as shown in FIG. 32, a direction of an optical cross connecting device 50 is set by a network controlling device 40. Thus, an OVPN is disposed in which an OTN is disposed between the base points as a layer 1 transparent frame. Here, the network controlling device 40 can be controlled by the user's devices 20-1, 21-1, and 22-1 in each base point.

In an example shown in FIG. 35, the encapsulating section 143 shown in FIGS. 32 and 33 are OTN multiplying devices which are defined by ITU-TG, 709. An SDH frame is used for a layer 1 frame.

As shown in FIG. 35, a mapping operation for the layer 1 frame which is transmitted from the user's device 20-1 to the OVPN terminating device 30 is performed onto an ODU in the encapsulating section 143. Furthermore, the encapsulating section 143 generates an OTU from the ODU so as to be handled under a common format in the OTN. In such a case, if the SDH cannot be contained in a ODU, the SDH frame is divided into a plurality of frames by the multiplying device 150 so as to perform a mapping operation onto a plurality of ODUs by a plurality of encapsulating sections 143. Thus, a plurality of OTUs are generated from a plurality of ODUs.

Also, the ODU of the OTU which is transmitted from the OVPN to the OVPN terminating device 80 is extracted at the encapsulating section 143. Furthermore, an SDH frame is restored from a plurality of SDH frames by the multiplying device 89; thus, the SDH frames are restored so as to be transmitted to the user's device 20-2.

Also, it is possible to dispose the optical switches as shown in FIG. 33 for the nineteenth embodiment.

The eighteenth embodiment and the nineteenth embodiment are compared each other. In the eighteenth embodiment, a transmission rate for the layer 1 frame which is transmitted from the user's device 20-1 and a transmission rate for the STM frame in the OVPN is almost equal. Thus, the transmission rate in the OVPN is reduced in accordance with a encapsulating operation for the layer 1 frame. In contrast, in the nineteenth embodiment, the transmission rate for the OTU in the OVPN is faster than the transmission rate for the layer 1 frame which is transmitted from the user's device 20-1; thus, the transmission is not reduced in accordance with a encapsulating operation for the layer 1 frame.

Twentieth Embodiment

Figure 36:
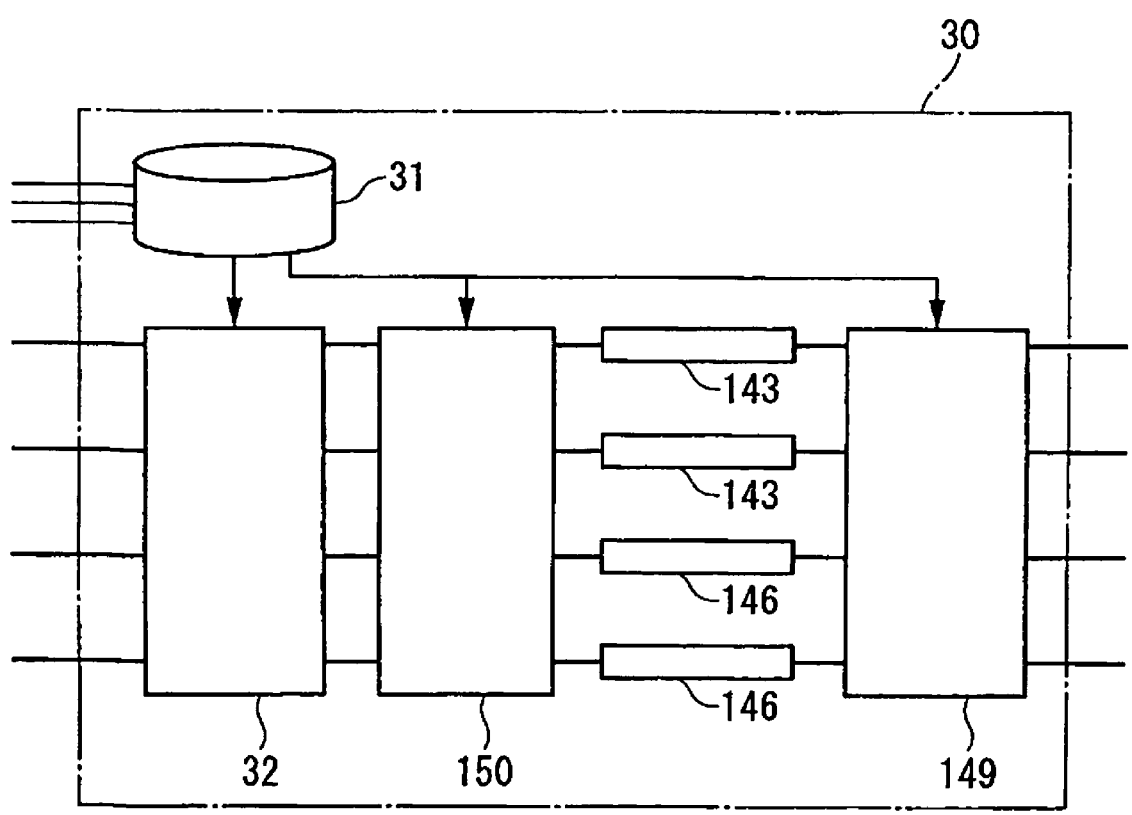
FIG. 36 is a view for explaining an OVPN terminating device according to a twentieth embodiment and a twenty-ninth embodiment.
Figure 37:
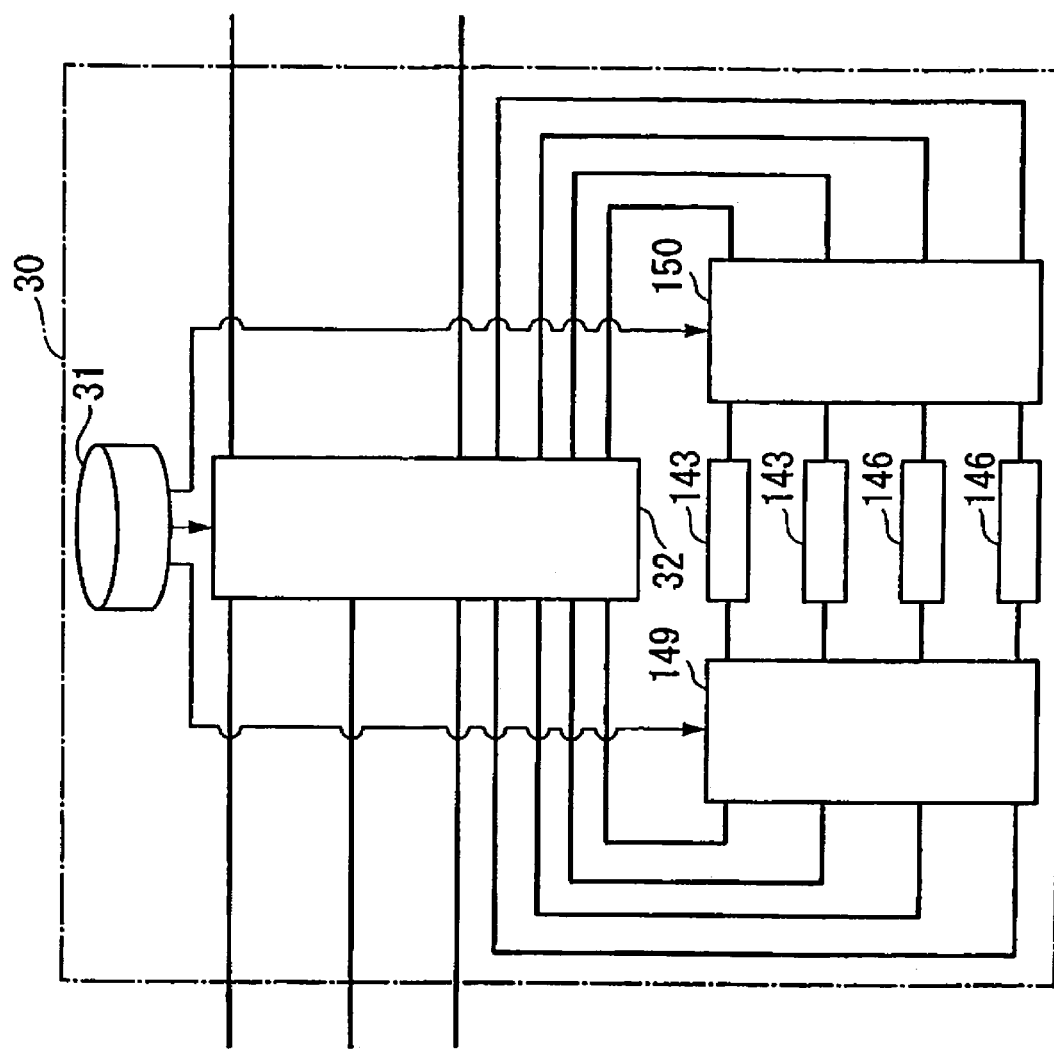
FIG. 37 is a view for explaining an OVPN terminating device according to the twentieth embodiment.

A twentieth embodiment is explained with reference to FIGS. 36 and 37. FIG. 36 is a view for explaining the OVPN terminating device in the twentieth embodiment. FIG. 37 is a view for explaining the OVPN terminating device (No. 2) in the twentieth embodiment. The OVPN terminating device shown in the seventeenth embodiment to nineteenth embodiment is combined with a structure shown in FIGS. 36 and 37. Processes which are explained in the seventeenth embodiment to the nineteenth embodiment can be preferably performed according to necessity.

Twenty-First Embodiment

Figure 38:
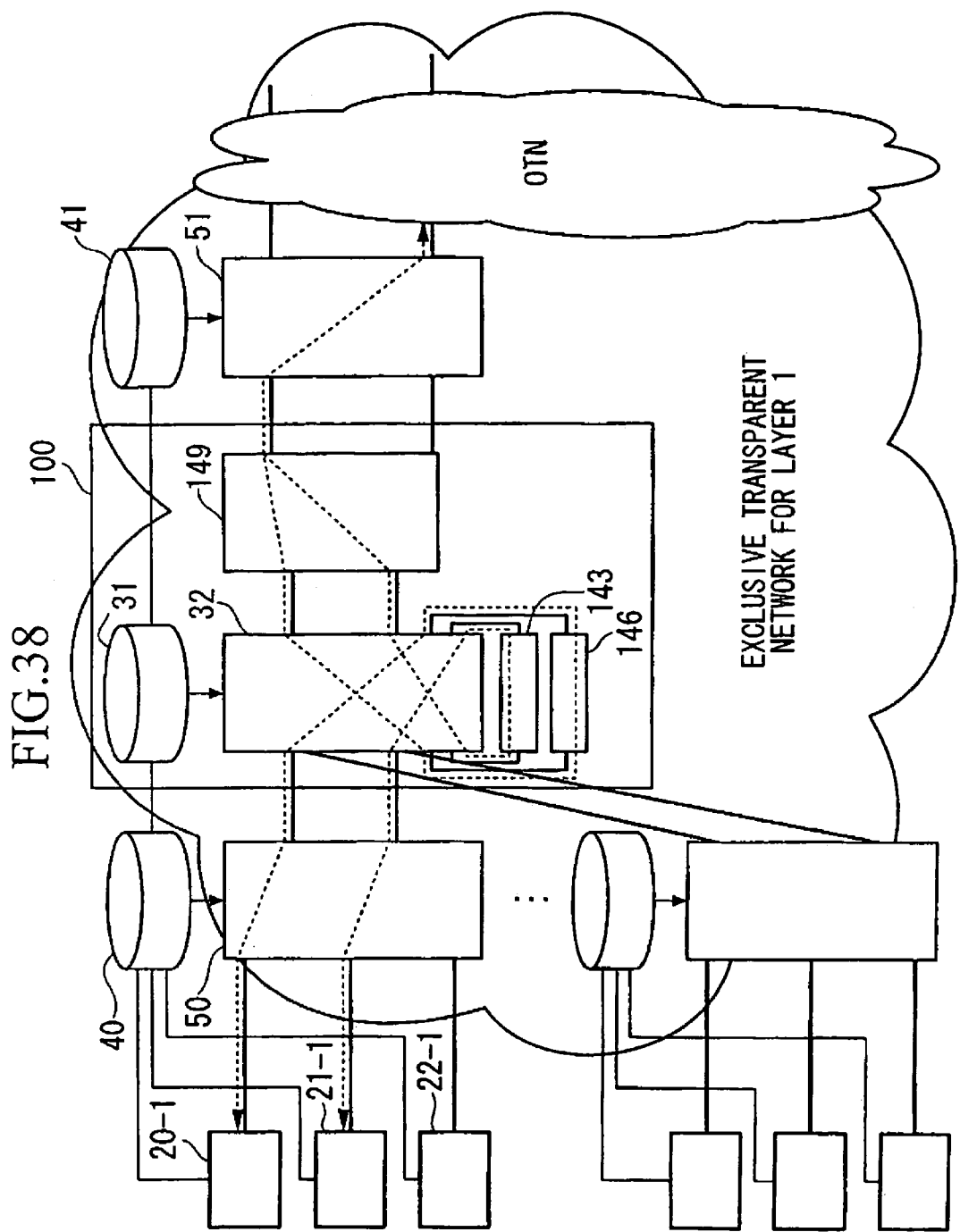
FIG. 38 is a view for explaining a structure for an OVPN according to an twenty-first embodiment.
Figure 39:
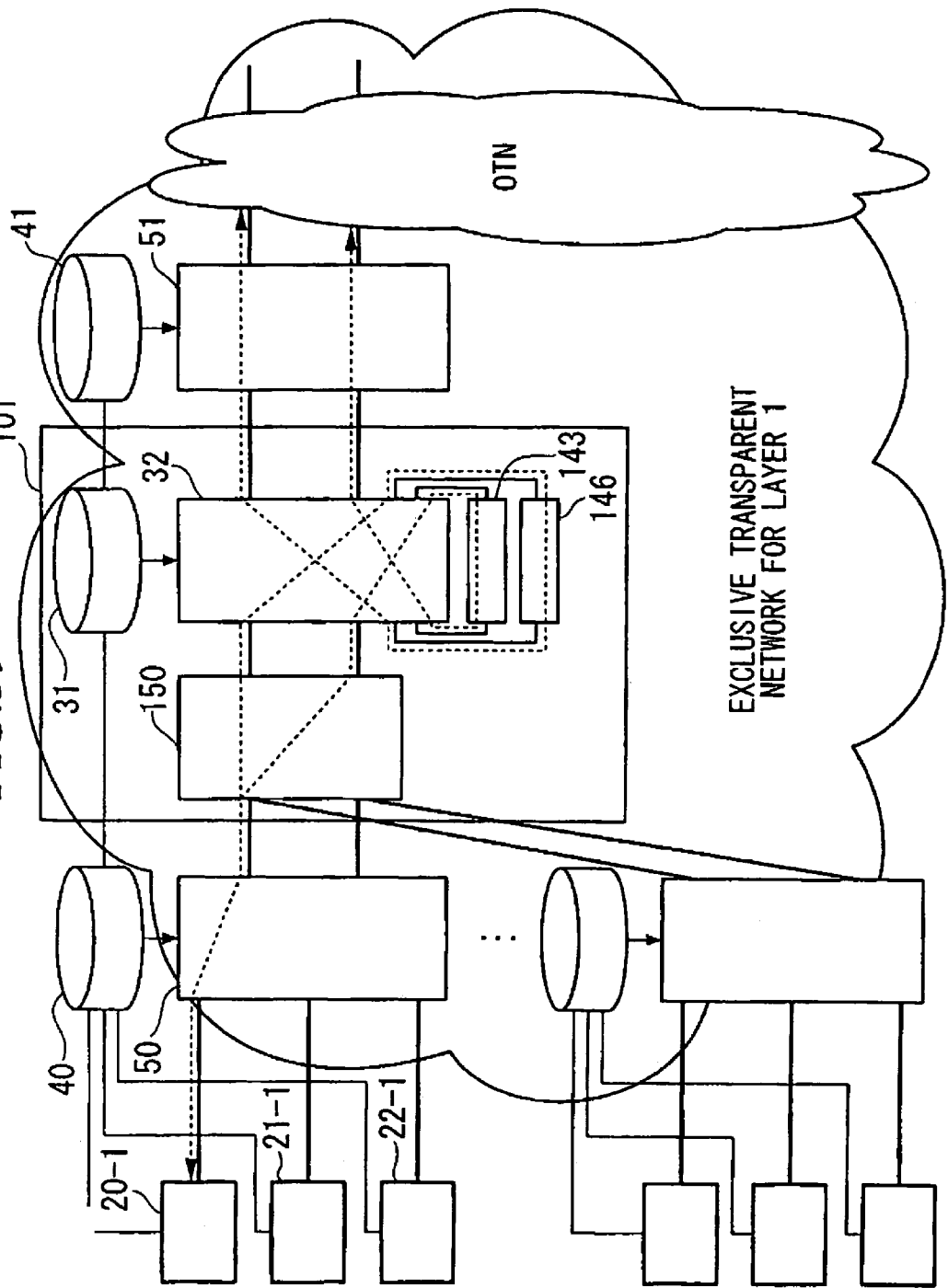
FIG. 39 is a view for explaining a structure for an OVPN according to an twenty-first embodiment.
Figure 40:
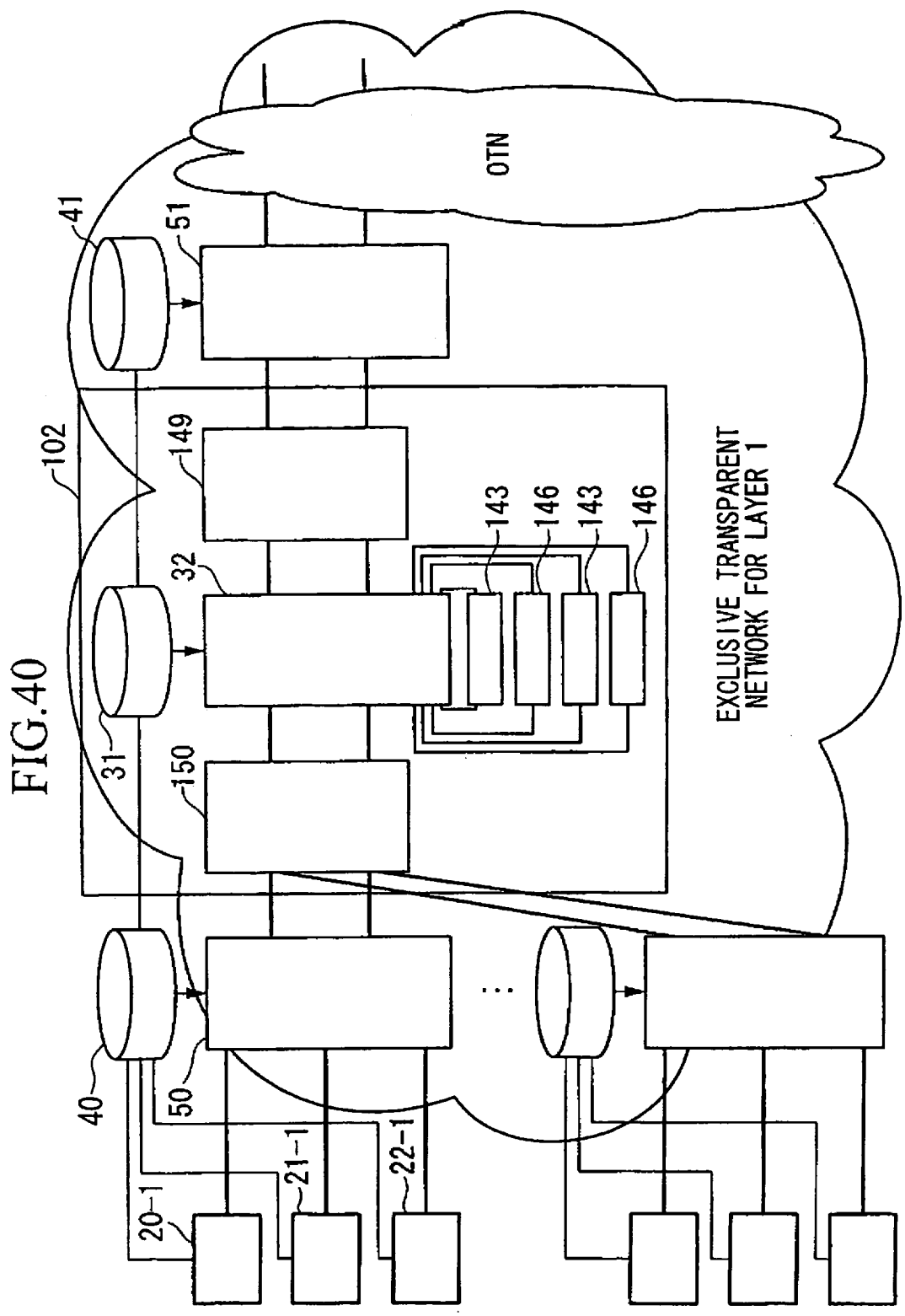
FIG. 40 is a view for explaining a structure for an OVPN according to an twenty-first embodiment.

A twenty-first embodiment is explained with reference to FIGS. 38 to 40. FIG. 38 is a view for explaining a structure for the OVPN in the twenty-first embodiment. FIG. 39 is a view for explaining a structure for the OVPN in the twenty-first embodiment. FIG. 40 is a view for explaining a structure for the OVPN in the twenty-first embodiment. The seventeenth embodiment to the twentieth embodiment relate to the OVPN terminating device. In contrast, the OVPN terminating device is not disposed in the twenty-first embodiment. That is, collective converting devices 100, 101, and 102 are disposed in the OVPN so as to perform a collective function such as a encapsulating operation and a de-encapsulating operation as explained in the seventeenth embodiment to the twentieth embodiment.

That is, as shown in FIG. 38, a collective converting device 100 provided with an optical switch controlling device 31, an optical switch 32, encapsulating sections 143, 146, and a multiplying device 149 is disposed in a rear stage of the optical cross connecting device 50. In FIG. 38, a plurality of optical cross connecting devices are connected to the optical switch 32 in addition to the optical cross connecting device 50 so as to handle the optical switch controlling device 31, the optical switch 32, the encapsulating sections 143 and 146, and the multiplying device 149 commonly. By doing this, in the seventeenth embodiment to the twentieth embodiment, the optical switch controlling device 31, the optical switch 32, the encapsulating sections 143 and 146, and the multiplying device 149 which are disposed in each OVPN terminating device are disposed in the OVPN. Alternatively, it is acceptable if a plurality of the optical switch controlling device 31, a plurality of the optical switch 32, a plurality of the encapsulating sections 143 and 146, and a plurality of the multiplying device 149 are disposed in the OVPN. Thus, the optical cross connecting device uses the optical switch controlling device 31, the optical switch 32, the encapsulating sections 143 and 146, and the multiplying device 149 commonly. By doing this, it is possible to use the network resource efficiently. Here, it is necessary to set the direction of the output from the multiplying device 149 by the optical cross connecting device 51; thus, it is necessary to dispose a network controlling device 41 and the optical cross connecting device 51 in addition to the network controlling device 40 and the optical cross connecting device 50.

Similarly, a collective converting device 101 which is provided with a multiplying device 150, an optical switch controlling device 31, the optical switch 32, the encapsulating sections 143 and 146 in a rear stage of the optical cross connecting device 50 (the encapsulating section 146 is omitted in the drawing). In FIG. 39, a plurality of optical cross connecting devices are connected to the multiplying device 150 in addition to the optical cross connecting device 50 so as to handle the multiplying device 150, the optical switch controlling device 31, the optical switch 32, and the encapsulating sections 143 and 146. By doing this, in the seventeenth embodiment to the twentieth embodiment, the optical switch controlling device 31, the optical switch 32, the encapsulating sections 143 and 146, and the multiplying device 150 which are disposed in each OVPN terminating device are disposed in the OVPN. Alternatively, it is acceptable if a plurality of the optical switch controlling device 31, a plurality of the optical switch 32, a plurality of the encapsulating sections 143 and 146, and a plurality of the multiplying device 150 are disposed in the OVPN. Thus, the optical cross connecting device uses the optical switch controlling device 31, the optical switch 32, the encapsulating sections 143 and 146, and the multiplying device 150 commonly. By doing this, it is possible to use the network resource efficiently. Here, it is necessary to set the direction of the output from the optical switch 32 by the optical cross connecting device 51; thus, it is necessary to dispose a network controlling device 41 and the optical cross connecting device 51 in addition to the network controlling device 40 and the optical cross connecting device 50. Here, if a plurality of collective converting devices are provided, a collective converting device which is disposed in a shortest path to the OVPN terminating device is selected. In such a case, if the collective converting device which is disposed in the shortest path to the OVPN terminating device is occupied, the next shortest collective converting device is selected.

As shown in FIG. 40, it is possible to dispose a collective converting device 102 in which structures shown in FIGS. 38 and 39 are combined. By doing this, it is possible to perform the processes which are explained in FIGS. 38 and 39 preferably according to necessity.

Twenty-Second Embodiment

Figure 41:
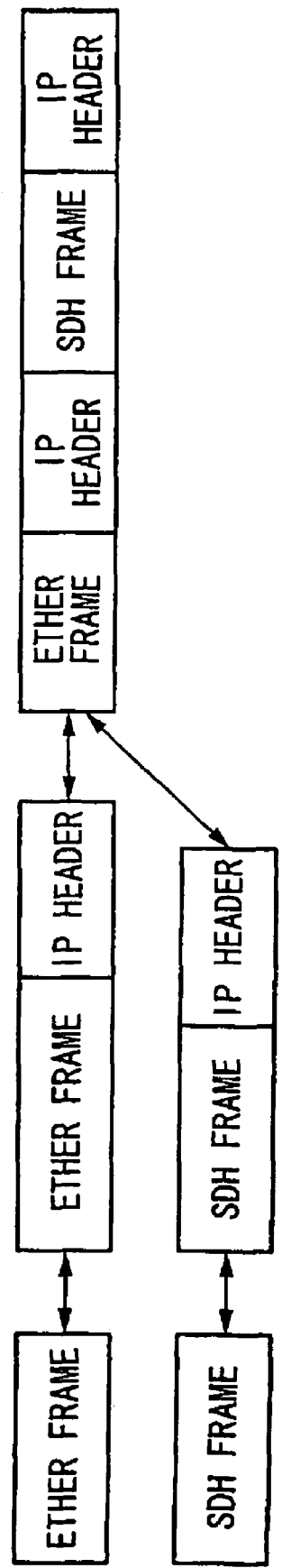
FIG. 41 is a view for explaining a multiplying operation for a frame according to a twenty-second embodiment.
Figure 42:
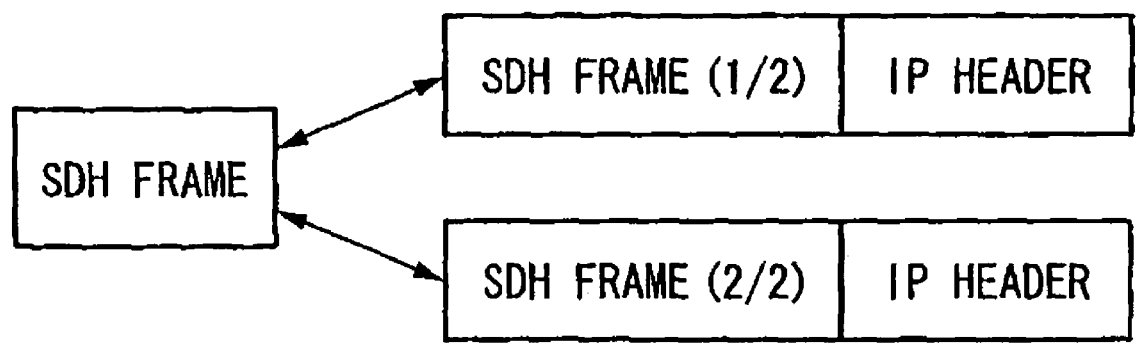
FIG. 42 is a view for explaining a dividing operation for frame according to a twenty-third embodiment.

A twenty-second embodiment is explained with reference to FIGS. 41 and 42. FIG. 41 is a view for explaining a frame-multiplying-operation in the twenty-second embodiment. FIG. 42 is a view for explaining a frame-dividing-operation in the twenty-second embodiment. In the seventeenth embodiment to the twenty-first embodiment, an OTN is used for the layer 1 transparent exclusive network. However, the OVPN produces a private network virtually; therefore, it is not necessary that the layer 1 network should be actually realized in the OVPN as long as the inside of the OVPN looks like a layer 1 network to the user. That is, it is acceptable if the inside of the OVPN is a layer 2 network or a layer 3 network. For an IP network, the layer 3 network is employed. In the twenty-second embodiment, explanations are made for a case in which the IP network is employed for the layer 1 transparent exclusive network.

That is, the OTN in the FIG. 17 is replaced by an IP network. The optical cross connecting devices 50 and 70 are replaced by a router for processing an IP packet. In an example shown in FIG. 41, the encapsulating operation for the SDH frame or the Ether frame is performed by the IP packet in the encapsulating section 143 or 146. The multiplying device 149 multiplies the SDH frame and the Ether frame which are encapsulated into the IP packet per a common destination. Such processes are realized by an IP-multiplying-operation by using an IP header. Also, in an example shown in FIG. 42, an SDH frame is divided into two frames so as to be added an IP header respectively.

By doing this, an IP transmission for the SDH frame or the Ether frame which are encapsulated by the IP packet is performed in the IP network as a layer 1 transparent exclusive network. The operations thereafter are the same as those in the former embodiments. By doing this, in the twenty-second embodiment, it is explained that it is possible to realize the layer 1 transparent exclusive network by various layer networks.

Twenty-Third Embodiment

Figure 43:
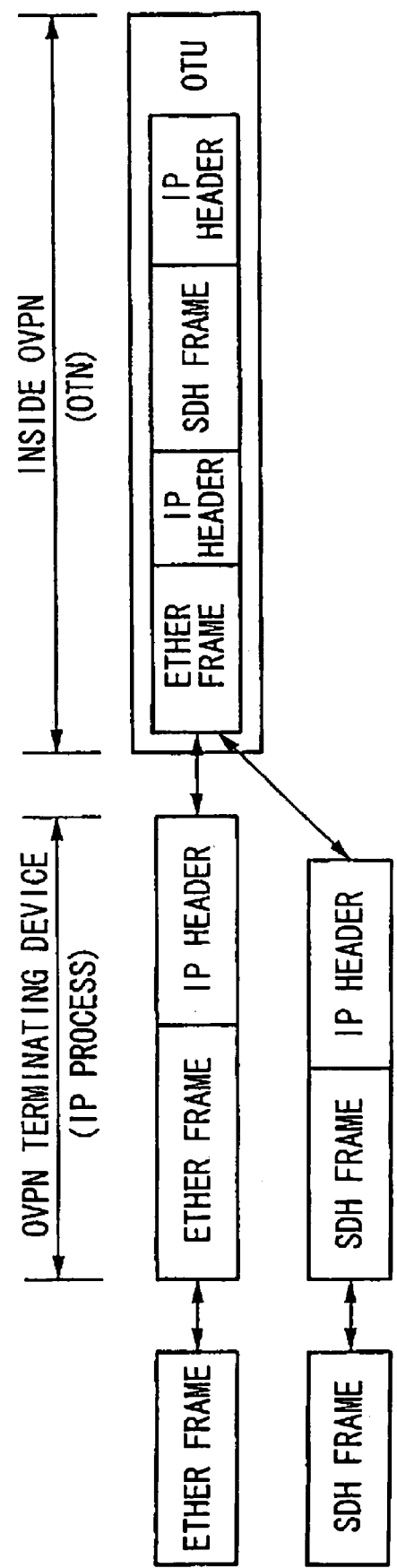
FIG. 43 is a view for explaining an IP encapsulating operation and an IP de-encapsulating operation for an Etherframe and an SDH frame.
Figure 44:
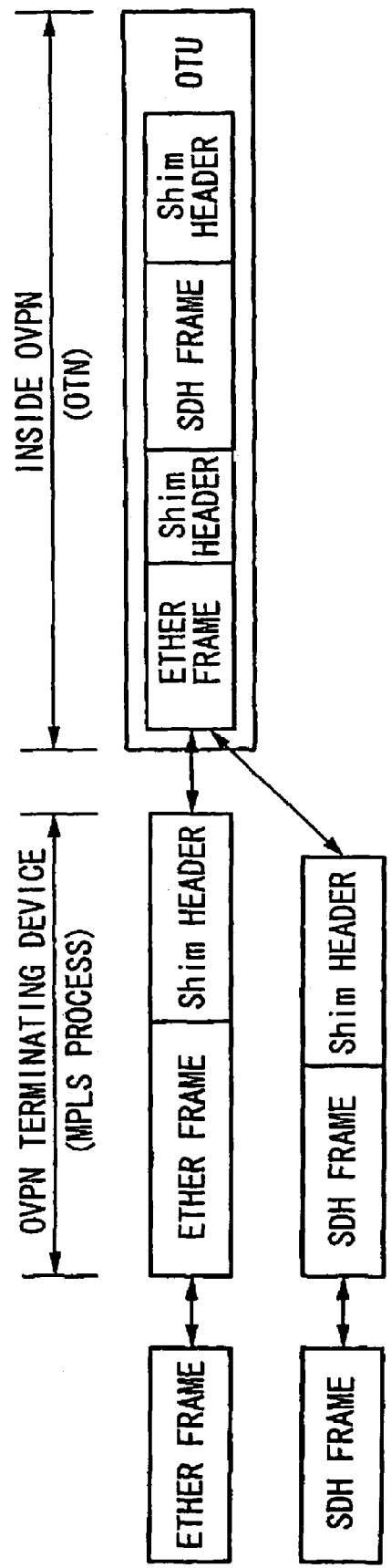
FIG. 44 is a view for explaining an MPLS encapsulating operation and an MPLS de-encapsulating operation for an Etherframe and an SDH frame.
Figure 45:
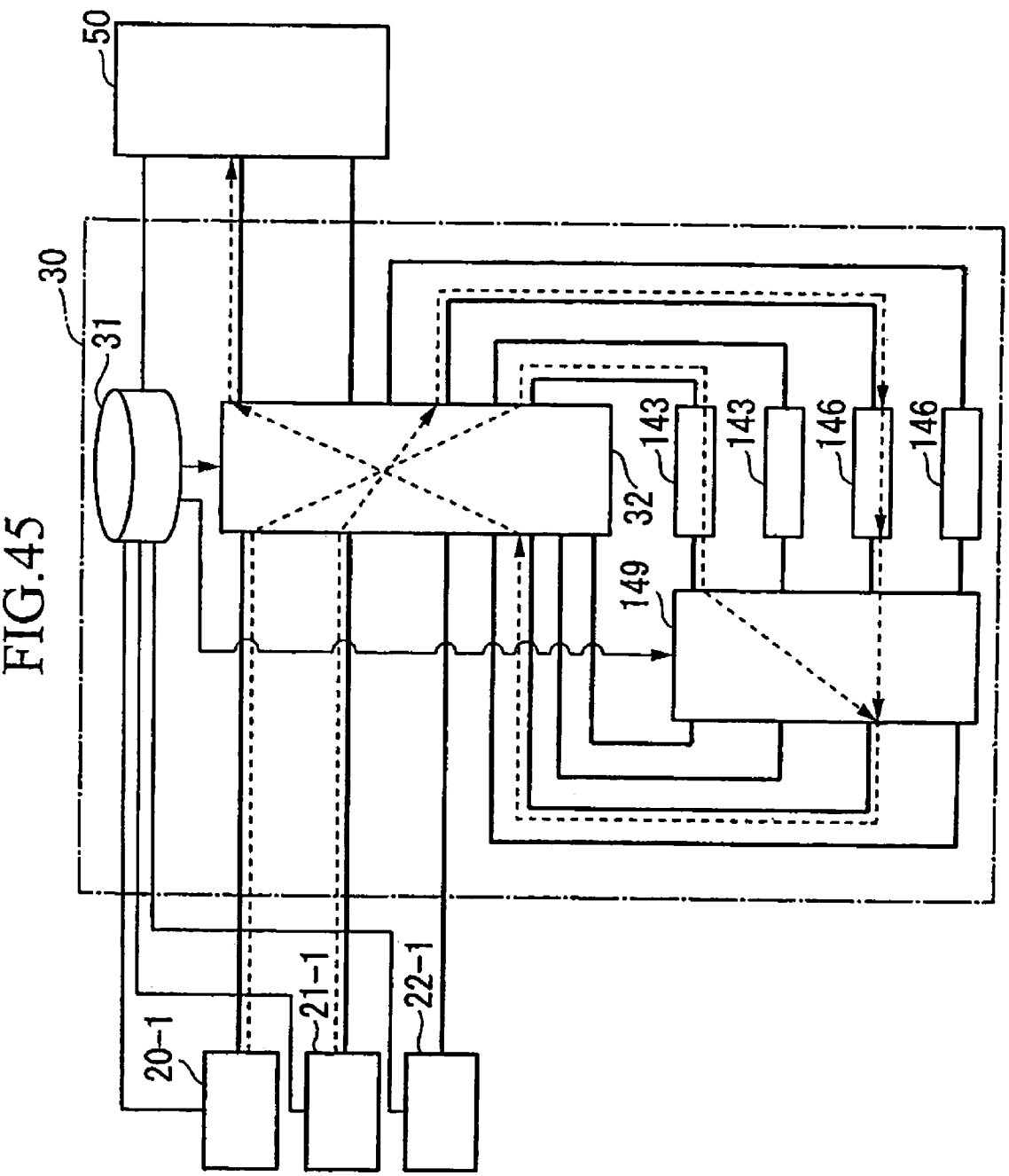
FIG. 45 is a view for explaining an OVPN terminating device according to the twenty-third embodiment.

A twenty-third embodiment is explained with reference to FIGS. 43 to 45. FIG. 29 is a view for explaining a structure of the OVPN in the twenty-third embodiment. FIG. 43 is a view for explaining an IP-encapsulating operation and an IP-de-encapsulating operation for the Ether frame and the SDH frame. FIG. 44 is a view for explaining an MPLS-encapsulating operation and an MPLS-de-encapsulating operation for the Ether frame and the SDH frame. FIG. 45 is a view for explaining an OVPN terminating device (No. 2) in the twenty-third embodiment.

As shown in FIG. 29, the present embodiment is characterized in following points. The OVPN is provided with encapsulating sections 143, 146, 85 and 86 which convert the first signal format in the layer 1 which is employed in the user's device of an OVPN subscriber and the second signal format in an upper layer which is employed in the OVPN alternately. The encapsulating sections 143, 146, 85, and 86 contain the user's devices 20-1, 21-1, 22-1, 20-2, and 21-2 of the OVPN subscriber which are disposed so as to correspond to a plurality of various first signal formats. The OVPN is provided the encapsulating sections 143, 146, 85, and 86 in thereinside. The encapsulating sections 143, 146, 85, and 86 perform a encapsulating operation for the first signal format which is transmitted from the user's devices 20-1 and 21-1 by the second signal format so as to be transmitted to the OVPN. The signal which is encapsulated by the second signal format which is transmitted from the OVPN is de-encapsulated into the first signal format so as to be transmitted to the user's devices 20-2 and 21-2.

In the present embodiment, an SDH frame and an Ether frame are used for an example for the first signal format in the layer 1 which is used in the user's device. Also, an IP packet or an MPLS packet is used for the second signal format in an upper layer than the layer 1 which is used in the OVPN. The OVPN in the present embodiment is provided with routers 151 and 88 for performing a multiplying operation and dividing operation for a plurality of signals by the second signal format.

In FIG. 29, an optical switch 32 is provided which contains the user's devices 20-1, 21-1, and 22-2 on an end of the optical switch and has an optical cross connecting device 50 on the other end of the optical switch 32. The encapsulating sections 143 and 146 are disposed in a port which faces the user's devices 20-1, 21-1, and 22-2 in the optical switch 32. By doing this, it is possible to select desirable encapsulating section 143 or 146 by switching the direction of the optical switch 32.

Otherwise, as shown in FIG. 45, an optical switch 32 is provided which contains the user's devices 20-1, 21-1, and 22-2 on an end of the optical switch and has an optical cross connecting device 50 on the other end of the optical switch 32. The encapsulating sections 143 and 146 are disposed in a port which faces the user's devices 20-1, 21-1, and 22-2 in the optical switch 32. The converted output returns to the port which contains the user's devices 20-1, 21-1, and 22-2 in the optical switch 32 via the router 151.

According to a disposition of the optical switch shown in FIG. 29, there is a case in which it is necessary to set up the optical cross connecting device 50 again according to the disposition of the encapsulating sections when the encapsulating section 143 or 146 are switched by the optical switch 32. However, as shown in FIG. 45, by connecting the encapsulating sections 143 and 146 to the optical switch 32, it is not necessary to set up the optical cross connecting device 50 again.

Arrows in broken lines indicates a connecting condition of the optical switch 32. The user's device 20-1 selects the encapsulating section 143. The user's device 21-1 selects the encapsulating section 146. A connecting condition of the optical switch 82 in the OVPN terminating device 80 is set accordingly. There are several methods for setting up the connecting conditions for the optical switches 32 and 80. In a method, a switching request which is sent to the optical switch controlling device 31 via a control line near a transmitting device is transmitted to the optical switch controlling device 81 near a receiving device. Alternatively, there is a method in which the switching request is also transmitted from the user's device which receives the switching request. The embodiments of the present invention are not affected by any one of such methods. The layer 1 transparent exclusive line is changed according to the switching request from the user.

The encapsulating sections 143 and 146 are disposed so as to correspond to the encapsulating operation and the de-encapsulating operation for different signal formats respectively. The encapsulating sections 143 and 146 which correspond to the desired signal format are selected by switching the optical switch 32.

Next, operations for a tunneling transmission for a data which is performed by the encapsulating operation and the de-encapsulating operation are explained. In FIG. 43, the encapsulating devices 143 and 146 are an IP-encapsulating device and a de-encapsulating device. An Etherframe or an SDH frame is used for the layer 1 frame which is used by the user. Hereinafter, explanations are made for an SDH, although, explanations can be made for SONET.

When the IP network is used for the OVPN, an IP header which is generated by the encapsulating sections 143 and 146 is add to the layer 1 frame which is transmitted from the user's device 20-1 or 21-1 to the OVPN terminating device 30. By doing this, the Ether frame is encapsulated by the IP packet by adding the IP header to the Ether frame in the encapsulating section 143. Also, the SDH frame is encapsulated by the IP packet by adding the IP packet to the SDH frame in the encapsulating section 146. Furthermore, these IP packets are multiplied so as to be transmitted to the router 88 from the router 151. The router 88 designates the destination according to the IP header. Here, any network can be used for the layer 1 transparent exclusive network as long as it is possible to transmit the IP packet which is multiplied from the router 151 to the router 88. In the present embodiment, an OTN is used. Therefore, the IP packet is further encapsulated in the OTU so as to be transmitted in the layer 1 transparent exclusive network.

Also, when an MPLS network is used for the OVPN, as shown in FIG. 44, the second signal format is an MPLS frame when the first signal format is Ether frame and an SDH frame. In the encapsulating section 143, the Ether frame is encapsulated by the MPLS frame by adding a Shim header to the Ether frame. Also, an SDH frame is encapsulated by the MPLS frame in the encapsulating section 146 by adding the Shim header to the SDH frame. Furthermore, these MPLS frames are multiplied so as to be transmitted from the router 151 to the router 88. In the router 88, the destination is designated according to the Shim header. Here, as explained above, any network can be used for the layer 1 transparent exclusive network as long as it is possible to transmit the MPLS frame which is multiplied from the router 151 to the router 88. In the present embodiment, an OTN is used. Therefore, the MPLS frame is further encapsulated in the OTU so as to be transmitted in the layer 1 transparent exclusive network.

Also, each IP packet or each MPLS frame which are transmitted from the OVPN to the OVPN terminating device 80 are extracted by the router 88. Furthermore, the Ether frame or the SDH frame is extracted from the IP packet or the MPLS frame in the encapsulating sections 85 and 86 so as to be transmitted to the user's device 20-1 or 21-2.

By doing this, it is possible to realize an OVPN in which it is possible to respond to a request for changing a signal format which is employed by the user quickly and transmit the signal in the OVPN efficiently by using a multiplying operation.

Twenty-Fourth Embodiment

Figure 46:
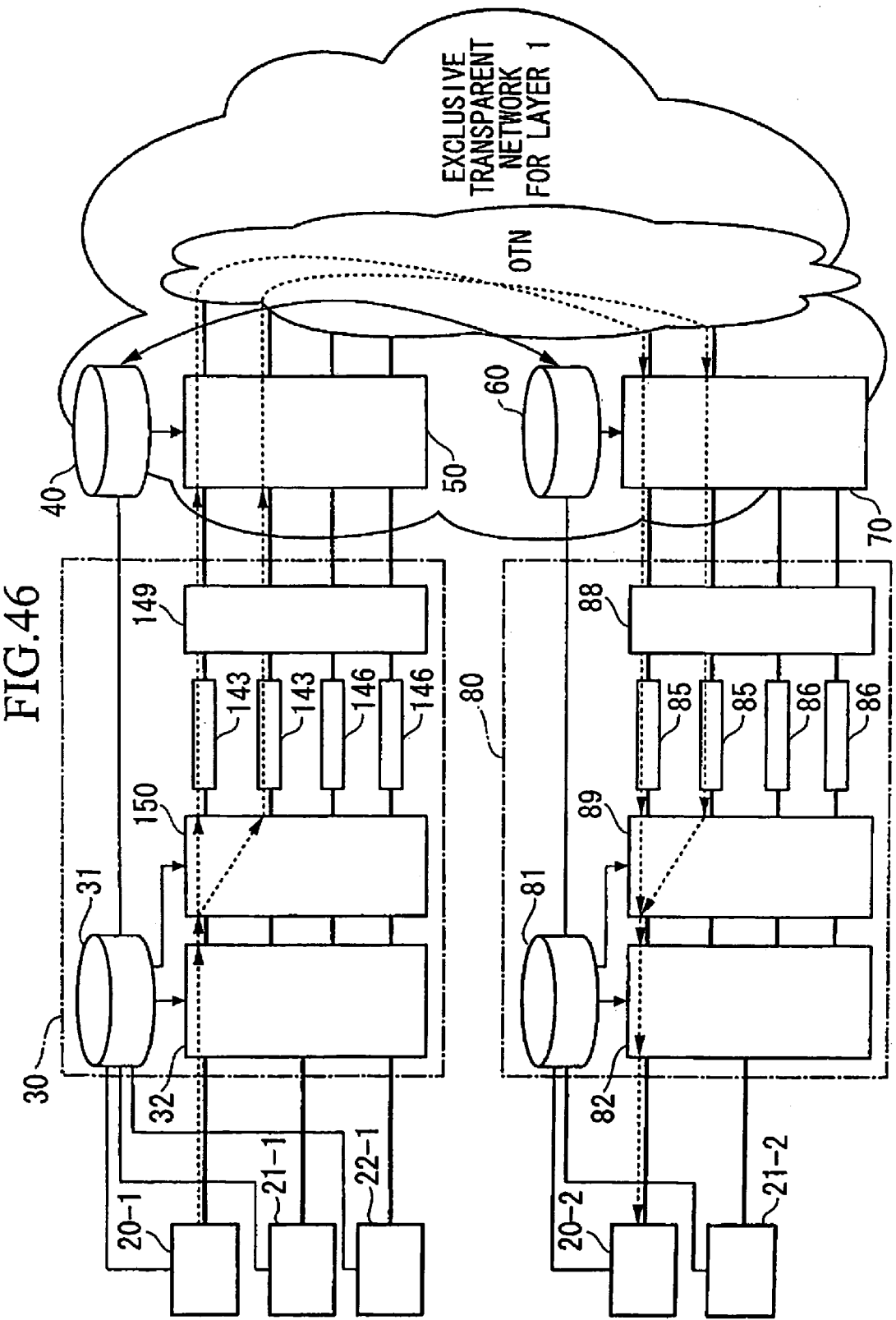
FIG. 46 is a view for explaining a structure for an OVPN according to a twenty-fourth embodiment.
Figure 47:
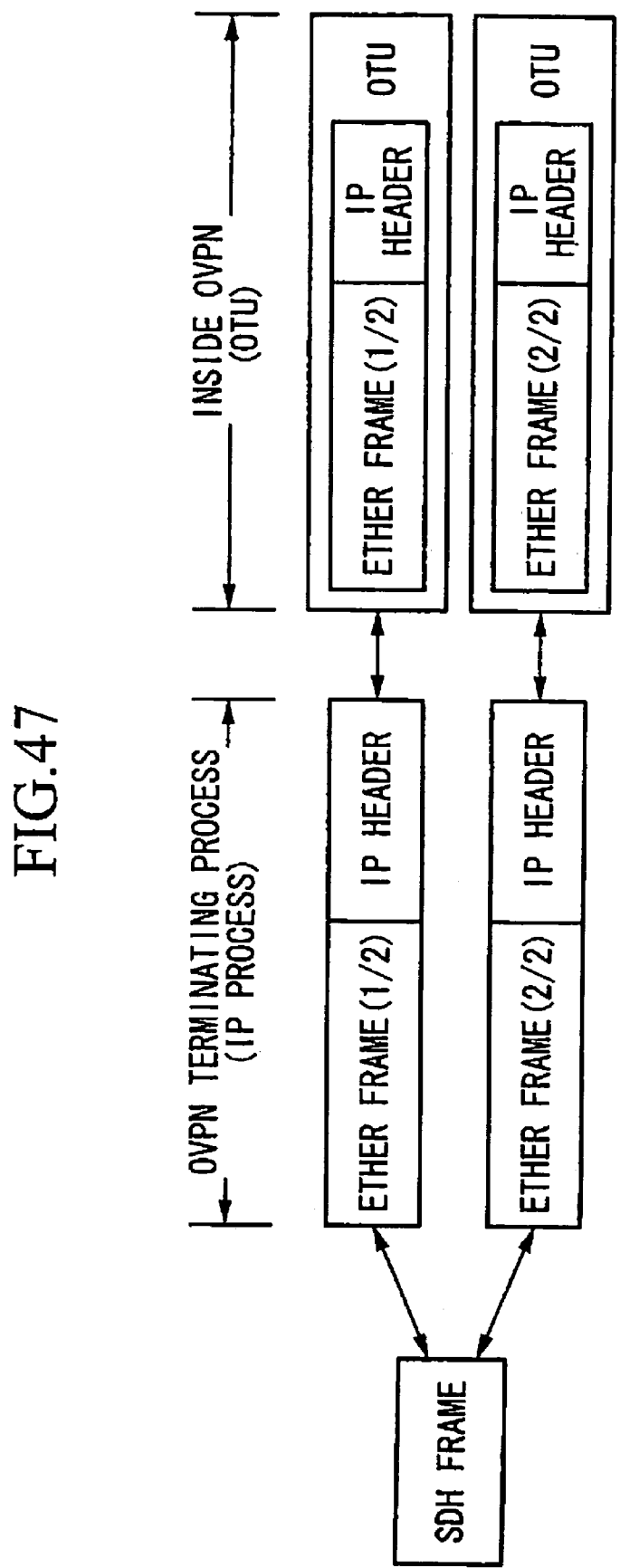
FIG. 47 is a view for explaining an IP encapsulating operation by dividing an SDH frame into a plurality of frames.
Figure 48:
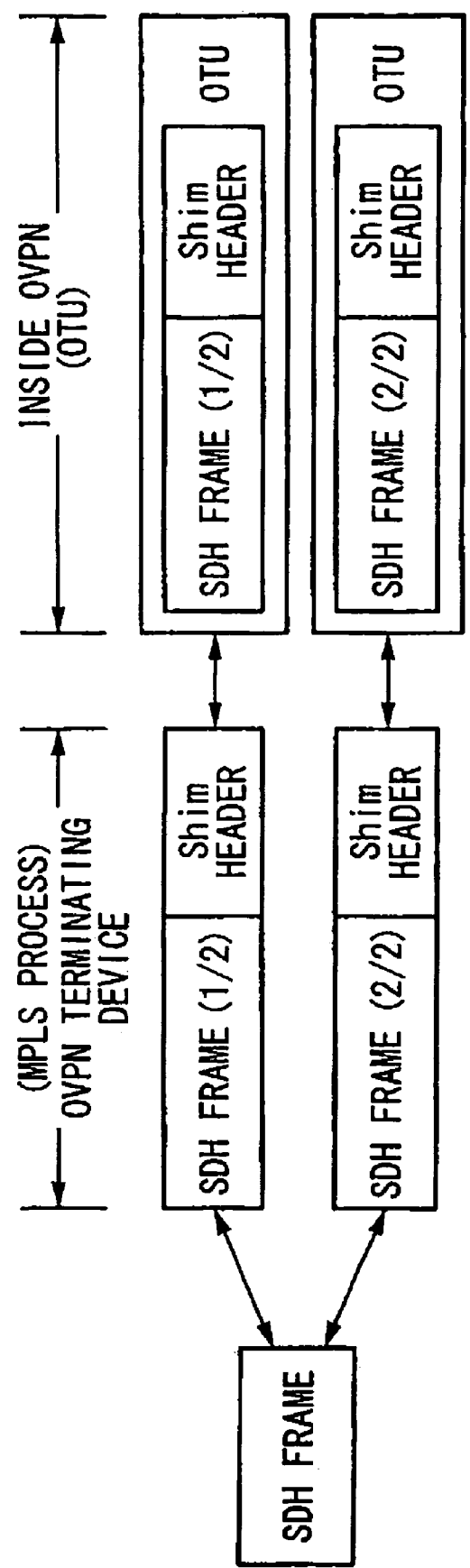
FIG. 48 is a view for explaining an MPLS encapsulating operation by dividing an SDH frame into a plurality of frames.
Figure 49:
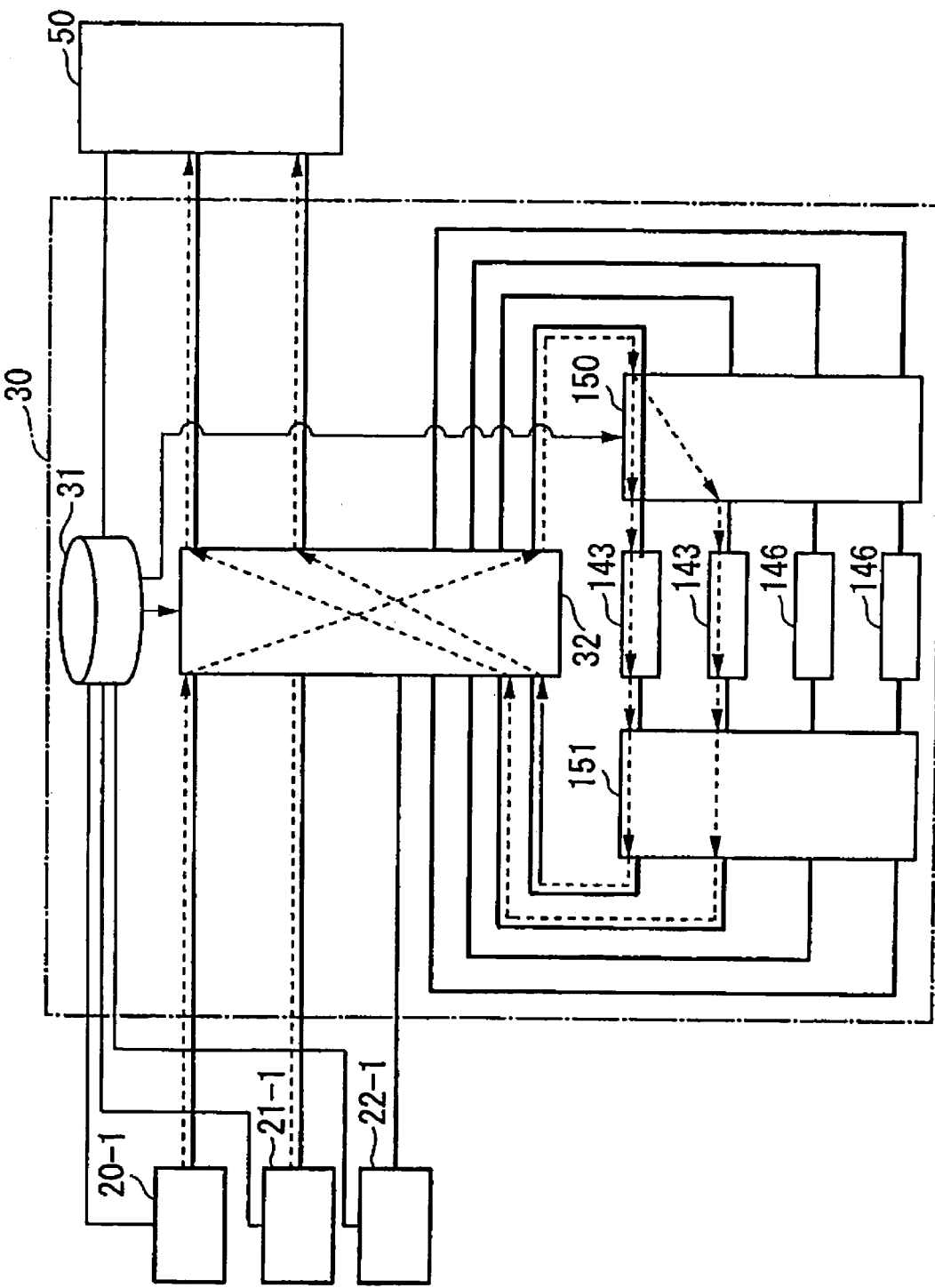
FIG. 49 is a view for explaining an OVPN terminating device according to the twenty-fourth embodiment.
Figure 50:
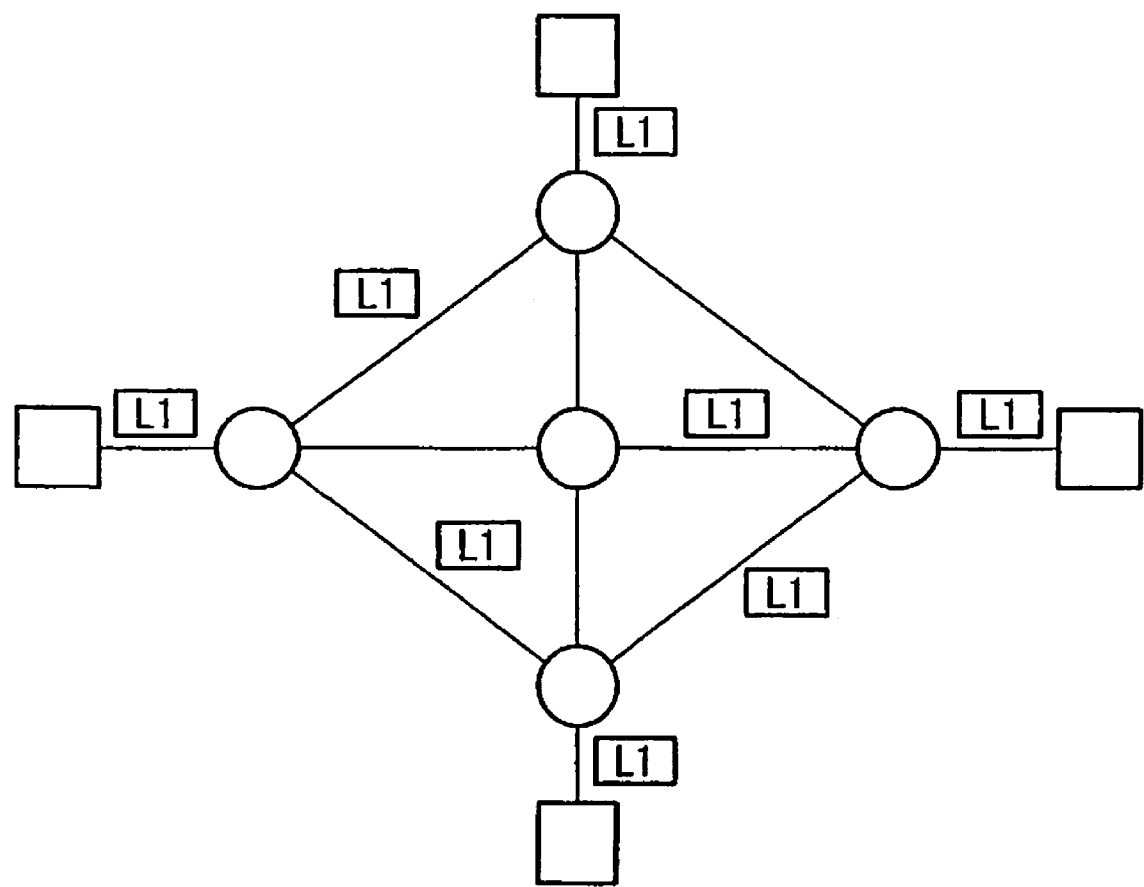
FIG. 50 is a view for showing a topology for a layer 1 network
Figure 51:
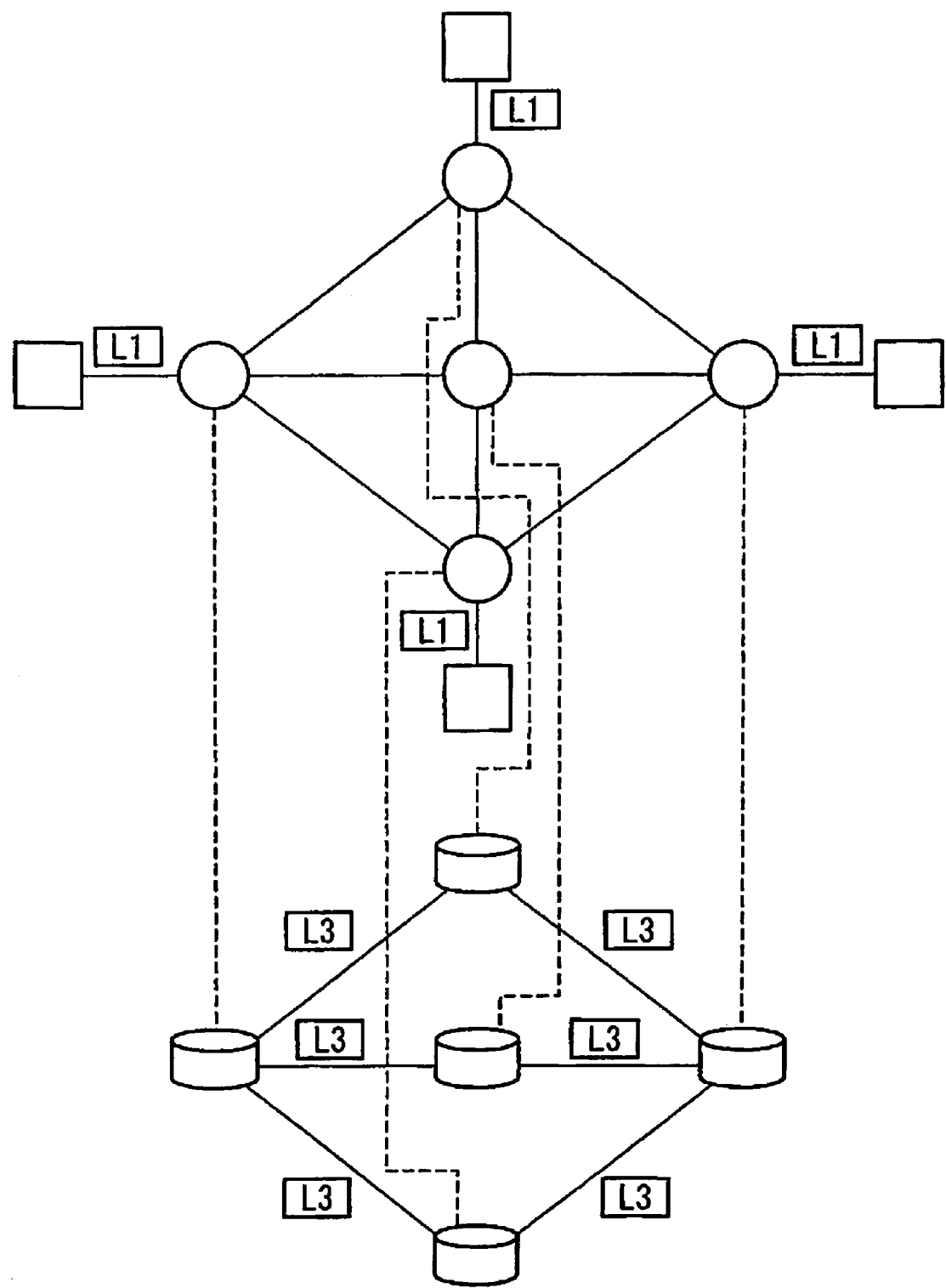
FIG. 51 is a view for explaining a relationship of a topology between the layer 3 network and the layer 1 network.

A twenty-fourth embodiment is explained with reference to FIGS. 46 to 49. FIG. 46 is a view for explaining a structure of the OVPN in the twenty-fourth embodiment. FIG. 47 is a view for performing an IP-encapsulating condition by dividing an SDH frame into a plurality of frames. FIG. 48 is a view for explaining an MPLS-encapsulating-operation by dividing an SDH frame into a plurality of frames. FIG. 49 is a view for explaining an OVPN terminating device (No. 2) in the twenty-fourth embodiment. Here, in the twenty-fourth embodiment, explanation can be made with reference to a case of SDH. However, explanation can be made even if the SDH is replaced by a SONET. In the twenty-fourth embodiment, as shown in FIG. 46, a direction of an optical cross connecting device 50 is set by a network controlling device 40. Thus, an OVPN is disposed in which an SDH network is disposed between the base points as a layer 1 transparent frame. Here, the network controlling device 40 can be controlled by the user's devices 20-1, 21-1, and 22-1 in each base point.

In an example shown in FIG. 47, the encapsulating sections 143 and, 146 shown in FIGS. 46 and 49 are IP-encapsulating device and an IP-de-encapsulating device. An SDH frame is used for a layer 1 frame. An IP header is add to the layer 1 frame which is transmitted from the user's device 20-1 to the OVPN terminating device 30 in the encapsulating section 143 so as to be encapsulated in the IP packet. When the SDH frame cannot be contained in an IP packet flow, the SDH frame is divided into a plurality of frames by a multiplying device 150 so as to be encapsulated by a plurality of packet flows by a plurality of encapsulating sections 143. Here, any network can be used for the layer 1 transparent exclusive network as long as it is possible to transmit the IP packet which is multiplied from the router 151 to the router 88. In the present embodiment, an OTN is used. Therefore, the IP packet is further encapsulated in the OTU so as to be transmitted in the layer 1 transparent exclusive network.

The IP header of the IP packet which is transmitted from the OVPN to the OVPN terminating device 80 is extracted in the encapsulating section 85. Furthermore, an SDH frame is restored from a plurality of SDH frames by the multiplying device 89 so as to be transmitted to the user's device 20-2.

In an example shown in FIG. 48, the encapsulating section 143 and 146 shown in FIGS. 46 and 49 are an MPLS encapsulating device and an MPLS de-encapsulating device. An SDH frame is used for a layer 1 frame. The Shim header is added to the layer 1 frame which is transmitted from the user's device 20-1 to the OVPN terminating device 30 in the encapsulating section 143 so as to be encapsulated in the MPLS frame. In such a case, if the SDH cannot be contained in an MPLS frame flow, the SDH frame is divided into a plurality of frames by the multiplying device 150 so as to be encapsulated in a plurality of MPLS frame flows by a plurality of encapsulating sections 143. Here, as explained above, any network can be used for the layer 1 transparent exclusive network as long as it is possible to transmit the MPLS frame which is multiplied from the router 151 to the router 88. In the present embodiment, an OTN is used. Therefore, the MPLS frame is further encapsulated in the OTU so as to be transmitted in the layer 1 transparent exclusive network.

Also, the Shim header of the MPLS frame which is transmitted from the OVPN to the OVPN terminating device 80 is removed in the encapsulating section 85. Furthermore, an SDH frame is restored from a plurality of SDH frames by the multiplying device 89 so as to be transmitted to the user's device 20-2. Also, it is possible to dispose an optical switch as shown in FIG. 49 in the twenty-fourth embodiment.

By doing this, it is possible to realize an OVPN in which it is possible to respond to a request for changing the signal format which is employed by the user and set a length of the signal desirably by transmitting a long signal by dividing therefore.

In examples shown in FIGS. 36 and 37, when processes which are explained in the twenty-third embodiment are performed, the multiplying device 150 is under a through-condition by stopping a multiplying function and a dividing function so as to use the encapsulating sections 143 and 146, and a router 151. Also, when processes which are explained in the twenty-fourth embodiment are performed, the multiplying device 150, the encapsulating sections 143 and 146, and the router 151 are used. In such a structure, a router is used in place of a multiplying device of the nineteenth embodiment. It is possible to realize the same effect as that realized in the nineteenth embodiment by such a structure.

Also, it is possible to dispose a collective converting device to which structure shown in FIGS. 38 and 39 is combined. By doing this, it is possible to perform the processes which are explained with reference to FIG. 38 or FIG. 39 preferably. Such a structure is the same as that shown in FIG. 39. That is, the structure of the FIG. 38 is realized by the structure of the FIG. 39 by stopping the multiplying function and the dividing function in the multiplying device 150 so as to be under a through-condition such that the multiplying function and the dividing function are performed by the router 151.

Twenty-Fifth Embodiment

Figure 52:
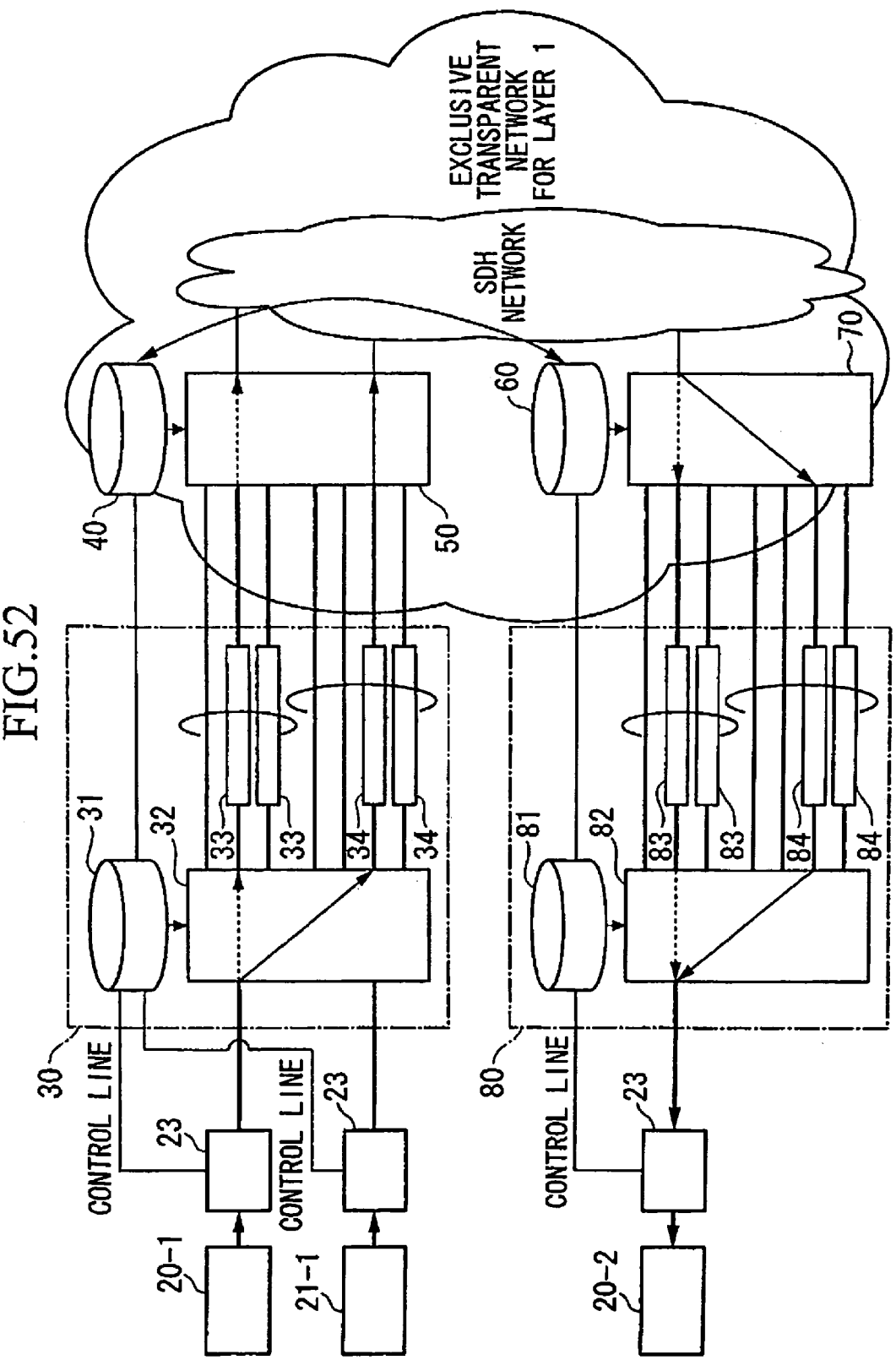
FIG. 52 is a view for explaining a structure for an OVPN according to a twenty-fifth embodiment.
Figure 53:
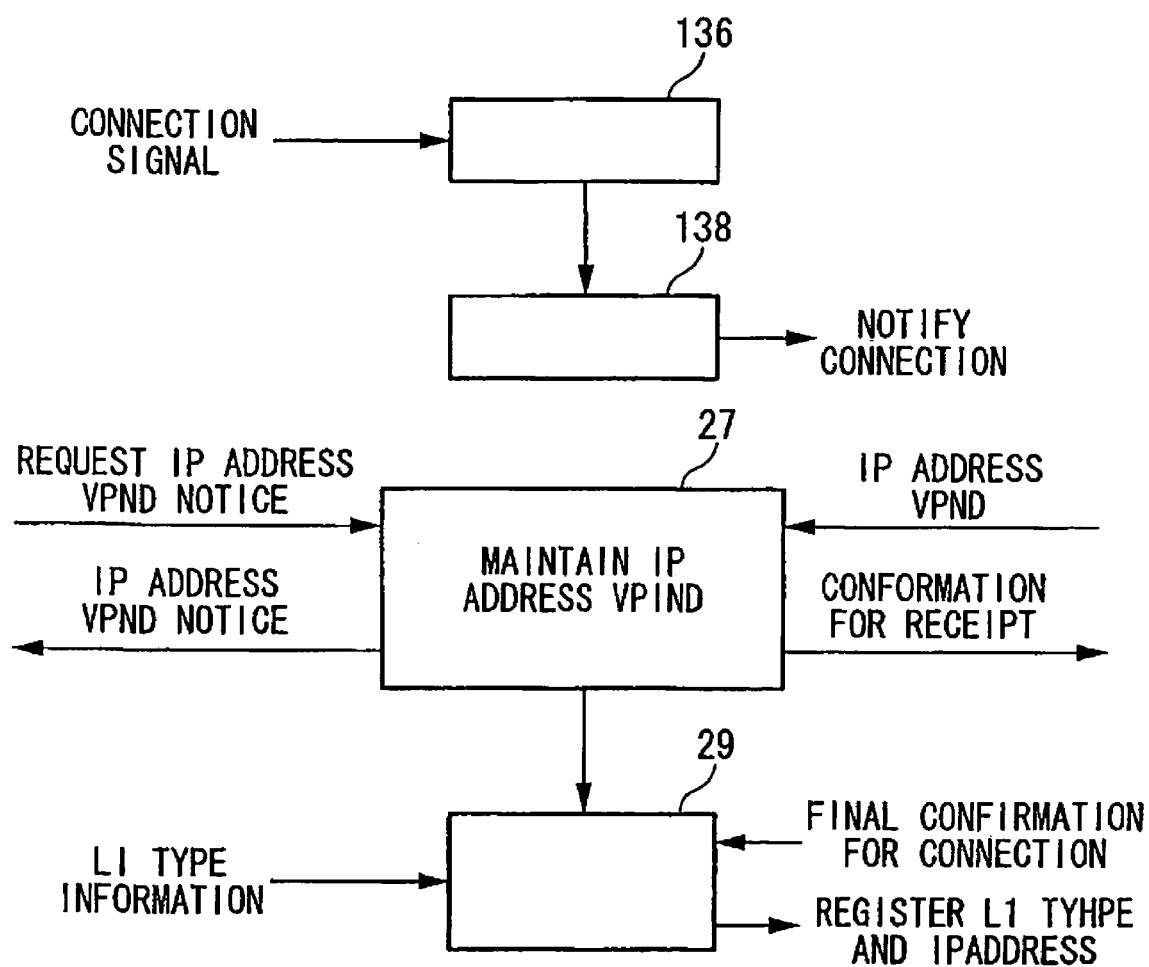
FIG. 53 is a block diagram for a base point device according to the twenty-fifth embodiment.
Figure 54:
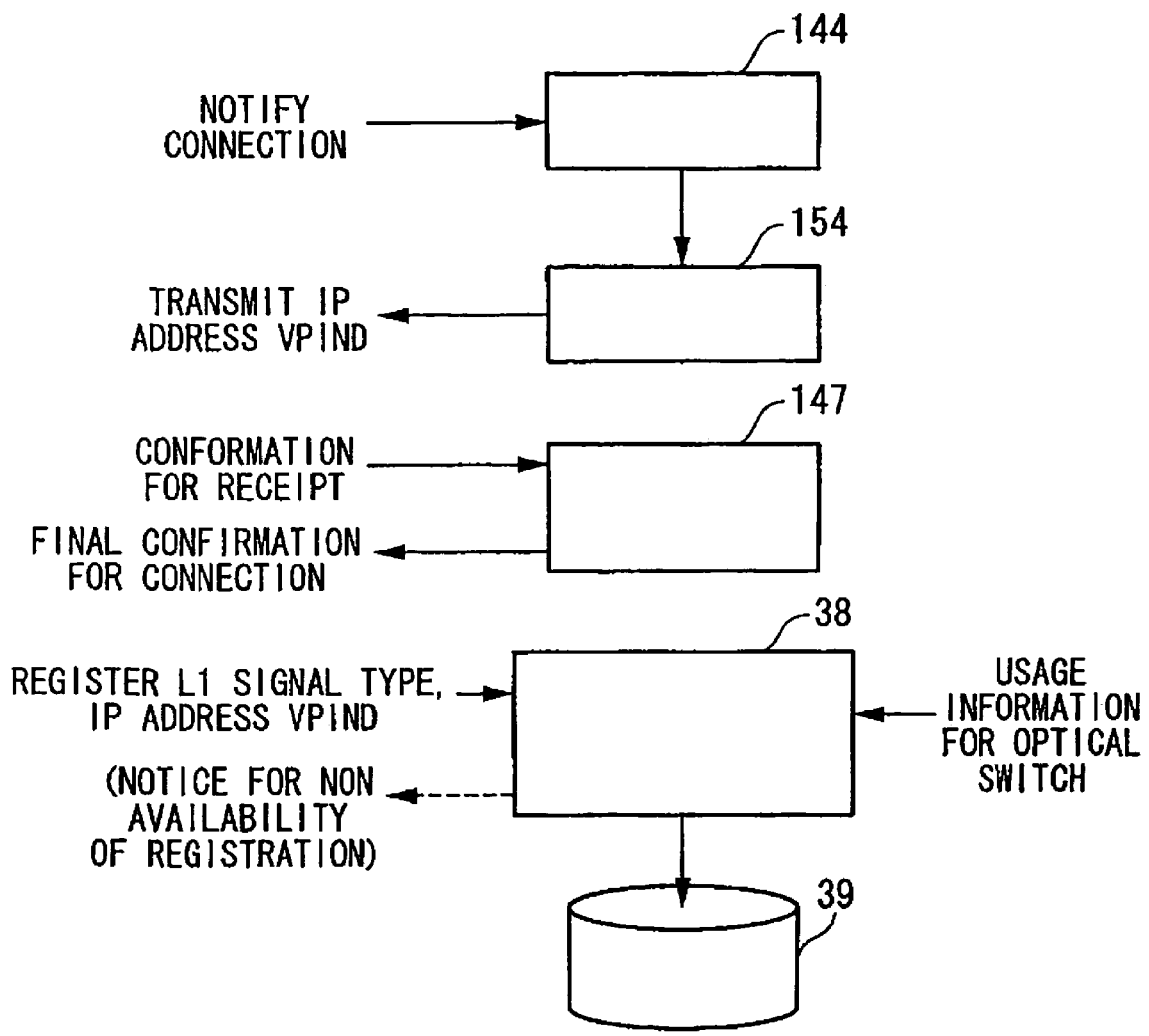
FIG. 54 is a block diagram for an optical switch controlling device according to the twenty-fifth embodiment.
Figure 55:
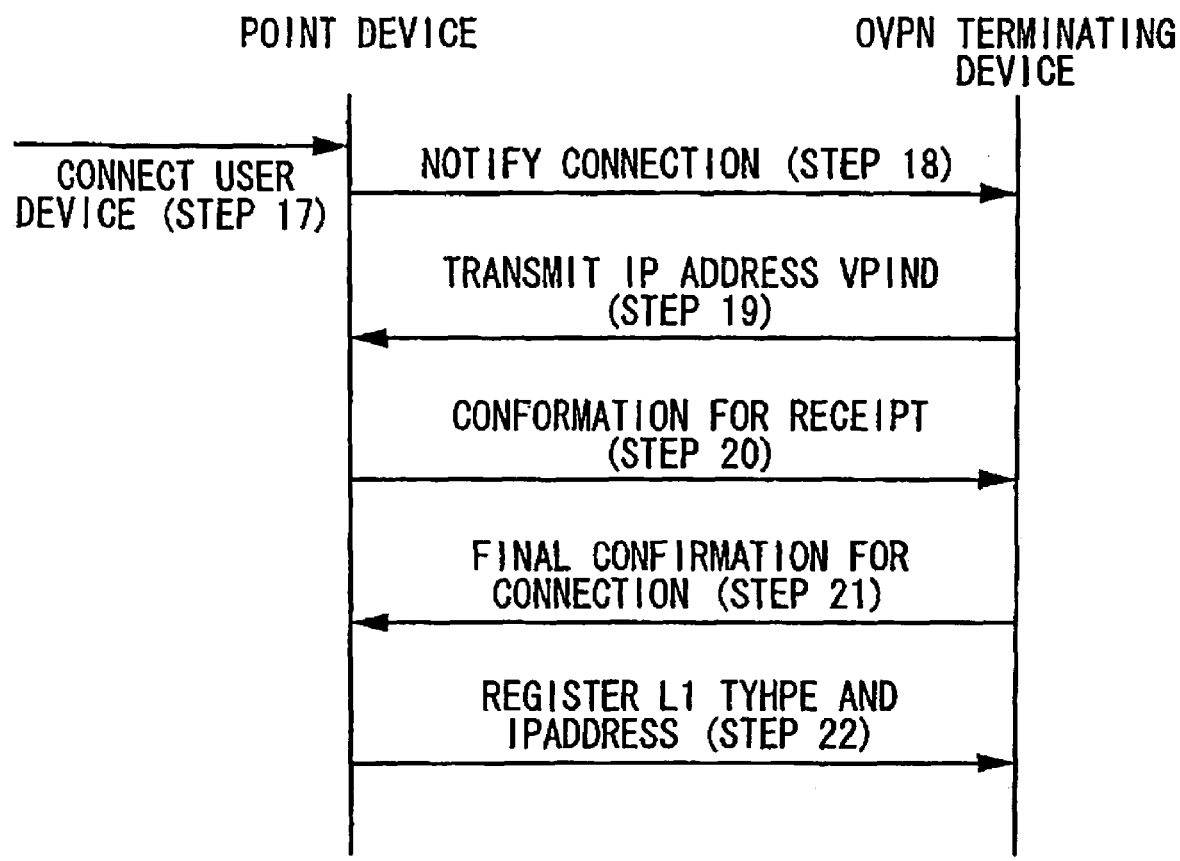
FIG. 55 is a sequence diagram for operations according to the twenty-fifth embodiment.
Figure 56:
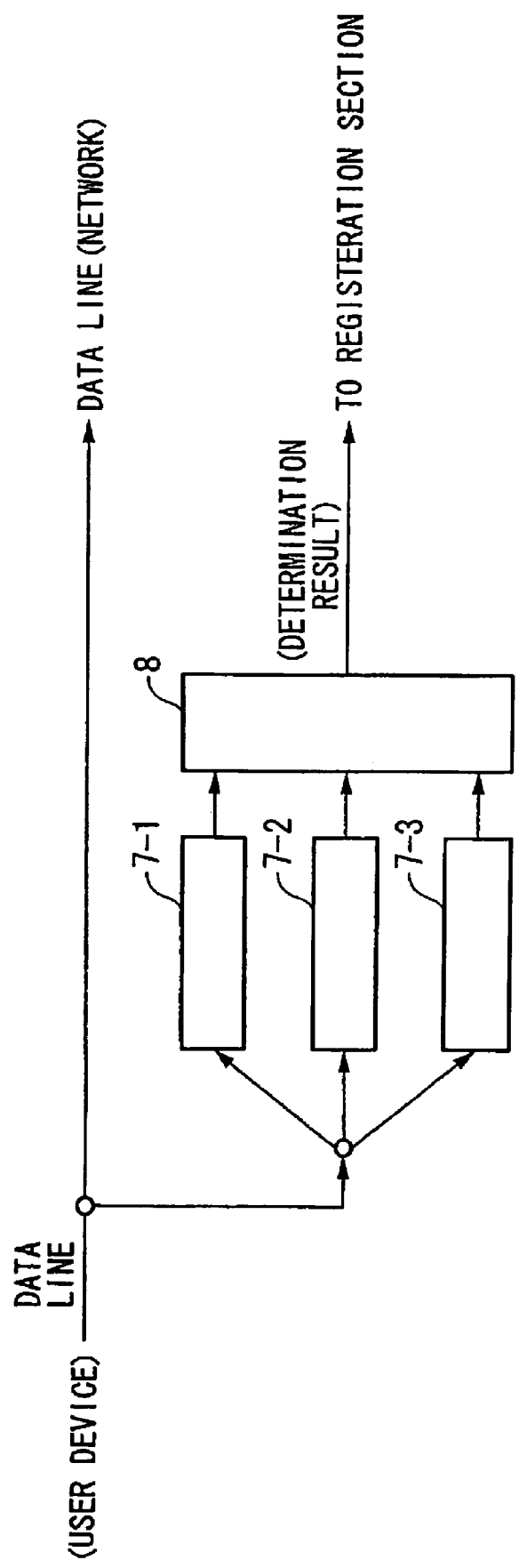
FIG. 56 is a view for explaining an L1 signal determining operation according to the twenty-fifth embodiment.
Figure 57:
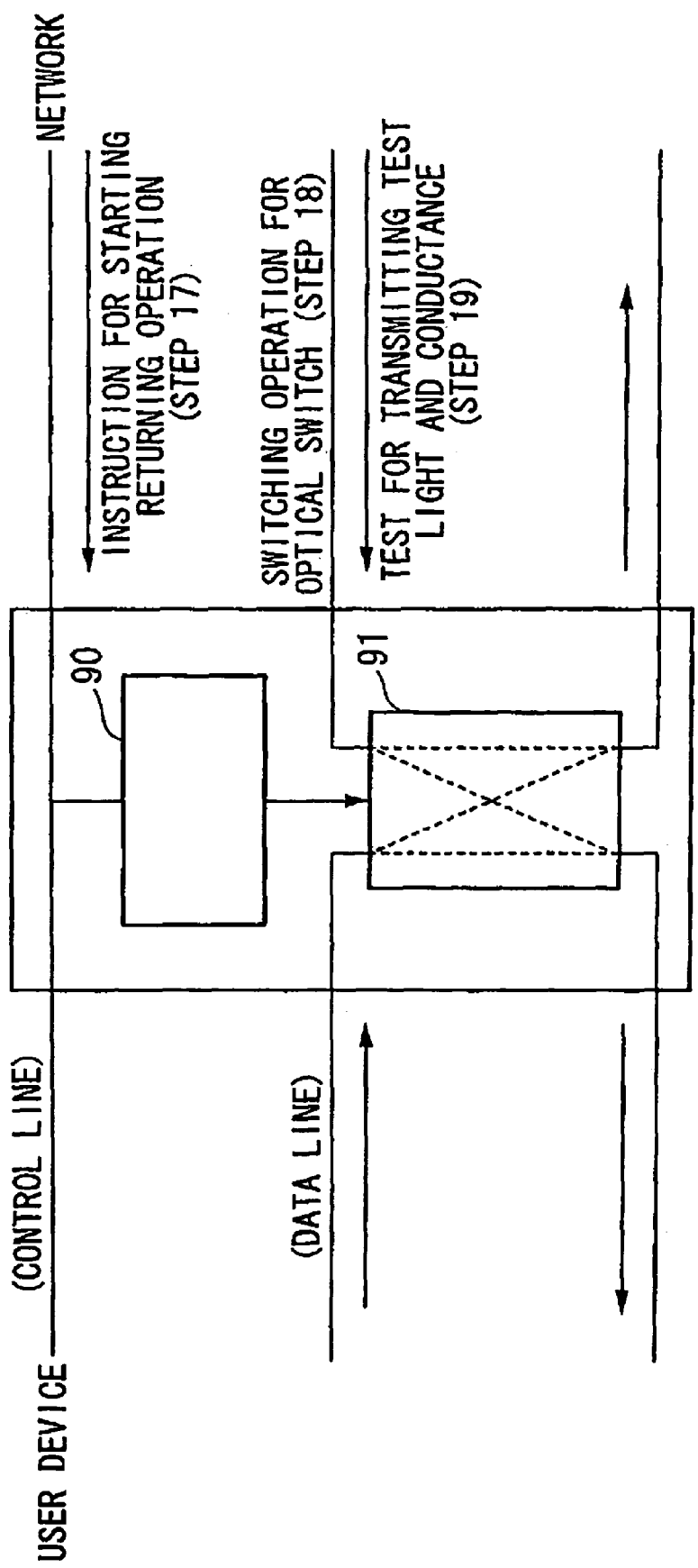
FIG. 57 is a block diagram for a separating testing apparatus according to the twenty-fifth embodiment.
Figure 58:
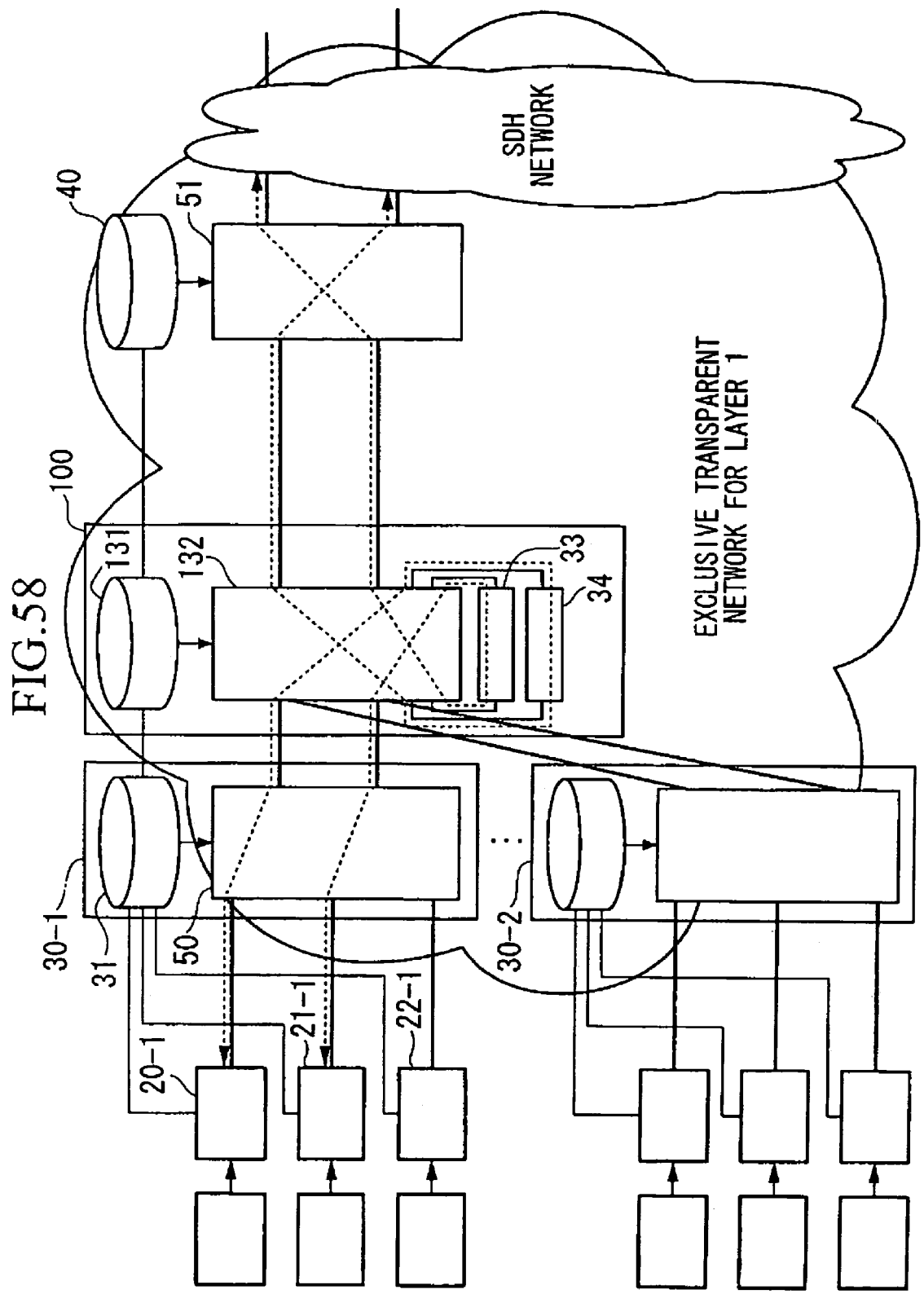
FIG. 58 is a block diagram for a collective converting device according to the twenty-fifth embodiment.

A twenty-fifth embodiment is explained with reference to FIGS. 52 to 58. FIG. 52 is a view for explaining a structure of an OVPN in the present embodiment. FIG. 53 is a block diagram, for a base point device in the present embodiment. FIG. 54 is a block diagram for an optical switch controlling device in the present embodiment. FIG. 55 is a sequence diagram for explaining operations in the present embodiment. FIG. 56 is a view for explaining a determining operation for the L1 signal in the present embodiment. FIG. 57 is a block diagram for a separating testing device in the present embodiment. FIG. 58 is a block diagram for a collective converting device in the present embodiment.

A direction of the optical cross connecting device 50 is set by the network controlling device 40 such that an OVPN is formed so as to have an SDH network among the base points. Here, it is possible to control the network controlling device 40 by the user's devices 20-1 and 21-1 in each base point.

In the twenty-fifth embodiment, the OVPN terminating device 30 is provided with converters 33 and 34 as signal converters for converting a Gigabit Ethernet or an ATM which are the first signal format which are employed in the user's devices 20-1, 20-1, and 21-1 and an SDH which is the second signal format which is different from the first signal format which is employed in the OVPN alternately. A plurality of converters 33 and 34 are disposed so as to correspond to a plurality of different first signal formats. By controlling the optical switch 32, it is determined which converter 33 or 34 to use.

Here, if the same signal format is used in the user's device and the OVPN commonly, it is not necessary to switch the signal at all. Thus, it is possible to perform a communication without via the converters 33 and 34. Such a case is not necessary for explaining technical features of the present invention; thus, such explanations are omitted.

Also, it is possible to use the OVPN as long as it is possible to convert the signal format which is used in the user's device 20-1 and the signal format which is used in the user's device 20-2 under conditions in which the signal format which is used in the user's device 20-1 and the signal format which is used in the user's device 20-2 are different from each other. Here, in order to simplify the explanation, explanations are made under conditions in which the signal formats are the same.

That is, the OVPN terminating device 30 in the present embodiment is provided with converters 33 and 34 for converting the first signal format and the second signal format alternately as shown in FIG. 52 when the first signal format which is used in the user's device 20-1 of the OVPN describer and the second signal format which is used in the OVPN are different from each other. A plurality of the converters 33 and 34 are disposed so as to correspond to a plurality of different first signal formats. As shown in FIG. 3, the optical switch controlling device 31 is provided with a notification receiving section 144 for receiving a notice that the user's device 20-1 is connected to the base point device 23 via a control channel from the base point device 23 which is disposed between the user's device 20-1 and the OVPN and an address generating section 154 for transmitting the IP address and the VPNID which are allocated to the user's device 20-1 for the base point device 23.

Furthermore, the OVPN terminating device 30 is provided with a connection processing section 147 for receiving a receipt confirmation for the IP address and the VPNID which are transmitted from the address generating section 154 and transmitting a final connection confirmation for notifying the receipt confirmation to the base point device 23.

Furthermore, the OVPN terminating device 30 is provided with a signal conversion determining section 38. The signal conversion determining section 38 receives the first signal format type information which is employed in the user's device 20-1 by the control channel after the final connection confirmation is transmitted and retrieves whether or not there is a converter 33 or 34 which corresponds to the format type. The signal conversion determining section 38 registers the IP address and the VPNID which are allocated to the user's device 20-1 and the first signal format type information which is employed in the user's device 20-1 into the database 39 when the retrieved result indicates that there is a converter 33 or 34 which corresponds to the format type.

Here, there are two cases in which it is retrieved that there is not a converting resource by the signal conversion determining section 38. One is a case in which the OVPN is not provided with a converting function initially. Another is a case in which the OVPN is provided with a converting function but the converting resource is occupied in the other OVPN. In the former case, it is acceptable to determine that there is not a converting resource. However, in the latter case, it is acceptable to tentatively determine that there is a converting resource and await until the resource is vacant. In the latter case, a determining standard for whether instantly determining that there is not a converting resource or tentatively determining that there is a converting resource so as to await depends on the usage condition of the OVPN. That is, if the usage condition is that the user starts immediately after the registration is completed, it is determined that the L1 signal type cannot be used even in a case in which the converting resource is provided by occupied. Also, under a usage condition in which actual communication starts after a certain period of time after the registration is completed by the user it is determined that the L1 signal type can be used if the converting resource is provided notwithstanding that it is occupied.

Also, as shown in FIG. 53, the base point device 23 which is inserted between the OVPN terminating device 30 and the user's device 20-1 which is contained in the OVPN terminating device 30 is provided with a connection detecting section 136 for detecting a fact that the user's device 20-1 is connected to the base point device 23, a connection notifying section 138 for notifying that the connection detecting section 136 is connected to at least an OVPN terminating device 30 via the control channel when it is detected that the connection detecting section 136 is connected, and an address maintaining section 27 for receiving the IP address and the VPNID which are allocated from at least an OVPN terminating device 30 to the user's device 20-1 via the control channel. The address maintaining section 27 is provided with a registering section 29 which transmits the receipt confirmation to an OVPN terminating device 30 which receives the IP address and the VPNID and transmits the first signal format type information, the IP address, and the VPNID which are used by the user's device 20-1 to the OVPN terminating device 30 which receives the final connection confirmation for the receipt confirmation via the control channel.

Next, operations in the present embodiment are explained with reference to FIG. 55. When the user's device 20-1 is connected to the base point device, the connection detecting section 136 in the base point device 23 detects that the user's device 20-1 is connected to the base point device (step 17). A detected output from the connection detecting section 136 is inputted to a connection notifying section 138, the connection notifying section 138 receives the inputted detection output so as to transmit a connection notification (step 18). A notification receiving section 144 in the OVPN terminating device 30 receives the connection notification so as to transmit the IP address and the VPNID of the base point device 23 (step 19). The address maintaining section 27 in the base point device 23 receives the IP address and the VPNID so as to transmit the receipt confirmation to the OVPN terminating device 30 (step 20). In such a case, the connection confirmation is received by a plurality of OVPN terminating devices except the OVPN terminating device 30; thus, the IP address and the VPNID are transmitted to the base point device 23 from a plurality of the OVPN terminating devices. The address maintaining section 27 selects an IP address and a VPNID among a plurality of IP addresses and a plurality of VPNIDs. Here, an OVPN terminating device 30 which is disposed nearest to the base point device 23 is selected. More specifically, an OVPN terminating device to which the IP address and the VPNID arrive fastest is selected.

When the connection processing section 147 in the OVPN terminating device 30 receives the receipt confirmation, the connection processing section 147 transmits the final connection confirmation to the base point device 23 (step 21). When the final connection confirmation arrives at a registering section 29, the registering section 29 transmits the IP address and the VPNID which are maintained in the address maintaining section 27 to the OVPN terminating device 30 together with the L1 type information which is used in the user's device 20-1. The OVPN terminating device 30 retrieves the vacancy in the converters 33 and 34 according to the received L1 type information so as to register the IP address, VPNID, and the L1 type information into the database 39 if it is possible to contain the L1 type information (step 22).

Here, the registering section 29 can not only obtain the L1 type information of the user's device 20-1 from the user's device 20-1, but also obtain the L1 type information from the signal determining section 8 shown in FIG. 56. That is, the base point device 23 is provided with a plurality of error detecting sections 7-1 to 7-3 and a signal determining section 8. The error detecting sections 7-1 to 7-3 perform calculation simulation processing's for a particular signal format respectively. Such a calculation simulation processing's are designed so as to generate an error message to signal format except a particular kind of signal format. The signal determining section 8 monitors the result in the calculation simulation processing's in the error detecting sections 7-1 to 7-3. The inputted signal format type is specified by monitoring an occurrence of error in the error detecting sections 7-1 to 7-3. Such a determined result is notified to the registering section 29 so as to be transmitted to the OVPN terminating device 30. In such a case, it is necessary for the user's device 20-1 to transmit the test signal to the data line until the signal determining section 8 obtains the determined result.

Here, for other method for determining the signal format type, there is a following method. In this method, inputted signals are inputted into the converters 33 and 34 by the optical switch 32 so as to monitor an occurrence of error. If any converter 33 or 34 in which an error does not occur is found, it is possible to determine that the signal format which is handled in such a converter is the signal format of the inputted signal.

Furthermore, as shown in FIG. 57, the base point device 23 is provided with a retuning controlling device and an optical switch 91 which separates the user's device 20-1 and the OVPN and returns the test beam which is transmitted from the OVPN back to the OVPN.

Also, in FIG. 52, the OVPN terminating device 30 is provided with the converters 33 and 34, and the OVPN terminating device 30. However, it is possible to dispose a collective converting device which is provided with an optical switch controlling device 131 and an optical switch 132 for realizing a function of the converters 33 and 34 in a plurality of OVPN terminating devices 30-1 and 30-2 commonly as shown in FIG. 58.

Here, in a case in which a plurality of collective converting devices are disposed, a collective converting device which is disposed in a shortest path to the OVPN terminating device is selected. In such a case, if the collective converting device which is disposed in the shortest path to the OVPN terminating device is occupied, the next shortest collective converting device is selected.

Twenty-Sixth Embodiment

Figure 59:
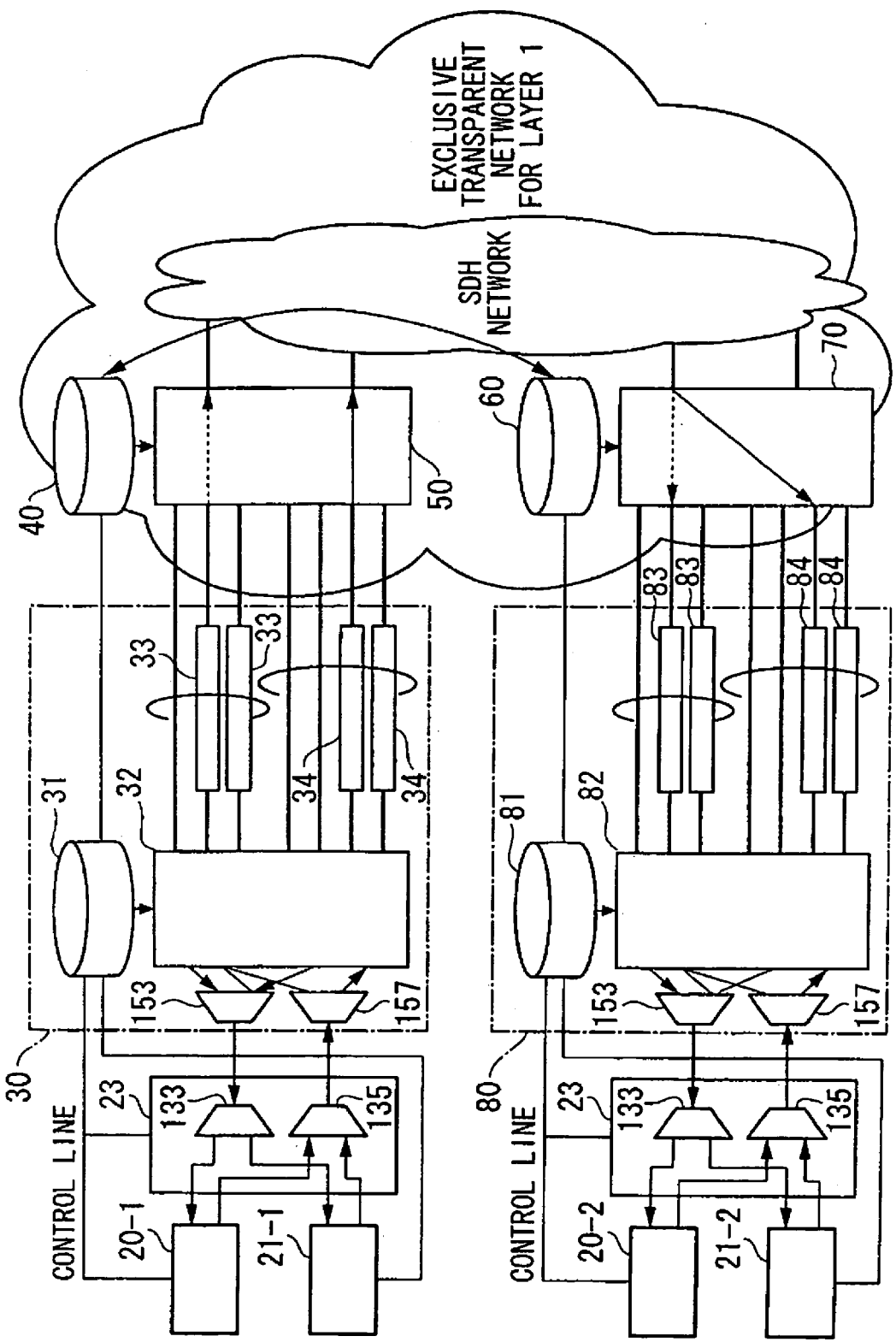
FIG. 59 is a view for explaining a structure for an OVPN according to a twenty-sixth embodiment.

A twenty-sixth embodiment is explained with reference to FIG. 59. FIG. 59 is a view for explaining a structure in the twenty-sixth embodiment.

The base point device 23 in the twenty-sixth embodiment is inserted among the OVPN and the user's devices 20-1, 21-1, 20-2, and 21-2. As far as the user's devices 20-1 and 21-1 are concerned, the base point device 23 is provided with an optical multiplexer 135 which multiplies a plurality of optical wavelength signals which are used in the user's devices 20-1 and 21-1 so as to transmit to the OVPN and a demultiplexer 133 which divides the optical wavelength signals which arrive from the OVPN so as to transmit to the user's devices 20-1 and 21-1. Thus, the base point device 23 notifies an information regarding the wavelength information and regarding that the wavelength is multiplied regarding the optical multiplexer 135 and the optical demultiplexer 133 respectively via the control line.

Also, the OVPN terminating device 30 in the twenty-sixth embodiment is provided with an optical multiplexer 53 which contains the user's devices 20-1 and 21-1 via the base point device 23 so as to multiply a plurality of the optical wavelength signals which arrive from the OVPN and transmit to the base point device 23 and an optical demultiplexer 152 which separates the optical wavelength multiplied signal which arrives from the base point device 23. The optical switch controlling device 31 transmits the optical wavelength signal which is demultiplexed by the optical demultiplexer to a predetermined path according to the information which is notified by the base point device 23.

Here, the base point device is disposed in the user's device. However, it is possible to realize the same effect of the present invention even if the base point device is disposed in the network; therefore, the present invention does not depend on where the base point device is disposed. Thus, any disposition of the base point device can be accepted in the present invention.

Twenty-Seventh Embodiment

Figure 60:
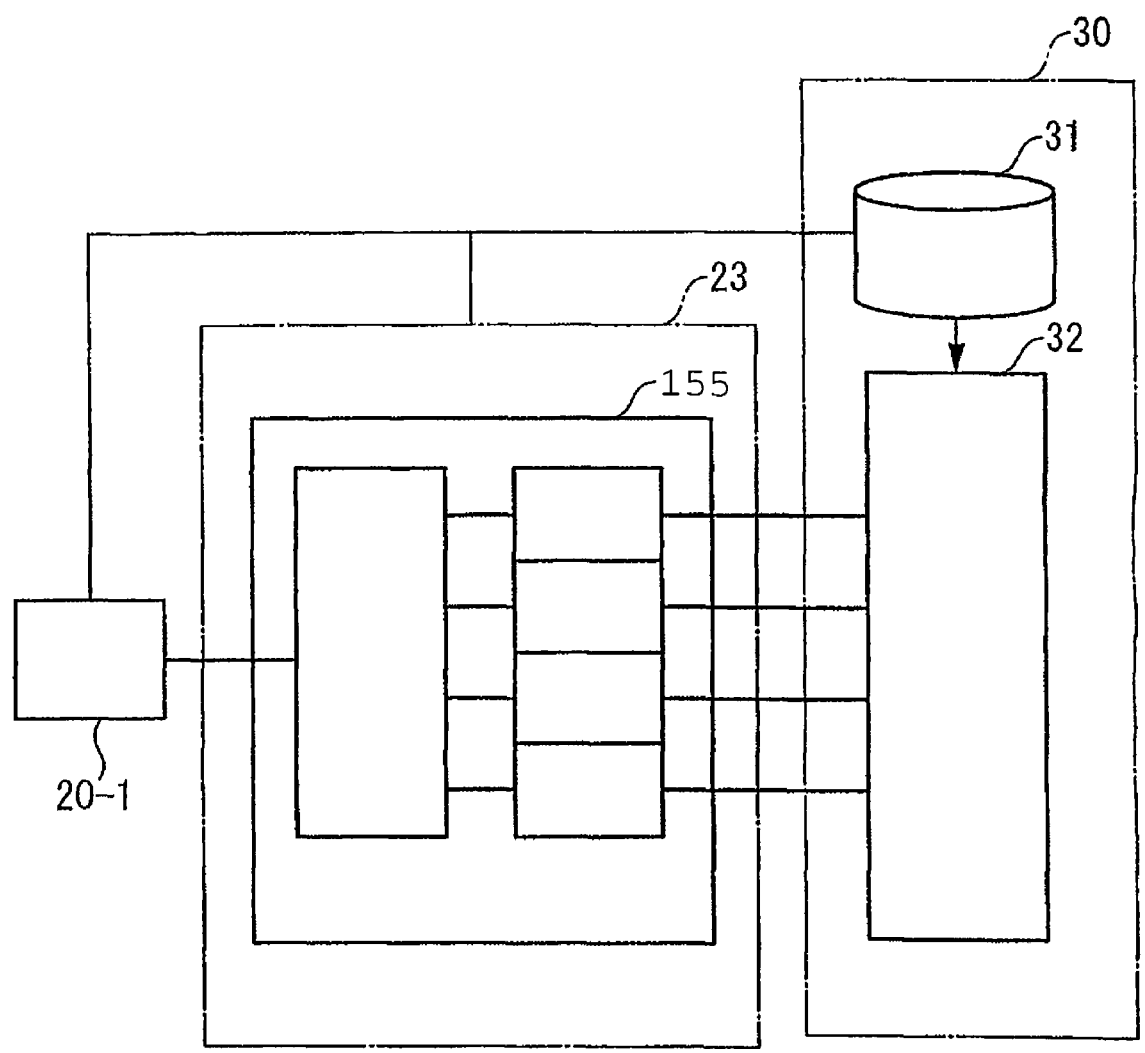
FIG. 60 is a block diagram for a base point device and an OVPN terminating device according to a twenty-seventh embodiment.

A twenty-seventh embodiment is explained with reference to FIG. 60. FIG. 60 is a block diagram for an OVPN terminating device in the twenty-seventh embodiment.

As shown in FIG. 60, the base point device 23 in the twenty-seventh embodiment is provided with a serial/parallel converter 155 which is inserted between the OVPN and the user's device 20-1 so as to convert a serial signal which is transmitted from the user's device 20-1 into a plurality of parallel signals and transmit a plurality of the parallel signals to the OVPN and convert a plurality of the parallel signals which arrive from the OVPN into serial signals so as to transmit the serial signals to the user's device 20-1. Thus, an information which indicates that the serial signals are converted into the parallel signals and an information regarding a topology of the parallel signals are notified to the OVPN.

The OVPN terminating device 30 in the twenty-seventh embodiment contains the user's device 20-1 via the base point device 23 so as to input the parallel signals which are divided from a series of the serial signals into a plurality of converters 33 or 34 which correspond to the same first signal format according to the information which is notified from the base point device 23.

Twenty-Eighth Embodiment

Figure 61:
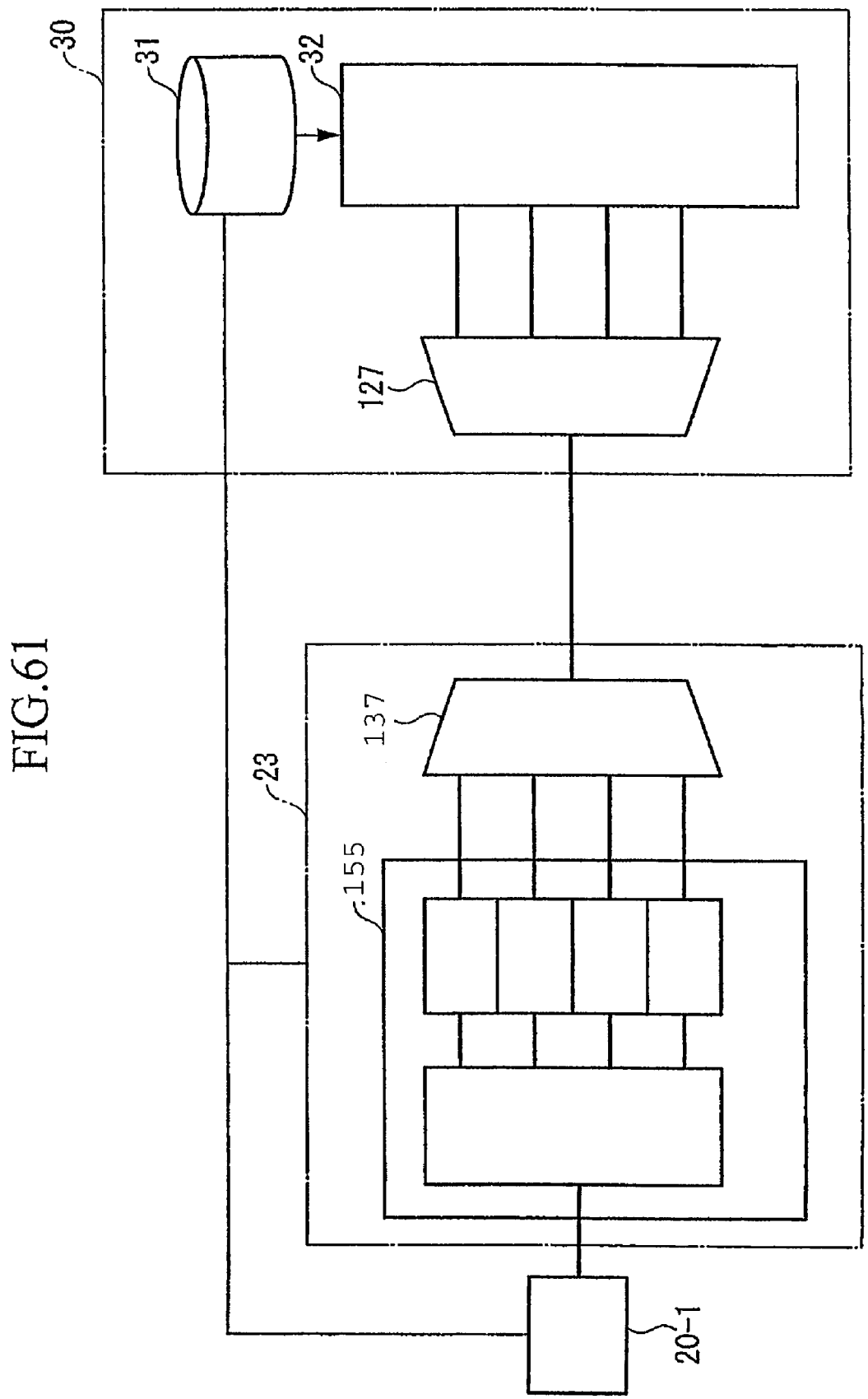
FIG. 61 is a block diagram for a base point device and an OVPN terminating device according to a twenty-eighth embodiment.

A twenty-eighth embodiment is explained with reference to FIG. 61. FIG. 61 is a block diagram for the base point device 23 and the OVPN terminating device 30 in the twenty-eighth embodiment.

As shown in FIG. 61, the base point device 23 in the twenty-eighth embodiment is provided with a serial/parallel converter 155 which is inserted between the OVPN and the user's device 20-1 and an optical multiplexer/demultiplexer 137. The serial/parallel converter 155 multiplies the wavelength of the parallel signal which is obtained by converting the serial signal which is transmitted from the user's device 20-1 so as to be transmitted to the OVPN and separates the wavelength multiplication signal which arrives from the OVPN into parallel signals and convert the parallel signals into the serial signals so as to be transmitted to the user's device 20-1. The OVPN is notified of an information that the serial signal is converted into the parallel signal, an information regarding a topology of the parallel signal, and an information that the wavelength of the parallel signal is multiplied so as to be transmitted.

The OVPN terminating device in the twenty-eighth embodiment is provided with an optical multiplexer/demultiplexer 127 which contains the user's device 20-1 via the base point device 23. The optical multiplexer/demultiplexer 127 multiplies the parallel signal which arrives from the OVPN to be transmitted to the base point device 23 and separates the optical wavelength multiplication signal which arrives from the base point device 23 so as to transmit to the OVPN. The parallel signal which is separated from the wavelength multiplication signal according to the information which is notified by the base point device 23 is inputted into a plurality of converters 33 or 34 respectively which corresponds to the first signal format.

Figure 62:
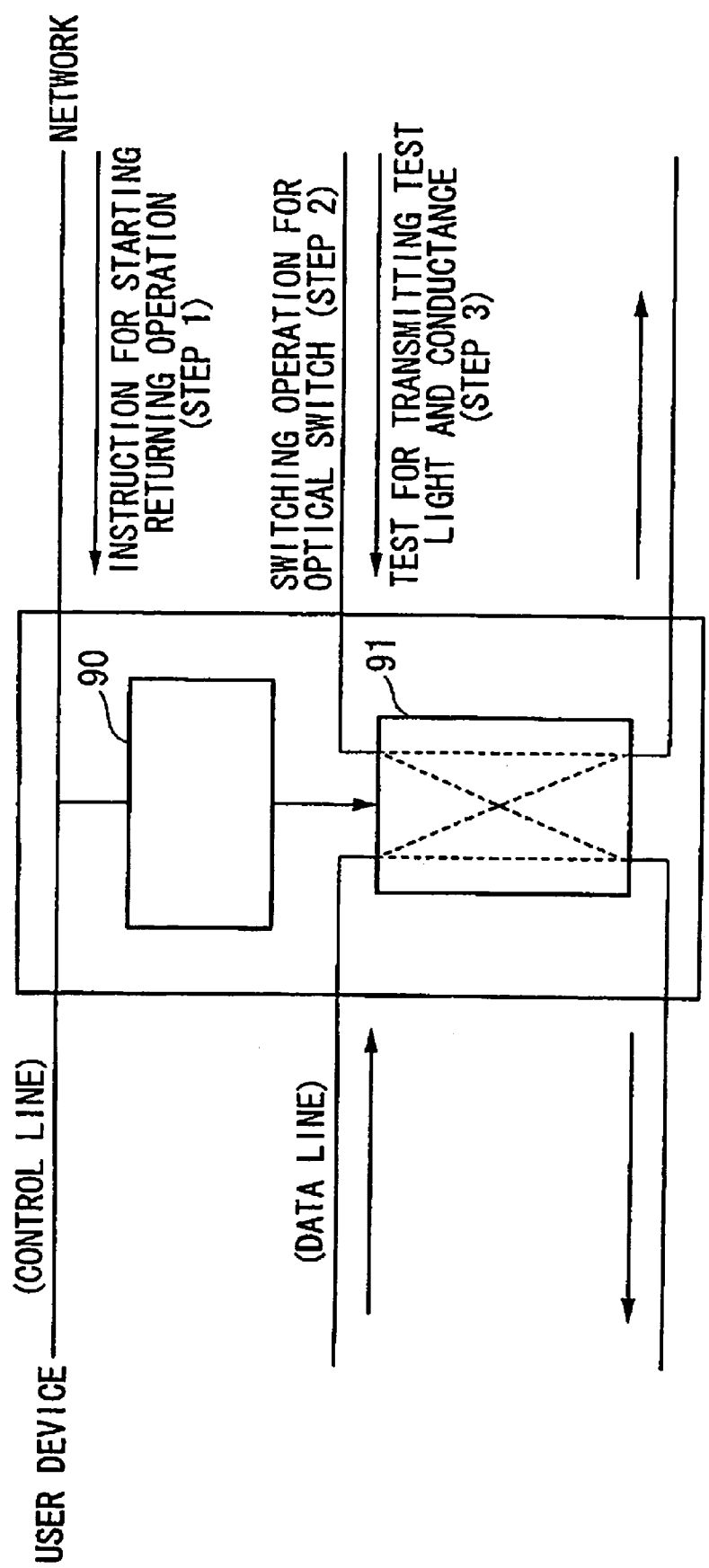
FIG. 62 is a view for explaining a testing method for a circuit which is disposed in the base point device according to a twenty-ninth embodiment.

Here, the optical signals which are inputted into the optical multiplexer/demultiplexers 137 and 127 from the serial/parallel converter 155 an the optical switch 32 for multiplying the wavelength between the optical multiplexer/demultiplexers 137 and 127 are converted into wavelengths which are different from each other. The optical signals which are outputted from the optical multiplexer/demultiplexers 137 and 127 to the serial/parallel converters 155 and the optical switch 32 are reverted to the previous condition of wavelength under which the optical signal is inputted from the serial/parallel converter 155 and the optical switch 32 to the optical multiplexer/demultiplexers 137 and 127 respectively Twenty-Ninth Embodiment A twenty-ninth embodiment is explained with reference to FIG. 62. FIG. 62 is a view for explaining a structure in a testing device in a base point device in the twenty-ninth embodiment. The testing device shown in FIG. 62 is provided with a return controlling device 90 for separating the user's device 20-1 and the OVPN and returning the test beam which is transmitted from the OVPN back to the OVPN and an optical switch disposed in the base point device.

Thirtieth Embodiment

Figure 63:
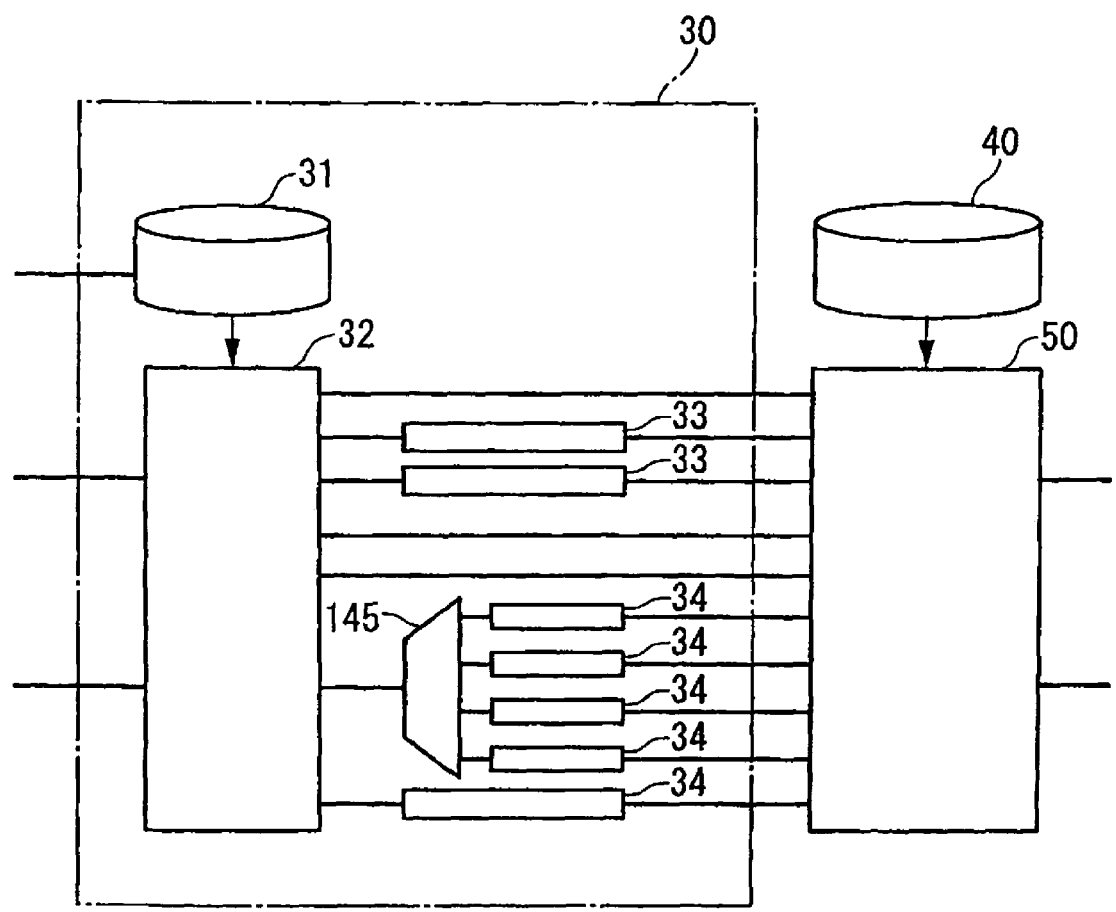
FIG. 63 is a block diagram for an OVPN terminating device according to a thirtieth embodiment.

A thirtieth embodiment is explained with reference to FIG. 63. FIG. 63 is a block diagram for an OVPN terminating device in the thirtieth embodiment. The OVPN terminating device 30 in the thirtieth embodiment is provided with converters 33 and 34. At least a part of converter 34 contains an optical multiplexer/demultiplexer 145 which converts a serial signals according to a serial first signal format which is directed to the OVPN from the user's device into a signal according to a plurality of the parallel second signal formats in the OVPN and converts a plurality of parallel signals according to the second signal format which is directed from the OVPN to the user's device into a serial signals according to the serial first signal format alternately.

By doing this, it is possible to handle a case in which a transmission speed outside of the OVPN is faster than the transmission speed in the OVPN. In an example shown in FIG. 63, the transmission speed outside of the OVPN is 10 Gbit/s, and the transmission speed in the OVPN is 2.5 Gbit/s. It is still possible to handle such a case because it is possible to convert the serial signals having 10 Gbit/s of transmission speed and parallel signals in four lines having 2.5 Gbit/s of transmission speed alternately by the optical multiplexer/demultiplexer 145. It is possible to handle a speed conversion by employing a structure shown in FIG. 63 in the collective converting device 100 with combining the converters 33 or 34 in the collective converting device 100 shown in FIG. 10 and a optical multiplexer/demultiplexer 145 which is shown in FIG. 63.

Thirty-First Embodiment

Figure 64:
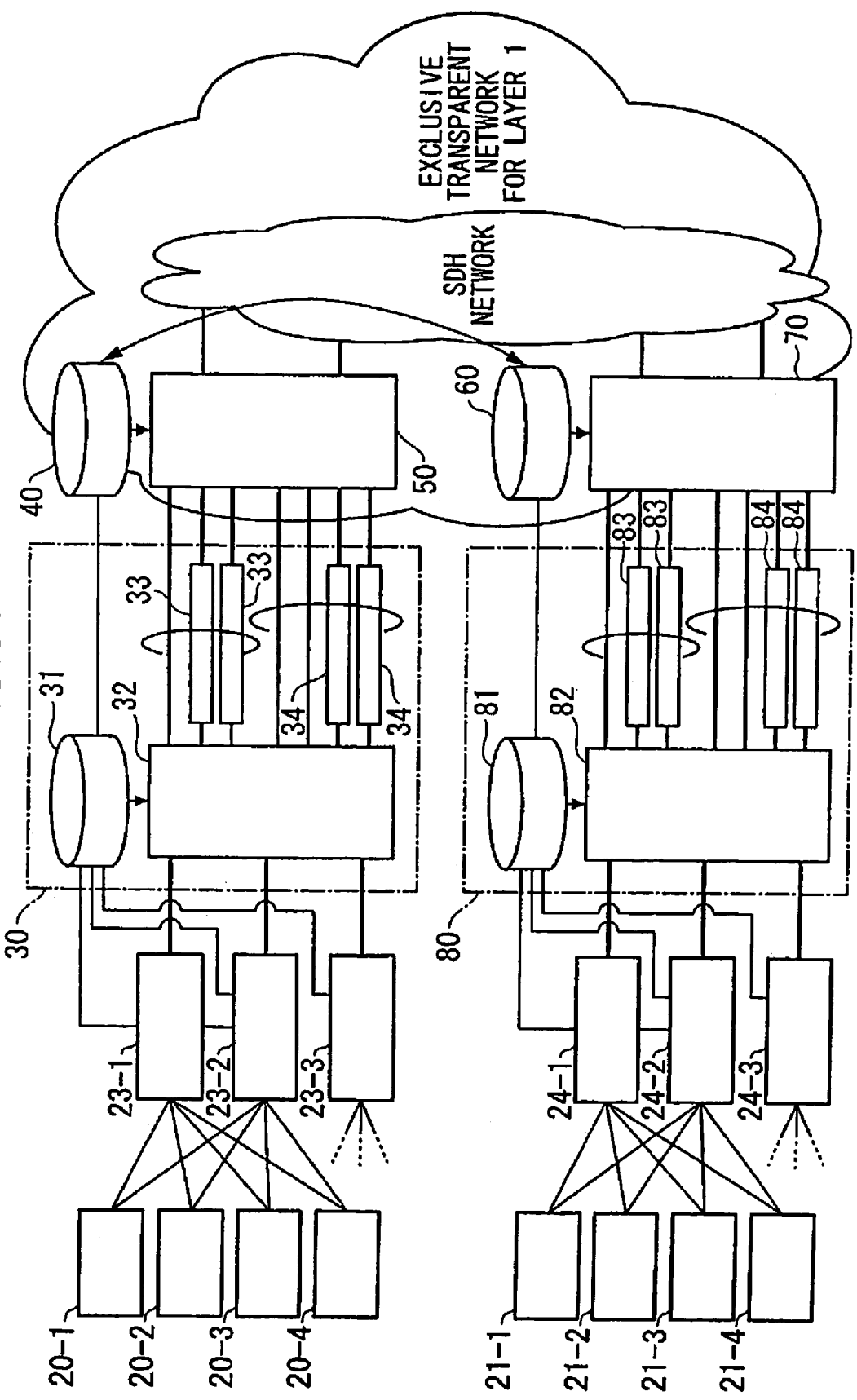
FIG. 64 is a view for a structure for an OVPN according to a thirty-first embodiment.
Figure 65:
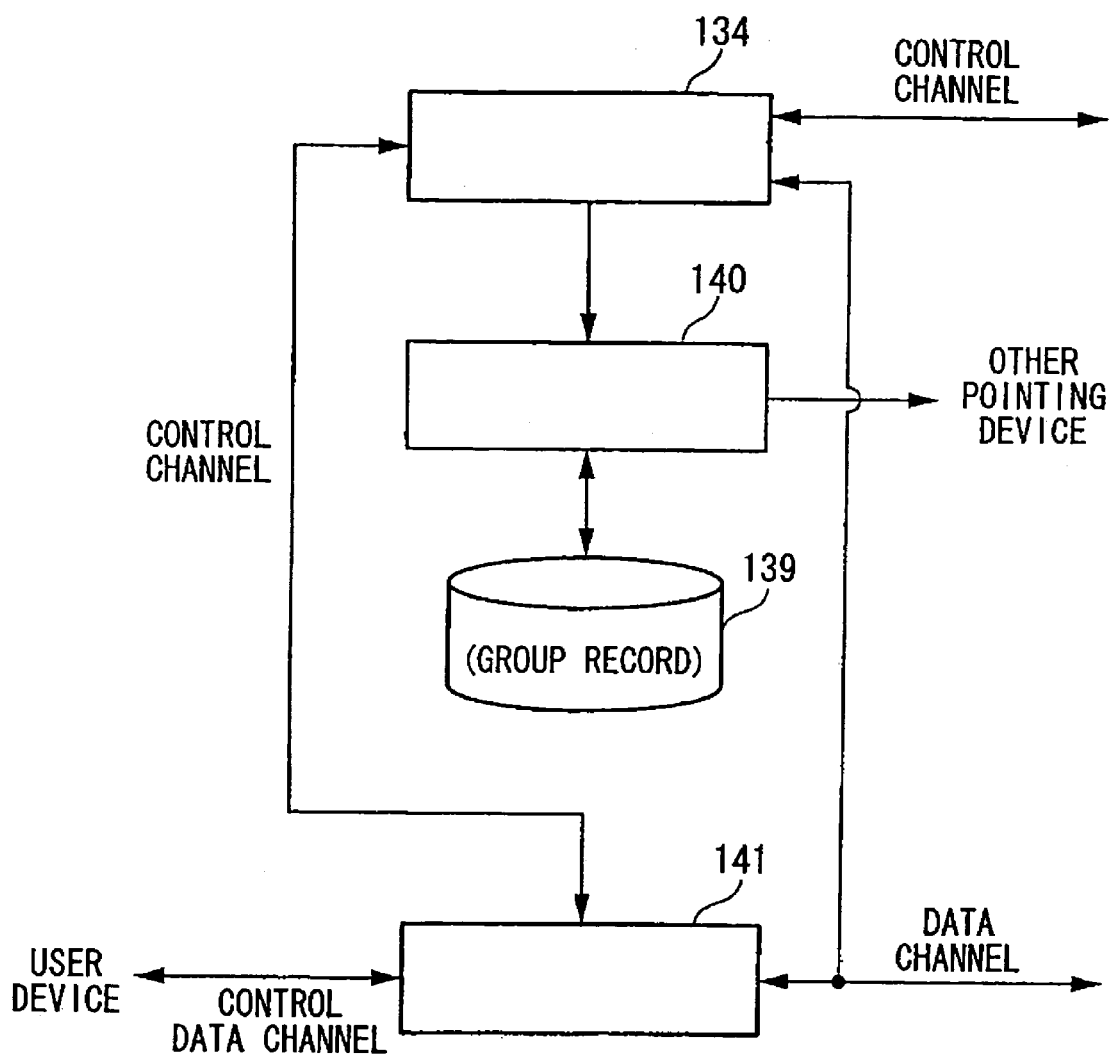
FIG. 65 is a block diagram for a base point device according to the thirty-first embodiment.
Figure 66:
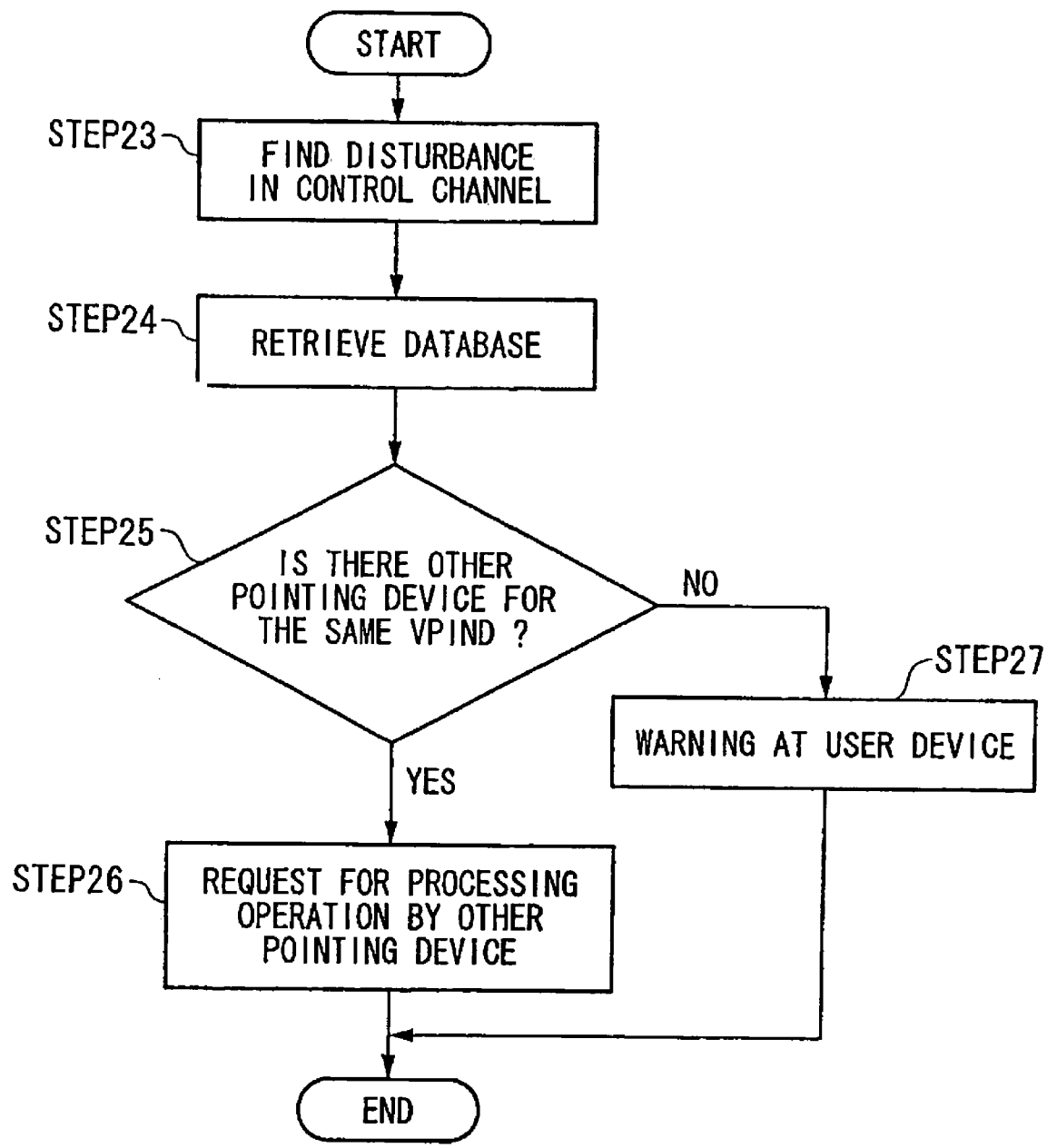
FIG. 66 is a flow chart for explaining operations in the base point device according to the thirty-first embodiment.

A thirty-first embodiment is explained with reference to FIGS. 64 to 66. FIG. 64 is a view for a structure of an OVPN in the thirty-first embodiment. FIG. 65 is a block diagram for a base point device in the thirty-first embodiment. FIG. 66 is a flow chart for showing operations in the base point device in the thirty-first embodiment.

That is, the base point devices 23-1 to 23-3 are inserted among the OVPN terminating device 30 and the user's devices 20-1 to 20-4. In the thirty-first embodiment, as shown in FIG. 65, the base point devices 23-1 to 23-3 are provided with a database 139 which stores a group for the base point devices which relate to the same VPNIDs, an error detecting section 134 for detecting an occurrence of an error in a control channel or in a data channel, and a subsidiary process requesting section 140 which requests other base point devices in the same group that the processes be handled with reference to the database 139 when the error detecting section 134 detects the occurrence of the error Here, a user service section 141 has a function for improving operability for the user by containing the user's device. This function does not relate to the present invention directly. As far as a function in the user service section 141 is concerned, the OVPN has a control line in which a control channel is disposed and a data line in which a data channel is disposed. The user needs to connect the user's device to these two lines respectively. In such a case, it is possible for the user to omit a connecting operation by transmitting the data by multiplying the control channel and the data channel by connecting the user's device and the user service section 141 by a transmission path and separating the control channel and the data channel into the control line and the data line by the user service section 141. Alternatively, the user needs to notify the signal format which is used in the user's device to the OVPN terminating device. In such a case, it is possible to omit the operation for notifying the signal format by the user by detecting the signal format which is used in the user's device automatically by the user service section 141 and notifying the detected signal format to the OVPN terminating device in place of the user.

Next, operations in the base point device in the thirty-first embodiment are explained with reference to FIGS. 64 to 66. FIG. 66 is a flow chart for explaining operations in the base point device in the thirty-first embodiment. Explanation is made with reference to the base point device 23-1 and the user's device 20-1 shown in FIG. 64. When an error detecting section 134 detects an occurrence of an error in the control channel or the data channel caused in the base point device (step 23), an indication that the error detecting section 134 detects an occurrence of an error in the control channel or the data channel caused in the base point device to the subsidiary process requesting section 140. The subsidiary process requesting section 140 which is notified of that the error occurs in the control channel retrieves whether or not there is other base point device other than the VPNID (step 25). In an example shown in FIG. 64, the base point device 23-2 has a same VPNID "a"; thus, the base point device 23-1 requests the base point device 23-2 perform the subsidiary processing operation (step 26). The base point device 23-2 performs the subsidiary service for the user's device 20-1 in place of the base point device 23-1 accordingly. If other base point device which has the same VPNID as that in the base point device 23-1 cannot be found, the base point device 23-2 emits an alarm to the user's device 20-1 (step 27). Thus, an error in the control channel or the data channel is notified.

Here, the user service section 141 has a function for performing the subsidiary processing operation after receiving a subsidiary processing request from the other base point device.

Here, in the OVPN, it is supposed that a node which detects an occurrence of an error transmits an error notification publication packet. The error detecting section 134 detects an occurrence of an error by receiving the error notification publication packet. Also, when the occurrence of an error in the base point device is detected, the error detecting section 134 transmits the error notification publication packet to the other node. An alarm for the user is converted to a signal format which is used in the user's device which is contained in the base point device so as to be transmitted to the user.

Thirty-Second Embodiment

Figure 67:
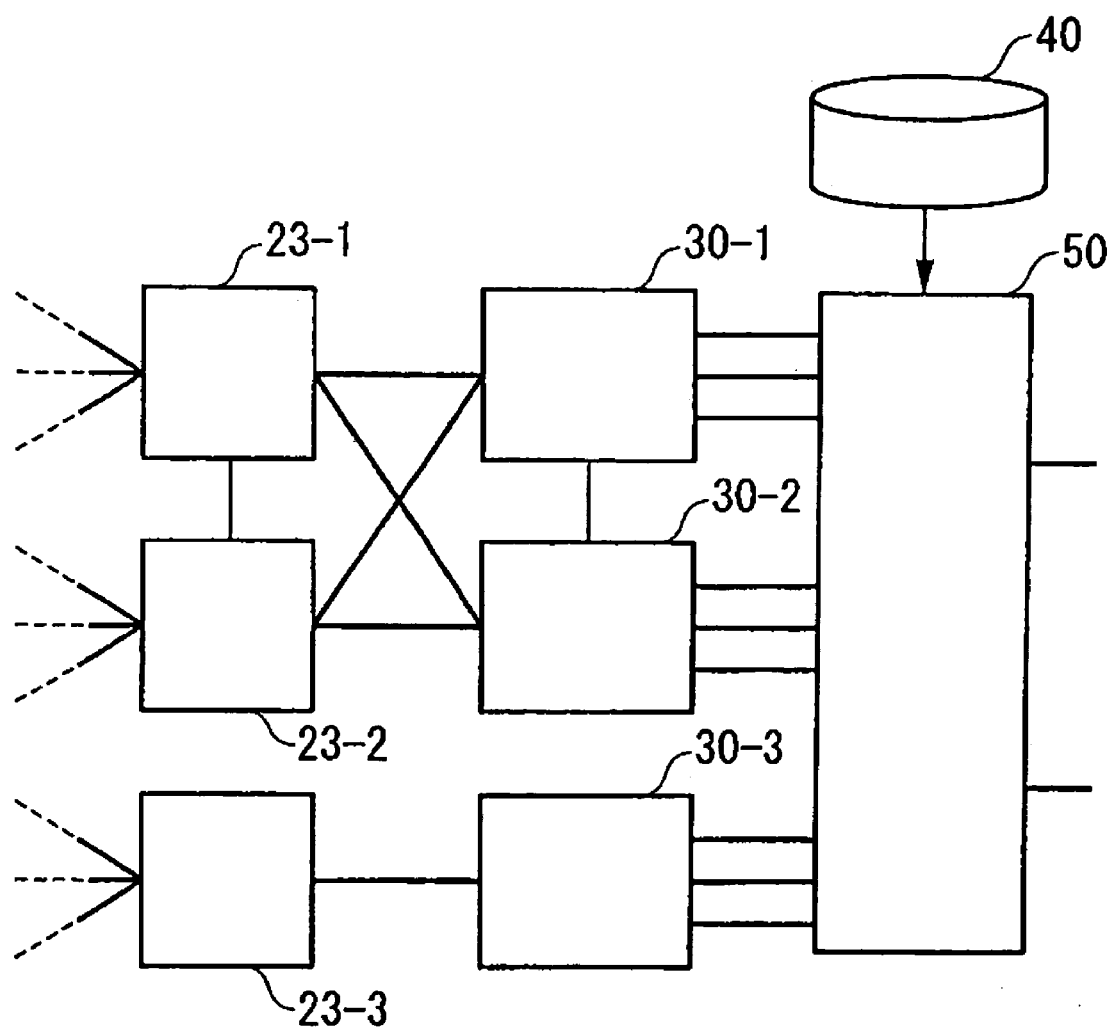
FIG. 67 is a view for a structure for an OVPN according to a thirty-second embodiment.

A thirty-second embodiment is explained with reference to FIG. 67. FIG. 67 is a view for showing a part a structure of the OVPN in the thirty-second embodiment. Here, a structure of the base point device in the present embodiment is the same as the structure shown of the thirty-first embodiment shown in FIG. 65. In the thirty-second embodiment, the base point devices 23-1 and 23-3 are connected to a plurality of OVPN terminating devices 30-1 and 30-2 commonly respectively. Here, explanation is made for the base point device 23-1, the OVPN terminating devices 30-1 and 30-2. As shown in FIG. 67, the base point device 23-1 in the thirty-second embodiment is connected to a plurality of OVPN terminating devices 23-1 and 30-2. Also, as shown in FIG. 65, the base point device 23-1 in the thirty-second embodiment is provided with a database 139 for storing a groups for the OVPN terminating device 30-1 and 30-2 which relate to the same VPNID, an error detecting section 134 for detecting an occurrence of an error in the control channel and the data channel, and the subsidiary process requesting section 140 which requests other OVPN terminating device 30-2 in the same group perform the subsidiary processing operation with reference to the database 139 in place of the OVPN terminating device 30-1 in which an error occurs in the control channel when the error detecting section 134 detects an occurrence of an error in the control channel or the data channel caused in the OVPN terminating device 30-1.

Figure 68:
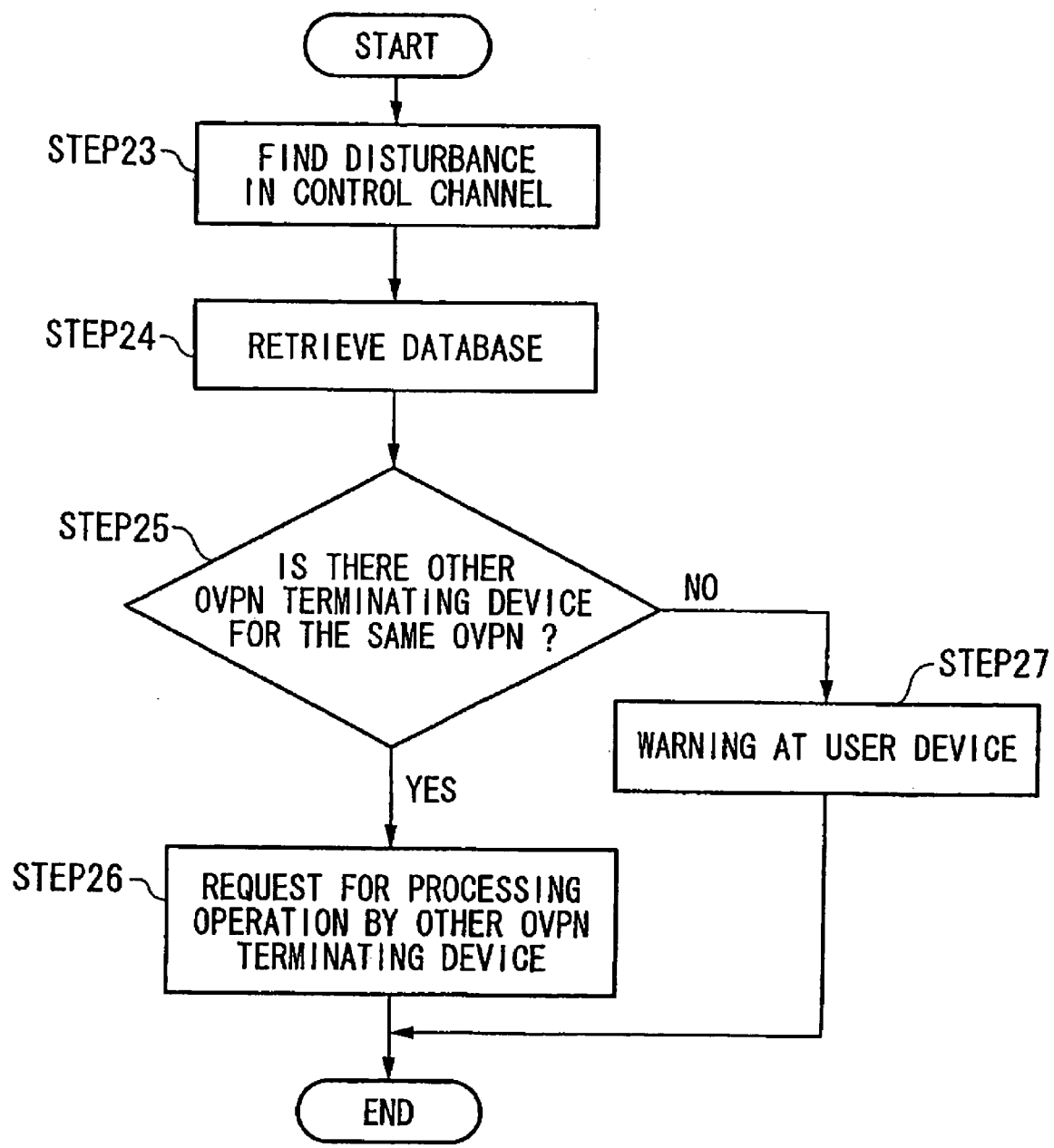
FIG. 68 is a flow chart for explaining operations in the base point device according to the thirty-second embodiment.

Next, operations in the base point device in the thirty-second embodiment is explained with reference to FIG. 68. FIG. 68 is a flow chart for explaining operations in the base point device in the thirty-second embodiment. Here, explanation is made for the base point device 23-1, the OVPN terminating devices 30-1 and 30-2 shown in FIG. 67. When an error detecting section 134 detects an occurrence of an error in the control channel or the data channel caused in the base point device (step 23), an indication that the error detecting section 134 detects an occurrence of an error in the control channel or the data channel caused in the base point device to the subsidiary process requesting section 140. The subsidiary process requesting section 140 which is notified of that the error occurs in the control channel retrieves the database 139 (step 24) for whether or not there is other base point device other than the VPNID (step 25). In an example shown in FIG. 67, the OVPN terminating device 30-2 has a same VPNID "a"; thus, the base point device 23-1 requests the OVPN terminating device 30-2 perform the subsidiary processing operation (step 26). The OVPN terminating device 30-2 performs the subsidiary service for the base point device 23-1 in place of the OVPN terminating device 30-1 accordingly. If other OVPN terminating device which has the same VPNID as that in the OVPN terminating device 30-1 cannot be found, the OVPN terminating device 30-2 emits an alarm to the user's device 20-1 (step 27). Thus, an error in the control channel or the data channel is notified.

Here, when the OVPN terminating device has a function for performing the subsidiary processing operation accordingly after receiving the subsidiary processing request from the base point device.

Thirty-Third Embodiment

Figure 69:
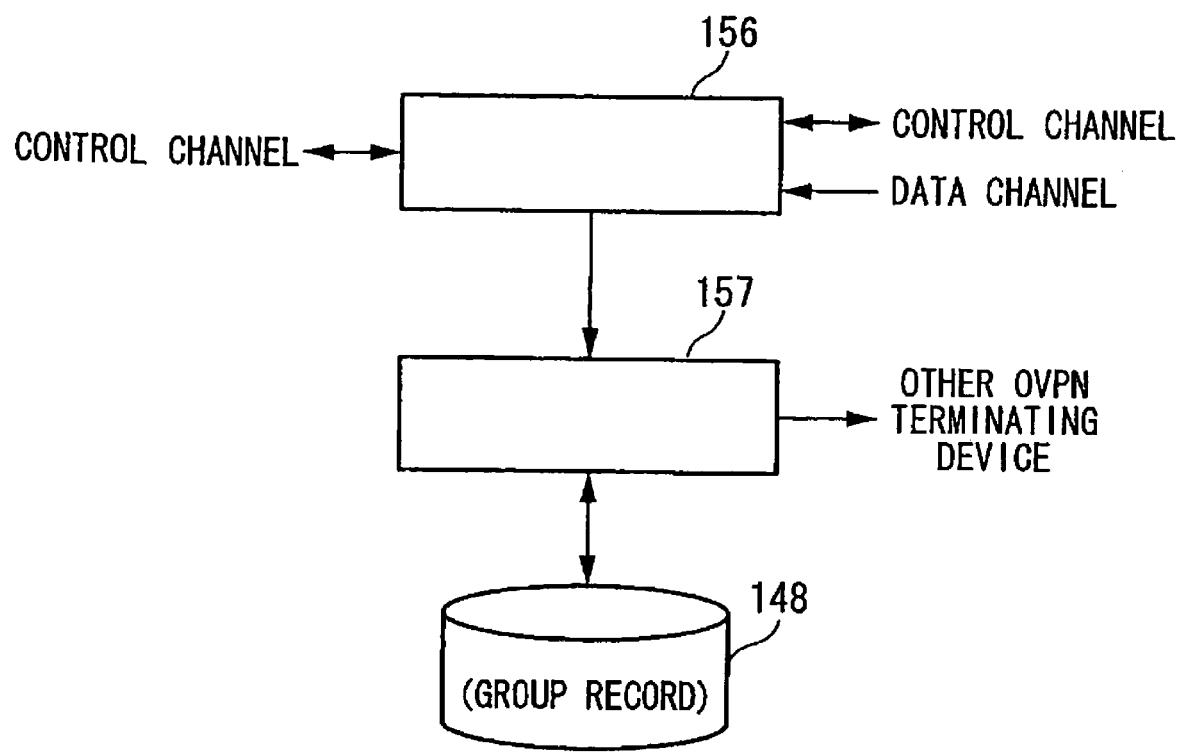
FIG. 69 is a block diagram for an important part of an OVPN terminating device according to a thirty-third embodiment.

A thirty-third embodiment is explained with reference to FIG. 69. FIG. 69 is a block diagram for showing a technical feature of an OVPN terminating device in the thirty-third embodiment. A block structure shown in FIG. 69 is disposed in a part of an optical switch controlling device 31 in the OVPN terminating device 30 shown in FIG. 64. As shown in FIG. 69, the OVPN terminating device 30 in the thirty-third embodiment is provided with a database 148 for storing a group for other OVPN terminating device which relates to a same VPNID, an error detecting section 35 for detecting an occurrence of an error in the control channel and the data channel, and the subsidiary process requesting section 36 which requests other OVPN terminating device 30-2 in the same group perform the subsidiary processing operation with reference to the database 148 in place of the OVPN terminating device 30-1 in which an error occurs in the control channel when the error detecting section 35 detects an occurrence of an error.

Operations in the thirty-third embodiment is the same as the operations in the third-second embodiment shown in FIG. 68. Here, the occurrence of an error is detected in the base point device in the thirty-second embodiment. In contrast, the occurrence of the error is detected in the OVPN terminating device in the thirty-third embodiment.

As explained above, in the OVPN, it is supposed that a node which detects an occurrence of an error transmits an error notification publication packet. The error detecting section 35 detects an occurrence of an error by receiving the error notification publication packet. Also, when the occurrence of an error in the OVPN terminating device is detected, the error detecting section 35 transmits the error notification publication packet to the other node.

Thirty-Fourth Embodiment

A thirty-fourth embodiment is explained with reference to FIG. 70. FIG. 70 is a view for explaining a structure of a testing device in the base point device in the thirty-fourth embodiment. The testing device shown in FIG. 70 is disposed in the base point device. The testing device shown in FIG. 70 is provided with a return controlling device 90 for separating the user's device 20-1 and the OVPN and returning a test beam which is transmitted from the OVPN and an optical switch 91.

As explained above, according to the present invention, it is possible to handle a request by the user for changing the setting for the signal format which is employed in the user's device quickly. Also, it is possible to realize an OVPN which can perform a process for a calling connection request from the user efficiently and improve an operability for the user.

Also, it is possible to omit a signaling processes which are invalid during an operation on the OVPN.

Also, it is possible to realize an OVPN in which it is possible to improve an operability for setting up processes for the OVPN for the user.

Also, it is possible to realize an OVPN in which it is possible to use a transmission path in the OVPN efficiently.

Also, it is possible to realize an OVPN in which it is possible to transmit the signals in the OVPN efficiently by using a multiplying operation. Furthermore, it is possible to realize an OVPN in which it is possible to set a length of signal desirably by dividing and transmitting a long signal.

Also, it is possible to realize an OVPN in which it is possible to connect the user's device to the OVPN efficiently and realize an operability for the user. +++

Also, it is possible to realize an OVPN in which it is possible to use a transmission path efficiently.

Also, it is possible to realize a reliable OVPN.

What is claimed is:

1. An Optical Virtual Private Network (OVPN) system comprising:

a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other; and an OVPN terminating device for communicating with the user's device, wherein the OVPN terminating device is provided with:

a registering section from the user's device for a first signal format type which is used in the user's device together with an IP address of the user's device and a VPNID;

a notifying section for notifying contents of the registration to other OVPN terminating device which controls the same VPNID as the user's device;

a retrieving section for the first signal format type which corresponds to the IP address and the VPNID in the user's device according to a calling connection request from the user's device by referring to the information which is registered by the registering section, and a selecting section for selecting the first signal format which is used by the user's device according to a result in the retrieving section when data is transported from the user's device, wherein the registering section is provided with a section for registering a port identifier for the user's own device and a port identifier for the OVPN terminating device or an interface identifier which corresponds to at least a first signal format which is used in the user's device together with the IP address of the user's device and the VPNID.

2. An Optical Virtual Private Network (OVPN) terminating device for communicating with a user's device which joins an OVPN comprising:

a port;

a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other;

a registering section from the user's device for a first signal format type which is used in the user's device together with an IP address of the user's device and a VPNID;

a notifying section for notifying contents of the registration to other OVPN terminating device which controls the same VPNID as the user's device;

a retrieving section for the first signal format type which corresponds to the IP address and the VPNID in the user's device according to a calling connection request from the user's device by referring to the information which is registered by the registering section, and a selecting section for selecting the first signal format which is used by the user's device according to a result in the retrieving section when data is transported from the user's device, wherein the registering section is provided with a section for registering a port identifier for the user's own device and a port identifier for the OVPN terminating device or an interface identifier which corresponds to at least a first signal format which is used in the user's device together with the IP address of the user's device and the VPNID.

3. An Optical Virtual Private Network (OVPN) system comprising:

a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other; and an OVPN terminating device for communicating with the user's device wherein the OVPN terminating device is provided with:

a registering section for registering a first signal format type which is sent from the user's device so as to be used in the user's device together with an IP address of the user's device and a VPNID;

a notifying section for notifying the registered contents to other OVPN terminating device which controls a device which receives a calling connection request when the calling connection request arrives from the user's device;

a selecting section for selecting the first signal format which is used by a user's device which is accommodated by the OVPN terminating device and which is a destination of a calling connection request transmitted from a user's device accommodated by the other OVPN terminating device for communication with the user's device accommodated by the other OVPN terminating device with reference to the registered contents notified from the other OVPN terminating device;

a receiving and selecting section which receives the first signal format type information which is used in the device which receives the calling connection request from the other OVPN terminating device so as to respond to a notice from the notifying section and selects the first signal format type which is used in the user's device according to the format type information.

4. An Optical Virtual Private Network (OVPN) terminating device for communicating with a user's device which joins an OVPN comprising:

a port;

a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other;

a registering section for registering a first signal format type which is sent from the user's device so as to be used in the user's device together with an IP address of the user's device and a VPNID;

a notifying section for notifying the registered contents to other OVPN terminating device which controls a device which receives a calling connection request when the calling connection request arrives from the user's device;

a selecting section for selecting the first signal format which is used by a user's device which is accommodated by the OVPN terminating device and which is a destination of a calling connection request transmitted from a user's device accommodated by the other OVPN terminating device for communication with the user's device accommodated by the other OVPN terminating device with reference to the registered contents notified from the other OVPN terminating device;

a receiving and selecting section which receives the first signal format type information which is used in the device which receives the calling connection request from the other OVPN terminating device so as to respond to a notice from the notifying section and selects the first signal format type which is used in the user's device according to the format type information.

5. An Optical Virtual Private Network (OVPN) system comprising:

a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other; and an OVPN terminating device for communicating with the user's device, wherein the OVPN terminating device is provided with:

a registering section for registering at least a first signal format type which is sent from the user's device so as to be used in the user's device together with an IP address of the user's device and a VPNID;

a notifying and selecting section for notifying the registered contents to other OVPN terminating device which controls the device which receives the calling connection request from the user's device when the calling connection request arrives from the user's device and selecting the first signal format type which can be used in the user's device handled between other OVPN terminating device and the own OVPN terminating device commonly according to the registered contents;

a retrieving section which retrieves information indicating a vacancy of the converting section for the alternate converting operation both in the own OVPN terminating device and other OVPN device when the first signal format type which is selected by the selecting section is different from a second signal format type; and a selecting section which selects at least either one of the converting section for the alternate converting operation which is not occupied for the own OVPN terminating device and other OVPN device according to the retrieving result by the retrieving section.

6. An Optical Virtual Private Network (OVPN) terminating device for communicating with the user's device comprising:

a port;

a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other;

a registering section for registering at least a first signal format type which is sent from the user's device so as to be used in the user's device together with an IP address of the user's device and a VPNID;

a notifying and selecting section for notifying the registered contents to other OVPN terminating device which controls the device which receives the calling connection request from the user's device when the calling connection request arrives from the user's device and selecting the first signal format type which can be used in the user's device handled between other OVPN terminating device and the own OVPN terminating device commonly according to the registered contents;

a retrieving section which retrieves information indicating a vacancy of the converting section for the alternate converting operation both in the own OVPN terminating device and other OVPN device when the first signal format type which is selected by the selecting section is different from a second signal format type; and a selecting section which selects at least either one of the converting section for the alternate converting operation which is not occupied for the own OVPN terminating device and other OVPN device according to the retrieving result by the retrieving section.

7. An OVPN terminating device according to claim 4 or 6 wherein the registering section is provided with a section for registering a port identifier for the user's own device which corresponds to at least a first signal format which is used in the user's device or an interface identifier together with the IP address of the user's device and the VPNID.

8. An OVPN terminating device according to claim 2 which contains the converting section for the alternate converting operation in the user's own device.

9. An Optical Virtual Private Network (OVPN) system comprising:

a plurality of OVPN terminating devices which accommodate user's devices and which are not provided with sections for converting a first signal format and a second signal format alternately; and a plurality of collective converting devices, wherein each of the collective converting devices comprises a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other, the converting sections being commonly used by the plurality of OVPN terminating devices and each of the OVPN terminating devices selects a collective converting device which is disposed nearest to each of the OVPN terminating devices, and if the collective converting device which is disposed nearest to each of the OVPN terminating devices is occupied, each of the OVPN terminating devices selects a next nearest collective converting device.

10. An optical communication network which is provided with an Optical Virtual Private Network (OVPN) system according to claim 9.

11. An Optical Virtual Private Network (OVPN) terminating device for communicating with a user's device which joins an OVPN comprising:

a port;

a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other;

a retrieving section for detecting whether or not there is a section for performing the alternate converting operation so as to correspond to the signal format type under condition the first signal format is different from the second signal format when the first signal format type information which is used in the user's device is received;

a generating section for generating an IP address and a VPNID to the user's device when there is a section for performing the alternate converting operation as a result of the retrieving operation by the retrieving section;

a registering section for registering the IP address, the VPNID generated by the generating section, and the first signal format type information which is used by the user's device to which the IP address and the VPNID are added; and a notifying section for notifying first signal format type information which corresponds to a vacant converting section for performing the alternate converting operation to the user's device when the retrieving result in the retrieving section indicates that there is not a section for performing the alternate converting operation, wherein in the case in which the user's device is notified of the first signal format type information, if it is possible for the user's device to change the first signal format type to another first signal format type corresponding to the first signal format type information, the registration is performed for the other first signal format type, and if it is not possible for the user's device to change the first signal format type to the other first signal format type, the registration is performed for the first signal format type after a certain period of time.

12. An OVPN terminating device according to claim 11 comprising:
   a selecting section for selecting a signal format which is used by the user who receives the calling connection request according to the first signal format type information which is used by the user's device having the IP address, included in the calling connection request, from which the calling connection request is transmitted when the calling connection request is received from the user's device; and
   a transmitting section for transmitting the format type information which is selected by the selecting section to the user who receives the calling connection request together with the calling connection request.

13. An OVPN terminating device according to claim 12 further comprising a notifying section which receives a response to the calling connection request so as to determine whether or not the signal format which is used by the user's device and the signal format which is employed by the user who receives the calling connection request coincides and notify that the signal formats do not coincide each other for setting up a circuit to the user's device.

14. An OVPN terminating device according to claim 11 comprising:
   an inquiring section for inquiring whether or not it is possible to change the vacant converting section for performing the alternate converting operation to other user's device which is under operation when the retrieving result by the retrieving section indicates that that there is not a section for performing the alternate converting operation; and
   a requesting and generating section for requesting for changing the converting section for performing the alternate converting operation to other user device when the retrieving result by the retrieving section indicates that there is a section for performing the alternate converting operation and generating the IP address and the VPNID for the user's device.

15. A base point device which is disposed between the Optical Virtual Private Network (OVPN) system according to claim 1 and the user's device which communicates with the OVPN system or with an OVPN terminating device or between the OVPN system according to claim 1 and the OVPN terminating device comprising:
   a port;
   a determining section for determining a first signal format type which is used in the user's device;
   a transmitting section for transmitting the format type information which is determined by the determining section to the OVPN terminating device; and
   a maintaining section for maintaining the generated IP address and the VPNID.

16. An Optical Virtual Private Network (OVPN) system comprising:
   a plurality of converting sections, which are disposed so as to correspond to plural different first signal formats, for converting a first signal format and a second signal format alternately under conditions in which the first signal format which is used by a user's device which joins an OVPN and a second signal format which is used in the OVPN are different from each other;
   an OVPN terminating device for communicating with the user's device, wherein the OVPN terminating device is provided with:
   a retrieving section for detecting whether or not there are converting sections which correspond to a plurality of the signal format types under condition the first signal format is different from the second signal format when the first signal format type information which is used in the user's device is received;
   a generating section for generating a plurality of IP addresses which correspond to a plurality of format types and a VPNID to the user's device when there is a detected converting section for performing the alternate converting operation as a result of the retrieving operation by the retrieving section; and
   a registering section for registering the VPNID which is added by the generating section, a plurality of IP addresses, and a plurality of the first signal format type information which are used by the user's device to which the VPNID and a plurality of the IP addresses are added; and
   a section for employing a converting section which corresponds to the IP address which is contained in the calling connection request which is transmitted for a communication following the calling connection request by referring to the registering section when the calling connection request arrives from the user's device.

17. An Optical Virtual Private Network (OVPN) terminating device for communicating with a user's device which joins an OVPN comprising:
   a port;
   a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other;
   a retrieving section for detecting whether or not there are converting sections which correspond to a plurality of the signal format types under condition the first signal format is different from the second signal format when the first signal format type information which is used in the user's device is received;
   a generating section for generating a plurality of IP addresses which correspond to a plurality of format types and a VPNID to the user's device when there is a detected converting section for performing the alternate converting operation as a result of the retrieving operation by the retrieving section; and
   a registering section for registering the VPNID which is added by the generating section, a plurality of IP addresses, and a plurality of the first signal format type information which are used by the user's device to which the VPNID and a plurality of the IP addresses are added; and
   a section for employing a converting section which correspond to the IP address which is contained in the calling connection request which is transmitted for a communication following the calling connection request by referring to the registering section when the calling connection request arrives from the user's device.

18. A base point device which is disposed between the user's device and the Optical Virtual Private Network (OVPN) system according to claim 16 which accommodates the user's device or between the user's device and the OVPN terminating device which accommodates the user's device, the base point device comprising:
 a port;
 a determining section for determining a first signal format type which is used in the user's device;
 a transmitting section for transmitting the format type information which is determined by the determining section to the OVPN terminating device; and
 a maintaining section for maintaining the plurality of generated IP addresses, the VPNID, and a plurality of the first signal format type information.

19. An OVPN terminating device according to any one of claim 11, 12, 13, 14, or 17 which is provided with the converting section for performing the alternate converting operations in the user's own device.

20. A base point device according to claim 15 which is provided with:
 a separating section for separating the user's device and the OVPN; and
 a returning section for returning a test beam which is transmitted from the OVPN back to the OVPN.

21. An OVPN system according to claim 11, further comprising a receiving and determining section for receiving at least a test signal which is transmitted via a data channel by using the IP address from the user's device and determining at least the first signal format type which belongs to the user's device.

22. An Optical Virtual Private Network (OVPN) terminating device for communicating with a user's device which joins an OVPN comprising:
 a port;
 a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other;
 a detecting section for detecting whether or not the user's device is connected;
 a generating section for adding the IP address and the VPNID to the user's device according to a control channel when the retrieving result in the detecting section indicates that the user's device is connected;
 a receiving and determining section for receiving at least a test signal which is transmitted via a data channel by using the IP address from the user's device and determining at least the first signal format type which belongs to the user's device;
 a retrieving section for retrieving whether or not there is a converting section for performing the alternate converting operation so as to correspond to the format type according to the determining result by the determining section when the first signal format type which is used by the user's device is different from the second signal format type; and
 a registering section for registering the IP address and the VPNID which are added by the generating section, and the first signal format type information which is determined by the determining section which is used by the user's device to which the VPNID and the IP address are added when the retrieving result by the retrieving section indicates that there is a converting section for performing the alternate converting operation.

23. An OVPN terminating device according to claim 22 wherein the registering section is provided with a registering section for registering a port identifier or an interface identifier for the user's own device which corresponds to at least a first signal format which is used in the user's device commonly.

24. An OVPN terminating device according to claim 22 or 23 which is provided with a converting section for performing the alternate converting operation in the user's own device.

25. A base point device which is disposed between the Optical Virtual Private Network (OVPN) terminating device according to claim 22 and the user's device which communicates with the OVPN terminating device comprising:
 a port;
 a detecting section for detecting whether or not the user's device is connected to the base point device;
 a receiving and maintaining section for receiving the IP address and the VPNID which are added to the base point device via the control channel from the OVPN terminating device; and
 a transmitting section for transmitting the test signal for at least the first signal format which is used by the user's device to the OVPN terminating device via the data channel after the IP address and the VPNID are added to the base point device.

26. A base point device according to claim 25 which is provided with:
 a separating section for separating the user's device and the OVPN; and
 a returning section for returning a test beam which is transmitted from the OVPN back to the OVPN.

27. An OVPN system according to claim 11, further comprising:
 a transmitting section for transmitting the first signal format which is transmitted from the user's device to the OVPN by encapsulating the first signal format by the second signal format, and
 a transmitting section for transmitting the encapsulated signal which is encapsulated by the second signal format which is transmitted from the OVPN to the user's device by de-encapsulating according to the first signal format.

28. An OVPN system according to claim 27 wherein the transmitting section to the OVPN is provided with a multiplying section for multiplying a plurality of signals according to the second signal format.

29. An OVPN system according to claim 27 wherein the transmitting section to the OVPN is provided with a dividing and encapsulating section for dividing and encapsulating a series of signals according to the first signal format into a plurality of signals according to the second signal format.

30. An Optical Virtual Private Network (OVPN) system comprising:
 a plurality of optical cross connecting devices; and
 a plurality of collective converting devices,
 wherein each of the collective converting devices comprises:
 a plurality of converting sections, which are disposed so as to correspond to plural different first signal formats, for converting a first signal format in a layer 1 which is employed in a user's device which joins an OVPN and a second signal format which is utilized in an upper layer than the layer 1 which is employed in the OVPN alternately under conditions in which the first signal format which is used by a user's device which joins the OVPN and the second signal format which is used in the OVPN are different from each other and the converting section for performing the alternate converting operation is provided with:

a transmitting section for transmitting the first signal format which is transmitted from the user's device to the OVPN by encapsulating the first signal format by the second signal format; and a transmitting section for transmitting the encapsulated signal which is encapsulated by the second signal format which is transmitted from the OVPN to the user's device by de-encapsulating to the first signal format, and the converting sections are commonly used by the plurality of optical cross connecting devices, and each of the optical cross connecting devices selects the collective converting device which is disposed nearest to each of the optical cross connecting devices.

31. An OVPN system according to claim 30, wherein the transmitting section to the OVPN is provided with a multiplying section for multiplying a plurality of signals according to the second signal format.

32. An OVPN system according to claim 30, wherein the transmitting section to the OVPN is provided with a dividing and encapsulating section for dividing and encapsulating a series of signals according to the first signal format into a plurality of signals according to the second signal format.

33. An optical communication network which is provided with an Optical Virtual Private Network (OVPN) system according to claim 30.

34. An OVPN system according to claim 11, further comprising a receiving and transmitting section for receiving a notice that the user's device is connected to the base point device via the control channel from the base point device which is disposed between the user's device and the OVPN and transmitting the IP address and the VPNID which are allocated to the user's device according to the base point device.

35. An Optical Virtual Private Network (OVPN) terminating device for communicating with a user's device which joins an OVPN comprising:

a port;

a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other;

a receiving and transmitting section for receiving a notice that the user's device is connected to a base point device via the control channel from the base point device which is disposed between the user's device and the OVPN and transmitting the IP address and the VPNID which are allocated to the user's device to the base point device;

a receiving section for receiving a receipt confirmation for the IP address and the VPNID which are transmitted by the receiving and transmitting section; and a transmitting section for transmitting a final connection confirmation for notifying the receipt of the receipt confirmation by the receiving section to the base point device.

36. An OVPN terminating device according to claim 35 comprising:

a receiving and retrieving section for receiving the first signal format type information which is employed by the user's device according to the control channel after the final connection confirmation is transmitted so as to retrieving whether or not there is a converting section for performing the alternate converting operation so as to correspond to the format type; and a registering section for registering the IP address and the VPNID which are allocated to the user's device, and the first signal format type information which is employed by the user's device when the retrieving result in the receiving and registering section indicates that there is a converting section for performing the alternate converting operation.

37. An OVPN terminating device according to claim 35, which is provided with the converting section for performing the alternate converting operation in the OVPN terminating device.

38. A base point device which is disposed between the Optical Virtual Private Network (OVPN) terminating device according to claim 35 and a user's device which communicates with the OVPN terminating device comprising:

a port;

a detecting section for detecting whether or not the user's device is connected to the base point device;

a notifying section for notifying at least one of the OVPN terminating device via the control channel that it is detected that the user's device is connected to the base point device;

a receiving section for receiving the IP address and the VPNID which are allocated to the user's device from the OVPN terminating device via the control channel;

a transmitting section for transmitting a receipt confirmation that the receiving section received the IP address and the VPNID to the OVPN terminating device; and a transmitting section the first signal format type information which is used by the user's device, the IP address, and the VPNID to the OVPN terminating device which received the final connection receipt for the receipt confirmation via the control channel.

39. A base point device according to claim 38 comprising:

a determining section for determining the first signal format type information which is employed in the user's device; and a transmitting device for transmitting the format type information which is determined by the determining section to the OVPN terminating device.

40. A base point device according to claim 38 comprising:

a separating section for separating the user's device and the OVPN; and a returning section for returning a test beam which is emitted from the OVPN back to the OVPN.

41. A base point device which is disposed between an Optical Virtual Private Network (OVPN) and a user's device comprising:

a port;

a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other;

a multiplying and transmitting section for multiplying and transmitting a plurality of optical wavelength signals which are used in a plurality of the user's devices to the OVPN;

a separating and transmitting section for separating and transmitting the multiplied optical wavelength signals which arrive from the OVPN to the user's devices; and a notifying section for notifying the OVPN of wavelength information and information for the wavelengths which are transmitted under a multiplied condition so as to be used in the user's devices.

42. An Optical Virtual Private Network (OVPN) terminating device for communicating with the user's device via the base point device according to claim 41 comprising:
a port;
a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other;
a multiplying and transmitting section for multiplying and transmitting a plurality of optical wavelength signals which are used in the user's device to the OVPN; and
a separating and transmitting section for separating and transmitting the multiplied optical wavelength signals which arrive from the base point device so as to transmit to a predetermined course according to information which is notified from the notifying section.

43. An Optical Virtual Private Network (OVPN) system comprising:
a base point device which is disposed between an OVPN and a user's device; and
an OVPN terminating device which communicates with the user's device via the base point device,
wherein the base point device comprises:
a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other;
a converting and transmitting section for converting a serial signal which is transmitted from the user's device into a plurality of parallel signals so as to transmit to the OVPN;
a converting and transmitting section for converting a plurality of the parallel signals which arrive from the OVPN into a serial signal so as to transmit to the user's device; and
a notifying section for notifying the OVPN of information for the topology of the parallel signals and information that the serial signals are converted to the parallel signals, and
the OVPN terminating device comprises:
a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other; and
an inputting section for inputting the parallel signals which are divided from a series of serial signals into the plurality of converting sections for performing the alternate converting operation so as to correspond to the first signal format type information according to the information which is notified from the notifying section in the base point device.

44. An Optical Virtual Private Network (OVPN) system comprising:
a base point device which is disposed between an OVPN and a user's device; and
an OVPN terminating device which communicates with the user's device via the base point device,
wherein the base point device comprises:
a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other;
a multiplying and transmitting section for multiplying the parallel signal which is converted from the serial signal which is transmitted from the user's device so as to transmit to the OVPN;
a separating and transmitting section for separating the multiplied wavelength signals which arrive from the OVPN into the parallel signals and converting the parallel signals into the serial signals so as to transmit to the user's device; and
a notifying section for notifying the OVPN of the information that the serial signals are converted to the parallel signals, the information for a topology of the parallel signals, and the information that the parallel signals are transmitted under wavelength-multiplied condition, and
the OVPN terminating device comprises:
a plurality of converting sections, which are disposed so as to correspond to plural different first signal formats, for converting a first signal format and a second signal format alternately under conditions in which the first signal format which is used by a user's device which joins the OVPN and a second signal format which is used in the OVPN are different from each other;
a multiplying and transmitting section for multiplying the parallel signals which arrive from the OVPN so as to transmit to the base point device;
a separating and transmitting section for separating the multiplied optical wavelength signals which arrive from the base point device so as to transmit to the OVPN as the parallel signals; and
an inputting section for inputting the parallel signals which are divided from the multiplied wavelength signals into the plurality of converting sections for performing the alternate converting operation so as to correspond to the first signal format type information according to the information which is notified from the notifying section in the base point device.

45. An OVPN terminating device according to claim 42 which is provided with the converting section for performing the alternate converting operation in the OVPN terminating device.

46. A base point device according to any one of claim 41, 43, or 44 which is provided with:
a separating section for separating the user's device and the OVPN; and
a returning section for returning a test beam which is transmitted from the OVPN back to the OVPN.

47. An optical communication network which is provided with an Optical Virtual Private Network (OVPN) terminating device according to any one of claims 2, 11, 22, 35, and 42.

48. The OVPN system according to any one of claims 1, 16, 21, 27, and 34 residing in an optical communication network.

49. The base point device according to any one of claims 15, 25, 38, and 41 residing in an optical communication network.

* * * * *